United States Patent
Jin et al.

(10) Patent No.: US 12,470,318 B2
(45) Date of Patent: Nov. 11, 2025

(54) INFORMATION TRANSMISSION METHOD AND APPARATUS BASED ON A LIST OF MODULATION CODING SCHEME

(71) Applicant: HUAWEI TECHNOLOGIES CO., LTD., Shenzhen (CN)

(72) Inventors: Lili Jin, Chengdu (CN); Xingqing Cheng, Beijing (CN); Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 376 days.

(21) Appl. No.: 18/176,297

(22) Filed: Feb. 28, 2023

(65) Prior Publication Data
US 2023/0283400 A1    Sep. 7, 2023

Related U.S. Application Data

(63) Continuation of application No. PCT/CN2021/074213, filed on Jan. 28, 2021.

(30) Foreign Application Priority Data

Aug. 31, 2020    (WO) ................ PCT/CN2020/112744

(51) Int. Cl.
H04L 1/00    (2006.01)
H04L 27/22    (2006.01)

(52) U.S. Cl.
CPC ............ *H04L 1/0003* (2013.01); *H04L 27/22* (2013.01)

(58) Field of Classification Search
CPC ..... H04L 1/0003; H04L 27/22; H04L 1/0009; H04L 1/0016
See application file for complete search history.

(56) References Cited

U.S. PATENT DOCUMENTS

2010/0278225 A1\*  11/2010  Chun ................ H04L 5/0007
                                                                 375/295
2017/0208570 A1    7/2017  Wang et al.
(Continued)

FOREIGN PATENT DOCUMENTS

CN    103297181 A    9/2013
CN    103580788 A    2/2014
(Continued)

OTHER PUBLICATIONS

"Draft Standard for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz," IEEE P802.11ac/D3.0, Working Group of the 802 Committee, Total 385 pages (Jun. 2012).
(Continued)

*Primary Examiner* — Harry H Kim
(74) *Attorney, Agent, or Firm* — Leydig, Voit & Mayer, Ltd.

(57) ABSTRACT

An information transmission method and apparatus, applied to the communication field, and in particular, to the short-range communication field, for example, a vehicle-mounted wireless communication system are provided. The method includes: A first node receives a first MCS index from a second node. The first MCS index corresponds to a first modulation mode. The first node receives data from the second node or sends data to the second node based on the first MCS index. A first MCS information subset in which the first MCS index is located belongs to a predefined MCS information set including 32 MCS information subsets.

10 Claims, 22 Drawing Sheets

(56) References Cited

U.S. PATENT DOCUMENTS

| | | | |
|---|---|---|---|
| 2019/0313426 A1 | 10/2019 | Lin et al. | |
| 2020/0084778 A1 | 3/2020 | Wang et al. | |
| 2021/0329614 A1* | 10/2021 | Park | H04L 1/0003 |
| 2022/0279551 A1* | 9/2022 | Liu | H04W 72/0446 |
| 2023/0275683 A1* | 8/2023 | Ersbo | H04L 1/0003 370/329 |

FOREIGN PATENT DOCUMENTS

| | | | |
|---|---|---|---|
| CN | 107852298 A | | 3/2018 |
| CN | 110061804 B | * | 5/2018 |
| CN | 110299965 A | | 10/2019 |
| CN | 110830155 A | | 2/2020 |
| CN | 111357372 A | | 6/2020 |
| EP | 2874335 A1 | | 5/2015 |
| JP | 2019198013 A | | 11/2019 |
| JP | 2020523913 A | | 8/2020 |
| WO | 2018230458 A1 | | 12/2018 |
| WO | 2019141232 A1 | | 7/2019 |
| WO | 2020026305 A1 | | 2/2020 |
| WO | 2020031357 A1 | | 2/2020 |

OTHER PUBLICATIONS

Ericsson, "CQI and MCS tables for URLLC," 3GPP TSG-RAN WG1 Meeting #93 Busan, Korea, R1-1806004, Total 11 pages (May 21-25, 2018).

* cited by examiner

| MCS table 1 (a value of spectral efficiency is accurate to 9 decimal places, and a value of a code rate is accurate to 10 decimal places) ||||
|---|---|---|---|
| MCS index | Modulation | Efficiency | R |
| MCS 0 | QPSK | 0.289062500 | 0.1445312500 |
| MCS 1 | QPSK | 0.369140625 | 0.1845703125 |
| MCS 2 | QPSK | 0.466796875 | 0.2333984375 |
| MCS 3 | QPSK | 0.580078125 | 0.2900390625 |
| MCS 4 | QPSK | 0.720703125 | 0.3603515625 |
| MCS 5 | QPSK | 0.882812500 | 0.4414062500 |
| MCS 6 | QPSK | 1.058593750 | 0.5292968750 |
| MCS 7 | QPSK | 1.244140625 | 0.6220703125 |
| MCS 8 | QPSK | 1.425781250 | 0.7128906250 |
| MCS 9 | 16QAM | 1.527343750 | 0.3818359375 |
| MCS 10 | 16QAM | 1.800781250 | 0.4501953125 |
| MCS 11 | 16QAM | 2.078125000 | 0.5195312500 |
| MCS 12 | 16QAM | 2.402343750 | 0.6005859375 |
| MCS 13 | 64QAM | 2.419921875 | 0.4033203125 |
| MCS 14 | 64QAM | 2.748046875 | 0.4580078125 |
| MCS 15 | 64QAM | 3.105468750 | 0.5175781250 |
| MCS 16 | 64QAM | 3.474609375 | 0.5791015625 |
| MCS 17 | 64QAM | 3.837890625 | 0.6396484375 |
| MCS 18 | 64QAM | 4.212890625 | 0.7021484375 |
| MCS 19 | 64QAM | 4.587890625 | 0.7646484375 |
| MCS 20 | 64QAM | 4.910156250 | 0.8183593750 |
| MCS 21 | 64QAM | 5.250000000 | 0.8750000000 |
| MCS 22 | 256QAM | 5.281250000 | 0.6601562500 |
| MCS 23 | 256QAM | 5.718750000 | 0.7148437500 |
| MCS 24 | 256QAM | 6.179687500 | 0.7724609375 |
| MCS 25 | 256QAM | 6.601562500 | 0.8251953125 |
| MCS 26 | 256QAM | 7.000000000 | 0.8750000000 |
| MCS 27 | 1024QAM | 7.099609375 | 0.7099609375 |
| MCS 28 | 1024QAM | 7.500000000 | 0.7500000000 |
| MCS 29 | 1024QAM | 7.929687500 | 0.7929687500 |
| MCS 30 | 1024QAM | 8.359375000 | 0.8359375000 |
| MCS 31 | 1024QAM | 8.750000000 | 0.8750000000 |

FIG. 4

| Expanded table 1 of an MCS table 1 | | | |
|---|---|---|---|
| MCS index | Modulation | Code rate×1024 | Efficiency |
| MCS 0 | QPSK | 148 | 0.2891 |
| MCS 1 | QPSK | 189 | 0.3691 |
| MCS 2 | QPSK | 239 | 0.4668 |
| MCS 3 | QPSK | 297 | 0.5801 |
| MCS 4 | QPSK | 369 | 0.7207 |
| MCS 5 | QPSK | 452 | 0.8828 |
| MCS 6 | QPSK | 542 | 1.0586 |
| MCS 7 | QPSK | 637 | 1.2441 |
| MCS 8 | QPSK | 730 | 1.4258 |
| MCS 9 | 16QAM | 391 | 1.5273 |
| MCS 10 | 16QAM | 461 | 1.8008 |
| MCS 11 | 16QAM | 532 | 2.0781 |
| MCS 12 | 16QAM | 615 | 2.4023 |
| MCS 13 | 64QAM | 413 | 2.4199 |
| MCS 14 | 64QAM | 469 | 2.7480 |
| MCS 15 | 64QAM | 530 | 3.1055 |
| MCS 16 | 64QAM | 593 | 3.4746 |
| MCS 17 | 64QAM | 655 | 3.8379 |
| MCS 18 | 64QAM | 719 | 4.2129 |
| MCS 19 | 64QAM | 783 | 4.5879 |
| MCS 20 | 64QAM | 838 | 4.9102 |
| MCS 21 | 64QAM | 896 | 5.2500 |
| MCS 22 | 256QAM | 676 | 5.2813 |
| MCS 23 | 256QAM | 732 | 5.7188 |
| MCS 24 | 256QAM | 791 | 6.1797 |
| MCS 25 | 256QAM | 845 | 6.6016 |
| MCS 26 | 256QAM | 896 | 7.0000 |
| MCS 27 | 1024QAM | 727 | 7.0996 |
| MCS 28 | 1024QAM | 768 | 7.5000 |
| MCS 29 | 1024QAM | 812 | 7.9297 |
| MCS 30 | 1024QAM | 856 | 8.3594 |
| MCS 31 | 1024QAM | 896 | 8.7500 |

FIG. 5

| MCS index | Modulation | Efficiency | R |
|---|---|---|---|
| MCS 0 | QPSK | 0.2891 | 0.1445 |
| MCS 1 | QPSK | 0.3691 | 0.1846 |
| MCS 2 | QPSK | 0.4668 | 0.2334 |
| MCS 3 | QPSK | 0.5801 | 0.2900 |
| MCS 4 | QPSK | 0.7207 | 0.3604 |
| MCS 5 | QPSK | 0.8828 | 0.4414 |
| MCS 6 | QPSK | 1.0586 | 0.5293 |
| MCS 7 | QPSK | 1.2441 | 0.6221 |
| MCS 8 | QPSK | 1.4258 | 0.7129 |

(a)

| MCS index | Modulation | Efficiency | R |
|---|---|---|---|
| MCS 9 | 16QAM | 1.5273 | 0.3818 |
| MCS 10 | 16QAM | 1.8008 | 0.4502 |
| MCS 11 | 16QAM | 2.0781 | 0.5195 |
| MCS 12 | 16QAM | 2.4023 | 0.6006 |

(b)

| MCS index | Modulation | Efficiency | R |
|---|---|---|---|
| MCS 13 | 64QAM | 2.4199 | 0.4033 |
| MCS 14 | 64QAM | 2.7480 | 0.4580 |
| MCS 15 | 64QAM | 3.1055 | 0.5176 |
| MCS 16 | 64QAM | 3.4746 | 0.5791 |
| MCS 17 | 64QAM | 3.8379 | 0.6396 |
| MCS 18 | 64QAM | 4.2129 | 0.7021 |
| MCS 19 | 64QAM | 4.5879 | 0.7646 |
| MCS 20 | 64QAM | 4.9102 | 0.8184 |
| MCS 21 | 64QAM | 5.2500 | 0.8750 |

(c)

| MCS index | Modulation | Efficiency | R |
|---|---|---|---|
| MCS 22 | 256QAM | 5.2813 | 0.6602 |
| MCS 23 | 256QAM | 5.7188 | 0.7148 |
| MCS 24 | 256QAM | 6.1797 | 0.7725 |
| MCS 25 | 256QAM | 6.6016 | 0.8252 |
| MCS 26 | 256QAM | 7.0000 | 0.8750 |

(d)

| MCS index | Modulation | Efficiency | R |
|---|---|---|---|
| MCS 27 | 1024QAM | 7.0996 | 0.7100 |
| MCS 28 | 1024QAM | 7.5000 | 0.7500 |
| MCS 29 | 1024QAM | 7.9297 | 0.7930 |
| MCS 30 | 1024QAM | 8.3594 | 0.8359 |
| MCS 31 | 1024QAM | 8.7500 | 0.8750 |

| MCS table 2 (a value of spectral efficiency is accurate to 9 decimal places, and a value of a code rate is accurate to 10 decimal places) | | | |
|---|---|---|---|
| MCS index | Modulation | Efficiency | R |
| MCS 0 | QPSK | 0.308593750 | 0.1542968750 |
| MCS 1 | QPSK | 0.445312500 | 0.2226562500 |
| MCS 2 | QPSK | 0.630859375 | 0.3154296875 |
| MCS 3 | QPSK | 0.865234375 | 0.4326171875 |
| MCS 4 | 16QAM | 0.921875000 | 0.2304687500 |
| MCS 5 | 16QAM | 1.121093750 | 0.2802734375 |
| MCS 6 | 16QAM | 1.320312500 | 0.3300781250 |
| MCS 7 | 16QAM | 1.558593750 | 0.3896484375 |
| MCS 8 | 16QAM | 1.820312500 | 0.4550781250 |
| MCS 9 | 16QAM | 2.078125000 | 0.5195312500 |
| MCS 10 | 16QAM | 2.359375000 | 0.5898437500 |
| MCS 11 | 64QAM | 2.361328125 | 0.3935546875 |
| MCS 12 | 64QAM | 2.666015625 | 0.4443359375 |
| MCS 13 | 64QAM | 2.976562500 | 0.4960937500 |
| MCS 14 | 64QAM | 3.281250000 | 0.5468750000 |
| MCS 15 | 64QAM | 3.644531250 | 0.6074218750 |
| MCS 16 | 64QAM | 3.978515625 | 0.6630859375 |
| MCS 17 | 64QAM | 4.306640625 | 0.7177734375 |
| MCS 18 | 64QAM | 4.652343750 | 0.7753906250 |
| MCS 19 | 64QAM | 4.951171875 | 0.8251953125 |
| MCS 20 | 64QAM | 5.250000000 | 0.8750000000 |
| MCS 21 | 256QAM | 5.281250000 | 0.6601562500 |
| MCS 22 | 256QAM | 5.632812500 | 0.7041015625 |
| MCS 23 | 256QAM | 6.000000000 | 0.7500000000 |
| MCS 24 | 256QAM | 6.312500000 | 0.7890625000 |
| MCS 25 | 256QAM | 6.679687500 | 0.8349609375 |
| MCS 26 | 256QAM | 7.000000000 | 0.8750000000 |
| MCS 27 | 1024QAM | 7.099609375 | 0.7099609375 |
| MCS 28 | 1024QAM | 7.500000000 | 0.7500000000 |
| MCS 29 | 1024QAM | 7.929687500 | 0.7929687500 |
| MCS 30 | 1024QAM | 8.359375000 | 0.8359375000 |
| MCS 31 | 1024QAM | 8.750000000 | 0.8750000000 |

FIG. 8

| Expanded table 1 of an MCS table 2 | | | |
|---|---|---|---|
| MCS index | Modulation | Code rate×1024 | Efficiency |
| MCS 0 | QPSK | 158 | 0.3086 |
| MCS 1 | QPSK | 228 | 0.4453 |
| MCS 2 | QPSK | 323 | 0.6309 |
| MCS 3 | QPSK | 443 | 0.8652 |
| MCS 4 | 16QAM | 236 | 0.9219 |
| MCS 5 | 16QAM | 287 | 1.1211 |
| MCS 6 | 16QAM | 338 | 1.3203 |
| MCS 7 | 16QAM | 399 | 1.5586 |
| MCS 8 | 16QAM | 466 | 1.8203 |
| MCS 9 | 16QAM | 532 | 2.0781 |
| MCS 10 | 16QAM | 604 | 2.3594 |
| MCS 11 | 64QAM | 403 | 2.3613 |
| MCS 12 | 64QAM | 455 | 2.6660 |
| MCS 13 | 64QAM | 508 | 2.9766 |
| MCS 14 | 64QAM | 560 | 3.2813 |
| MCS 15 | 64QAM | 622 | 3.6445 |
| MCS 16 | 64QAM | 679 | 3.9785 |
| MCS 17 | 64QAM | 735 | 4.3066 |
| MCS 18 | 64QAM | 794 | 4.6523 |
| MCS 19 | 64QAM | 845 | 4.9512 |
| MCS 20 | 64QAM | 896 | 5.2500 |
| MCS 21 | 256QAM | 676 | 5.2813 |
| MCS 22 | 256QAM | 721 | 5.6328 |
| MCS 23 | 256QAM | 768 | 6.0000 |
| MCS 24 | 256QAM | 808 | 6.3125 |
| MCS 25 | 256QAM | 855 | 6.6797 |
| MCS 26 | 256QAM | 896 | 7.0000 |
| MCS 27 | 1024QAM | 727 | 7.0996 |
| MCS 28 | 1024QAM | 768 | 7.5000 |
| MCS 29 | 1024QAM | 812 | 7.9297 |
| MCS 30 | 1024QAM | 856 | 8.3594 |
| MCS 31 | 1024QAM | 896 | 8.7500 |

FIG. 9

| MCS table 3 (a value of spectral efficiency is accurate to 9 decimal places, and a value of a code rate is accurate to 10 decimal places) | | | |
|---|---|---|---|
| MCS index | Modulation | Efficiency | R |
| MCS 0 | QPSK | 0.261718750 | 0.1308593750 |
| MCS 1 | QPSK | 0.382812500 | 0.1914062500 |
| MCS 2 | QPSK | 0.546875000 | 0.2734375000 |
| MCS 3 | QPSK | 0.757812500 | 0.3789062500 |
| MCS 4 | 16QAM | 0.800781250 | 0.2001953125 |
| MCS 5 | 16QAM | 1.121093750 | 0.2802734375 |
| MCS 6 | 16QAM | 1.500000000 | 0.3750000000 |
| MCS 7 | 16QAM | 1.921875000 | 0.4804687500 |
| MCS 8 | 64QAM | 2.050781250 | 0.3417968750 |
| MCS 9 | 64QAM | 2.361328125 | 0.3935546875 |
| MCS 10 | 64QAM | 2.636718750 | 0.4394531250 |
| MCS 11 | 64QAM | 2.941406250 | 0.4902343750 |
| MCS 12 | 64QAM | 3.216796875 | 0.5361328125 |
| MCS 13 | 64QAM | 3.509765625 | 0.5849609375 |
| MCS 14 | 64QAM | 3.820312500 | 0.6367187500 |
| MCS 15 | 64QAM | 4.101562500 | 0.6835937500 |
| MCS 16 | 64QAM | 4.412109375 | 0.7353515625 |
| MCS 17 | 64QAM | 4.699218750 | 0.7832031250 |
| MCS 18 | 64QAM | 4.986328125 | 0.8310546875 |
| MCS 19 | 64QAM | 5.250000000 | 0.8750000000 |
| MCS 20 | 256QAM | 5.281250000 | 0.6601562500 |
| MCS 21 | 256QAM | 5.632812500 | 0.7041015625 |
| MCS 22 | 256QAM | 6.000000000 | 0.7500000000 |
| MCS 23 | 256QAM | 6.312500000 | 0.7890625000 |
| MCS 24 | 256QAM | 6.679687500 | 0.8349609375 |
| MCS 25 | 256QAM | 7.000000000 | 0.8750000000 |
| MCS 26 | 1024QAM | 7.031250000 | 0.7031250000 |
| MCS 27 | 1024QAM | 7.373046875 | 0.7373046875 |
| MCS 28 | 1024QAM | 7.695312500 | 0.7695312500 |
| MCS 29 | 1024QAM | 8.095703125 | 0.8095703125 |
| MCS 30 | 1024QAM | 8.457031250 | 0.8457031250 |
| MCS 31 | 1024QAM | 8.750000000 | 0.8750000000 |

FIG. 11

| Expanded table 1 of an MCS table 3 | | | |
|---|---|---|---|
| MCS index | Modulation | Code rate×1024 | Efficiency |
| MCS 0 | QPSK | 134 | 0.2617 |
| MCS 1 | QPSK | 196 | 0.3828 |
| MCS 2 | QPSK | 280 | 0.5469 |
| MCS 3 | QPSK | 388 | 0.7578 |
| MCS 4 | 16QAM | 205 | 0.8008 |
| MCS 5 | 16QAM | 287 | 1.1211 |
| MCS 6 | 16QAM | 384 | 1.5000 |
| MCS 7 | 16QAM | 492 | 1.9219 |
| MCS 8 | 64QAM | 350 | 2.0508 |
| MCS 9 | 64QAM | 403 | 2.3613 |
| MCS 10 | 64QAM | 450 | 2.6367 |
| MCS 11 | 64QAM | 502 | 2.9414 |
| MCS 12 | 64QAM | 549 | 3.2168 |
| MCS 13 | 64QAM | 599 | 3.5098 |
| MCS 14 | 64QAM | 652 | 3.8203 |
| MCS 15 | 64QAM | 700 | 4.1016 |
| MCS 16 | 64QAM | 753 | 4.4121 |
| MCS 17 | 64QAM | 802 | 4.6992 |
| MCS 18 | 64QAM | 851 | 4.9863 |
| MCS 19 | 64QAM | 896 | 5.2500 |
| MCS 20 | 256QAM | 676 | 5.2813 |
| MCS 21 | 256QAM | 721 | 5.6328 |
| MCS 22 | 256QAM | 768 | 6.0000 |
| MCS 23 | 256QAM | 808 | 6.3125 |
| MCS 24 | 256QAM | 855 | 6.6797 |
| MCS 25 | 256QAM | 896 | 7.0000 |
| MCS 26 | 1024QAM | 720 | 7.0313 |
| MCS 27 | 1024QAM | 755 | 7.3730 |
| MCS 28 | 1024QAM | 788 | 7.6953 |
| MCS 29 | 1024QAM | 829 | 8.0957 |
| MCS 30 | 1024QAM | 866 | 8.4570 |
| MCS 31 | 1024QAM | 896 | 8.7500 |

FIG. 12

| MCS table | | | |
|---|---|---|---|
| MCS index | Modulation | Efficiency | R |
| MCS 0 | QPSK | 0.289062500 | 0.1445312500 |
| MCS 1 | QPSK | 0.369140625 | 0.1845703125 |
| MCS 2 | QPSK | 0.466796875 | 0.2333984375 |
| MCS 3 | QPSK | 0.580078125 | 0.2900390625 |
| MCS 4 | QPSK | 0.720703125 | 0.3603515625 |
| MCS 5 | QPSK | 0.882812500 | 0.4414062500 |
| MCS 6 | QPSK | 1.058593750 | 0.5292968750 |
| MCS 7 | QPSK | 1.244140625 | 0.6220703125 |
| MCS 8 | QPSK | 1.425781250 | 0.7128906250 |
| MCS 9 | QPSK | 1.601562500 | 0.8007812500 |
| MCS 10 | 16QAM | 1.800781250 | 0.4501953125 |
| MCS 11 | 16QAM | 2.078125000 | 0.5195312500 |
| MCS 12 | 16QAM | 2.402343750 | 0.6005859375 |
| MCS 13 | 16QAM | 2.734375000 | 0.6835937500 |
| MCS 14 | 16QAM | 3.042968750 | 0.7607421875 |
| MCS 15 | 16QAM | 3.332031250 | 0.8330078125 |
| MCS 16 | 16QAM | 3.542968750 | 0.8857421875 |
| MCS 17 | 64QAM | 3.837890625 | 0.6396484375 |
| MCS 18 | 64QAM | 4.212890625 | 0.7021484375 |
| MCS 19 | 64QAM | 4.587890625 | 0.7646484375 |
| MCS 20 | 64QAM | 4.910156250 | 0.8183593750 |
| MCS 21 | 64QAM | 5.250000000 | 0.8750000000 |
| MCS 22 | 64QAM | 5.501953125 | 0.9169921875 |
| MCS 23 | 256QAM | 5.718750000 | 0.7148437500 |
| MCS 24 | 256QAM | 6.179687500 | 0.7724609375 |
| MCS 25 | 256QAM | 6.601562500 | 0.8251953125 |
| MCS 26 | 256QAM | 7.000000000 | 0.8750000000 |
| MCS 27 | 256QAM | 7.320312500 | 0.9150390625 |
| MCS 28 | 1024QAM | 7.500000000 | 0.7500000000 |
| MCS 29 | 1024QAM | 7.929687500 | 0.7929687500 |
| MCS 30 | 1024QAM | 8.359375000 | 0.8359375000 |
| MCS 31 | 1024QAM | 9.228515625 | 0.9228515625 |

FIG. 17

| MCS table | | | |
|---|---|---|---|
| MCS index | Modulation | Code rate×1024 | Efficiency |
| MCS 0 | QPSK | 148 | 0.2891 |
| MCS 1 | QPSK | 189 | 0.3691 |
| MCS 2 | QPSK | 239 | 0.4668 |
| MCS 3 | QPSK | 297 | 0.5801 |
| MCS 4 | QPSK | 369 | 0.7207 |
| MCS 5 | QPSK | 452 | 0.8828 |
| MCS 6 | QPSK | 542 | 1.0586 |
| MCS 7 | QPSK | 637 | 1.2441 |
| MCS 8 | QPSK | 730 | 1.4258 |
| MCS 9 | QPSK | 820 | 0.8008 |
| MCS 10 | 16QAM | 461 | 1.8008 |
| MCS 11 | 16QAM | 532 | 2.0781 |
| MCS 12 | 16QAM | 615 | 2.4023 |
| MCS 13 | 16QAM | 700 | 2.7344 |
| MCS 14 | 16QAM | 779 | 3.0430 |
| MCS 15 | 16QAM | 853 | 3.3320 |
| MCS 16 | 16QAM | 907 | 3.5430 |
| MCS 17 | 64QAM | 655 | 3.8379 |
| MCS 18 | 64QAM | 719 | 4.2129 |
| MCS 19 | 64QAM | 783 | 4.5879 |
| MCS 20 | 64QAM | 838 | 4.9102 |
| MCS 21 | 64QAM | 896 | 5.2500 |
| MCS 22 | 64QAM | 939 | 5.5020 |
| MCS 23 | 256QAM | 732 | 5.7188 |
| MCS 24 | 256QAM | 791 | 6.1797 |
| MCS 25 | 256QAM | 845 | 6.6016 |
| MCS 26 | 256QAM | 896 | 7.0000 |
| MCS 27 | 256QAM | 937 | 7.3203 |
| MCS 28 | 1024QAM | 768 | 7.5000 |
| MCS 29 | 1024QAM | 812 | 7.9297 |
| MCS 30 | 1024QAM | 856 | 8.3594 |
| MCS 31 | 1024QAM | 945 | 9.2285 |

FIG. 18

| MCS index | Modulation | Efficiency | R |
|---|---|---|---|
| MCS 0 | QPSK | 0.2891 | 0.1445 |
| MCS 1 | QPSK | 0.3691 | 0.1846 |
| MCS 2 | QPSK | 0.4668 | 0.2334 |
| MCS 3 | QPSK | 0.5801 | 0.2900 |
| MCS 4 | QPSK | 0.7207 | 0.3604 |
| MCS 5 | QPSK | 0.8828 | 0.4414 |
| MCS 6 | QPSK | 1.0586 | 0.5293 |
| MCS 7 | QPSK | 1.2441 | 0.6221 |
| MCS 8 | QPSK | 1.4258 | 0.7129 |
| MCS 9 | QPSK | 1.6016 | 0.8008 |

(a)

| MCS index | Modulation | Efficiency | R |
|---|---|---|---|
| MCS 10 | 16QAM | 1.8008 | 0.4502 |
| MCS 11 | 16QAM | 2.0781 | 0.5195 |
| MCS 12 | 16QAM | 2.4023 | 0.6006 |
| MCS 13 | 16QAM | 2.7344 | 0.6836 |
| MCS 14 | 16QAM | 3.0430 | 0.7607 |
| MCS 15 | 16QAM | 3.3320 | 0.8330 |
| MCS 16 | 16QAM | 3.5430 | 0.8857 |

(b)

| MCS index | Modulation | Efficiency | R |
|---|---|---|---|
| MCS 17 | 64QAM | 3.8379 | 0.6396 |
| MCS 18 | 64QAM | 4.2129 | 0.7021 |
| MCS 19 | 64QAM | 4.5879 | 0.7646 |
| MCS 20 | 64QAM | 4.9102 | 0.8184 |
| MCS 21 | 64QAM | 5.2500 | 0.8750 |
| MCS 22 | 64QAM | 5.5020 | 0.9170 |

(c)

| MCS index | Modulation | Efficiency | R |
|---|---|---|---|
| MCS 23 | 256QAM | 5.7188 | 0.7148 |
| MCS 24 | 256QAM | 6.1797 | 0.7725 |
| MCS 25 | 256QAM | 6.6016 | 0.8252 |
| MCS 26 | 256QAM | 7.0000 | 0.8750 |
| MCS 27 | 256QAM | 7.3203 | 0.9150 |

(d)

| MCS index | Modulation | Efficiency | R |
|---|---|---|---|
| MCS 28 | 1024QAM | 7.5000 | 0.7500 |
| MCS 29 | 1024QAM | 7.9297 | 0.7930 |
| MCS 30 | 1024QAM | 8.3594 | 0.8359 |
| MCS 31 | 1024QAM | 9.2285 | 0.9229 |

INFORMATION TRANSMISSION METHOD AND APPARATUS BASED ON A LIST OF MODULATION CODING SCHEME

CROSS-REFERENCE TO RELATED APPLICATIONS

This application is a continuation of International Application No. PCT/CN2021/074213, filed on Jan. 28, 2021, which claims priority to International Application No. PCT/CN2020/112744, filed on Aug. 31, 2020. The disclosures of the aforementioned applications are hereby incorporated by reference in their entireties.

TECHNICAL FIELD

The present application relates to the fields of communication technologies and connected vehicles, in particular, to the field of short-range wireless communication technologies, for example, cockpit domain communication, and specifically, to an information transmission method and apparatus.

BACKGROUND

With continuous development of global communication technologies, development speeds and application of wireless communication technologies are in full swing. Intelligent terminals, for example, an intelligent transportation device, a smart home device, and a robot, based on the wireless communication technologies are gradually entering people's daily life. For example, the intelligent terminal is the intelligent transportation device. Development and application of Internet of vehicles technologies are increasingly concerned by people, and vehicle-mounted wireless can further reduce a quantity, lengths, and weights of harnesses in a vehicle, and can reduce installation and maintenance costs of software and hardware in the vehicle. However, as functions of the vehicle become increasingly complex, a quantity and types of communication nodes in the vehicle increase, and there is a higher requirement imposed on a vehicle-mounted wireless communication capability.

In a wireless communication process, a communication channel changes randomly, and has frequency selectivity and a time-varying characteristic. However, with an increasing quantity of service types on the intelligent terminal, in a data transmission process of a plurality of service types, how to improve flexibility and reliability of data transmission is a technical problem to be urgently resolved.

SUMMARY

Embodiments of this application provide an information transmission method and apparatus, to improve flexibility of selecting a modulation mode, and improve efficiency and reliability of data transmission.

According to a first aspect, an embodiment of this application provides an information transmission method, including:

a first node receives a first modulation and coding scheme (MCS) index from a second node, where the first MCS index corresponds to a first modulation mode; and the first node receives data from the second node or sends data to the second node based on the first modulation mode, where a first MCS information subset in which the first MCS index is located belongs to a predefined MCS information set, and the predefined MCS information set includes 32 MCS information subsets; and the first MCS information subset includes first spectral efficiency and/or a first code rate corresponding to the first MCS index, and the first modulation mode or a modulation order corresponding to the first modulation mode, and the first code rate is a ratio of spectral efficiency corresponding to the first MCS index to the modulation order corresponding to the first modulation mode.

According to the foregoing method, the first node can receive the first MCS index, and send or receive the data based on the first modulation mode corresponding to the first MCS index. In this way, a modulation scheme (which specifically includes a modulation mode, spectral efficiency, a code rate, or the like) can be dynamically adjusted based on different MCS indexes. For example, when a channel condition is poor, a modulation mode (which may specifically further include corresponding spectral efficiency or a corresponding code rate) corresponding to a smaller MCS index in the 32 MCS information subsets can be selected to send or receive the data. When the channel condition is good, a modulation mode corresponding to a larger MCS index in the 32 MCS information subsets can be selected to send or receive the data. This improves flexibility of selecting the modulation mode, maximizes a transmission capability of a wireless channel, and improves efficiency and reliability of data transmission.

In a possible implementation of the first aspect, the method further includes: The first node reports a signal to interference plus noise ratio (SINR) indicator to the second node. The first MCS index corresponds to the SINR indicator.

It can be learned that, because a wireless communication channel changes randomly, the first node can report the SINR indicator, and the SINR indicator may correspond to channel quality, so that the second node can dynamically adjust a modulation and coding mode based on the channel quality, to change a transmission rate.

According to a second aspect, an embodiment of this application provides an information transmission method, including:

a second node sends a first modulation and coding scheme MCS index to a first node, where the first MCS index corresponds to a first modulation mode; and the second node receives data from the first node or sends data to the first node based on the first modulation mode, where a first MCS information subset in which the first MCS index is located belongs to a predefined MCS information set, and the predefined MCS information set includes 32 MCS information subsets; and the first MCS information subset includes first spectral efficiency and/or a first code rate corresponding to the first MCS index, and the first modulation mode or a modulation order corresponding to the first modulation mode, and the first code rate is a ratio of spectral efficiency corresponding to the first MCS index to the modulation order corresponding to the first modulation mode.

According to the foregoing method, the second node can determine an MCS index, and send the MCS index to the first node. The second node sends the data to the first node or receives the data from the first node based on the first modulation mode corresponding to the first MCS index. In this way, a modulation scheme (which specifically includes a modulation mode, spectral efficiency, a code rate, or the like) can be dynamically adjusted based on different MCS indexes. For example, when a channel condition is poor, a modulation mode and spectral efficiency that correspond to a smaller MCS index in the 32 MCS information subsets can be selected to send or receive the data. When the channel condition is good, a modulation mode corresponding to a larger MCS index in the 32 MCS information subsets can be selected to send or receive the data. This improves flexibility of selecting the modulation mode, maximizes a transmission capability of a wireless channel, and improves efficiency and reliability of data transmission.

In a possible implementation of the second aspect, the method further includes:

the second node receives a signal to interference plus noise ratio SINR indicator reported by the first node; and the second node determines the first MCS index based on the SINR indicator.

It can be learned that, because a wireless communication channel changes randomly, the first node can report the SINR indicator, and the SINR indicator may correspond to channel quality, so that the second node can dynamically adjust a modulation and coding mode based on the channel quality, to change a transmission rate.

In any possible implementation of the first aspect and the second aspect, each MCS information subset in the predefined MCS information set includes a corresponding MCS index, spectral efficiency and/or a code rate corresponding to the MCS index, and a modulation mode corresponding to the MCS index or a modulation order of the modulation mode. The code rate is a ratio of the spectral efficiency corresponding to the MCS index to the modulation order corresponding to the modulation mode. It may also be understood that the predefined MCS information set includes M (for example, M=32) MCS information subsets, the M MCS information subsets do not include a reserved entry, and there is no spectral efficiency and/or code rate corresponding to the corresponding MCS index in the reserved entry, or in other words, spectral efficiency and/or a code rate corresponding to an MCS index in the reserved entry is reserved.

In a possible implementation of the first aspect and the second aspect, the predefined MCS information set includes at least one of quadrature phase shift keying (QPSK), 16 quadrature amplitude modulation (QAM), 64QAM, 256QAM, or 1024QAM.

The foregoing describes the modulation mode included in the predefined MCS information set. Because different nodes support different modulation modes, a plurality of modulation modes can be used by a node to select a modulation mode and spectral efficiency that correspond to modulation, based on a modulation mode supported by the node.

Usually, a higher-order modulation mode has higher transmission efficiency but a lower anti-noise capability, and a lower-order modulation mode has lower transmission efficiency but a higher anti-noise capability. In addition, the higher-order modulation mode further has a higher device requirement on a transmit end node. The transmit end node can select a modulation mode and spectral efficiency, that correspond to modulation, based on a modulation mode supported by the transmit end node, to achieve higher transmission efficiency. For example, a scenario of vehicle-mounted wireless communication is greatly different from a conventional communication scenario, for example, a macro base station or a cell, and channel conditions for vehicle-mounted wireless signal transmission are also greatly different. Signal and interference plus noise ratios SINRs of received signals in vehicle-mounted communication are more ideal in distribution. Therefore, the higher-order modulation mode (for example, 1024QAM) can be introduced for a vehicle (or a specific node in a vehicle) to select.

In another possible implementation of the first aspect and the second aspect, there are nine MCS information subsets whose modulation modes are QPSK in the predefined MCS information set, and/or a spectral efficiency set corresponding to the MCS information subsets whose modulation modes are QPSK is {0.2891, 0.3691, 0.4668, 0.5801, 0.7207, 0.8828, 1.0586, 1.2441, 1.4258}, or a code rate set corresponding to the MCS information subsets is {0.1445, 0.1846, 0.2334, 0.2900, 0.3604, 0.4414, 0.5293, 0.6221, 0.7129}.

The foregoing describes one possible quantity of the MCS information subsets whose modulation modes are QPSK in the 32 information subsets. Because a performance difference between different modulation modes is great, a relationship between a signal to noise ratio and a block error rate is reflected as that signal to noise ratios required by the different modulation modes for reaching a target block error rate differ greatly. For example, when a code rate is 0.15, based on the case that a polar code with a 1024-bit code length reaches a block error rate of $10^{-3}$, the QPSK modulation mode requires a signal to noise ratio of approximately −4 dB, but in a channel condition in which a code rate is 0.35, based on the case that the polar code with the 1024-bit code length reaches the block error rate of $10^{-3}$, 16QAM requires a signal to noise ratio of approximately 5 dB. A performance difference between the two modulation schemes (which specifically include the modulation modes, and further include the code rates or spectral efficiency) is great. In a communication system, if a performance difference between modulation schemes is great, to meet a block error rate requirement, a smaller quantity of modulation schemes can be selected within a signal to noise ratio range. In this case, it is difficult to meet a user requirement. Therefore, in the foregoing solution, the nine information subsets whose modulation modes are QPSK enable the performance difference between the modulation schemes to be small, so that a device that supports QPSK can appropriately select a better modulation scheme within a signal to noise ratio range. Further, in the MCS information subsets whose modulation modes are QPSK, an interval between two adjacent code rates is small and even. In this way, a higher-order modulation scheme can be selected as much as possible within the signal to noise ratio range, to improve a rate and reliability of data transmission.

In still another possible implementation of the first aspect and the second aspect, there are 10 MCS information subsets whose modulation modes are QPSK in the predefined MCS information set, and a spectral efficiency set corresponding to the MCS information subsets whose modulation modes are QPSK is {0.2891, 0.3691, 0.4668, 0.5801, 0.7207, 0.8828, 1.0586, 1.2441, 1.4258, 1.6016}, or a code rate set corresponding to the MCS information subsets is {0.1445, 0.1846, 0.2334, 0.2900, 0.3604, 0.4414, 0.5293, 0.6221, 0.7129, 0.8008}.

The foregoing describes one possible quantity of the MCS information subsets whose modulation modes are QPSK in the 32 information subsets. Because a performance difference between different modulation modes is great, a relationship between a signal to noise ratio and a block error rate is reflected as that signal to noise ratios required by the different modulation modes for reaching a target block error rate differ greatly. For example, when a code rate is 0.15, based on the case that a polar code with a 1024-bit code length reaches a block error rate of $10^{-3}$, the QPSK modulation mode requires a signal to noise ratio of approximately −4 dB, but in a channel condition in which a code rate is 0.45, based on the case that the polar code with the 1024-bit code length reaches the block error rate of $10^{-3}$, 16QAM requires a signal to noise ratio of approximately 6.5 dB. A performance difference between the two modulation schemes (which specifically include the modulation modes, and further include the code rates or spectral efficiency) is great. In a communication system, if a performance difference between modulation schemes is great, to meet a block error rate requirement, a smaller quantity of modulation schemes can be selected within a signal to noise ratio range. In this case, it is difficult to meet a user requirement. Therefore, in the foregoing solution, the 10 information subsets whose modulation modes are QPSK enable the performance difference between the modulation schemes to be small, so that a device that supports QPSK can appropriately select a better modulation scheme within a signal to noise ratio range. Further, in the MCS information subsets whose modulation modes are QPSK, an interval between two adjacent code rates is small and even. In this way, a higher-order modulation scheme can be selected as much as possible within the signal to noise ratio range, to improve a rate and reliability of data transmission. Further, in the foregoing solution, a highest code rate in the information subset is 0.8008, so that the device that supports QPSK can achieve a high throughput.

In still another possible implementation of the first aspect and the second aspect, there are seven, eight, nine, or 10 MCS information subsets whose modulation modes are QPSK in the predefined MCS information set, and a spectral efficiency set corresponding to the MCS information subsets whose modulation modes are QPSK includes the universal set or a subset of a set {0.2891, 0.3691, 0.4668, 0.5801, 0.7207, 0.8828, 1.0586, 1.2441, 1.4258, 1.6016}, or a code rate set corresponding to the MCS information subsets includes the universal set or a subset of a set {0.1445, 0.1846, 0.2334, 0.2900, 0.3604, 0.4414, 0.5293, 0.6221, 0.7129, 0.8008}. For example, if a quantity of the MCS information subsets whose modulation modes are QPSK is one of 7 to 10, a spectral efficiency set corresponding to the MCS information subsets whose modulation modes are QPSK includes the subset of {0.2891, 0.3691, 0.4668, 0.5801, 0.7207, 0.8828, 1.0586, 1.2441, 1.4258, 1.6016}. For example, the subset is {0.4668, 0.5801, 0.7207, 0.8828, 1.0586, 1.2441, 1.4258, 1.6016}. For another example, when a quantity of the MCS information subsets whose modulation modes are QPSK is 10, a spectral efficiency set corresponding to the MCS information subsets whose modulation modes are QPSK includes a proper subset of {0.2891, 0.3691, 0.4668, 0.5801, 0.7207, 0.8828, 1.0586, 1.2441, 1.4258, 1.6016}, but is not {0.2891, 0.3691, 0.4668, 0.5801, 0.7207, 0.8828, 1.0586, 1.2441, 1.4258. 1.6016}. For descriptions of the code rate set, correspondingly refer to the descriptions of the frequency efficiency set.

The foregoing describes one possible quantity of the MCS information subsets whose modulation modes are QPSK in the 32 information subsets. Therefore, in the foregoing solution, the information subsets whose modulation modes are QPSK and design quantity is more flexible enable a performance difference between the modulation schemes to be small, so that a device that supports QPSK can appropriately select a better modulation scheme within a signal to noise ratio range. Further, in the MCS information candidate subsets whose modulation modes are QPSK, an interval between two adjacent code rates is small and even. A system can comprehensively select an appropriate MCS information subset based on an application scenario, to achieve balance between performance and complexity.

In still another possible implementation of the first aspect and the second aspect, there are four MCS information subsets whose modulation modes are 16QAM in the predefined MCS information set, and/or a spectral efficiency set corresponding to the MCS information subsets whose modulation modes are 16QAM is {1.5273, 1.8008, 2.0781, 2.4023}, or a code rate set corresponding to the MCS information subsets is {0.3818, 0.4502, 0.5195, 0.6006}.

In still another possible implementation of the first aspect and the second aspect, there are seven MCS information subsets whose modulation modes are 16QAM in the predefined MCS information set, and a spectral efficiency set corresponding to the MCS information subsets whose modulation modes are 16QAM is {1.8008, 2.0781, 2.4023, 2.7344, 3.0430, 3.3320, 3.5430}, or a code rate set corresponding to the MCS information subsets is {0.4502, 0.5195, 0.6006, 0.6836, 0.7607, 0.8330, 0.8857}. In still another possible implementation of the first aspect and the second aspect, there are four, five, six, or seven MCS information subsets whose modulation modes are 16QAM in the predefined MCS information set, and a spectral efficiency set corresponding to the MCS information subsets whose modulation modes are 16QAM includes the universal set or a subset of a set {1.8008, 2.0781, 2.4023, 2.7344, 3.0430, 3.3320, 3.5430}, or a code rate set corresponding to the MCS information subset includes the universal set or a subset of a set {0.4502, 0.5195, 0.6006, 0.6836, 0.7607, 0.8330, 0.8857}. For example, if a quantity of the MCS information subsets whose modulation modes are 16QAM is one of 4 to 7, a spectral efficiency set corresponding to the MCS information subsets whose modulation modes are QPSK includes the subset of {1.8008, 2.0781, 2.4023, 2.7344, 3.0430, 3.3320, 3.5430}, for example, {2.0781, 2.4023, 2.7344, 3.0430, 3.3320, 3.5430}. For another example, when a quantity of the MCS information subsets whose modulation modes are 16QAM is 7, a spectral efficiency set corresponding to the MCS information subsets whose modulation modes are QPSK includes a proper subset of {1.8008, 2.0781, 2.4023, 2.7344, 3.0430, 3.3320, 3.5430}, but is not {1.8008, 2.0781, 2.4023, 2.7344, 3.0430, 3.3320, 3.5430}. For descriptions of the code rate set, correspondingly refer to the descriptions of the frequency efficiency set.

The foregoing describes several possible quantities of the MCS information subsets whose modulation modes are 16QAM in the 32 information subsets, so that a device that supports 16QAM can select a better modulation scheme. Further, in the MCS information subsets whose modulation modes are 16QAM, an interval between two adjacent code rates is small and even. Therefore, the higher-order modulation scheme can be selected as much as possible when the modulation scheme is determined, to improve the rate and reliability of data transmission.

In still another possible implementation of the first aspect and the second aspect, there are nine MCS information subsets whose modulation modes are 64QAM in the predefined MCS information set, and/or a spectral efficiency set corresponding to the MCS information subsets whose modulation modes are 64QAM is {2.4199, 2.7480, 3.1055, 3.4746, 3.8379, 4.2129, 4.5879, 4.9102, 5.2500}, or a code rate set corresponding to the MCS information subsets is {0.4033, 0.4580, 0.5176, 0.5791, 0.6396, 0.7021, 0.7646, 0.8184, 0.8750}.

In still another possible implementation of the first aspect and the second aspect, there are six MCS information subsets whose modulation modes are 64QAM in the predefined MCS information set, and/or a spectral efficiency set corresponding to the MCS information subsets whose modulation modes are 64QAM is {3.8379, 4.2129, 4.5879, 4.9102, 5.2500, 5.5020}, or a code rate set corresponding to the MCS information subsets is {0.6396, 0.7021, 0.7646, 0.8184, 0.8750, 0.9170}.

In still another possible implementation of the first aspect and the second aspect, there are six, seven, eight, or nine MCS information subsets whose modulation modes are 64QAM in the predefined MCS information set, and a spectral efficiency set corresponding to the MCS information subsets whose modulation modes are 64QAM includes the universal set or a subset of a set {3.8379, 4.2129, 4.5879, 4.9102, 5.2500, 5.5020}, or a code rate set corresponding to the MCS information subset includes the universal set or a subset of a set {0.6396, 0.7021, 0.7646, 0.8184, 0.8750, 0.9170}. For example, if there are eight MCS information subsets whose modulation modes are 64QAM in the predefined MCS information set, a spectral efficiency set corresponding to the eight MCS information subsets whose modulation modes are 64QAM includes the set {3.8379, 4.2129, 4.5879, 4.9102, 5.2500, 5.5020}, or includes a proper subset but does not include the universal set of the set {3.8379, 4.2129, 4.5879, 4.9102, 5.2500, 5.5020}. For descriptions of the code rate set, correspondingly refer to the descriptions of the frequency efficiency set.

The foregoing describes several possible quantities of the MCS information subsets whose modulation modes are 64QAM in the 32 information subsets, so that a device that supports 64QAM can select a better modulation scheme. Further, in the MCS information subsets whose modulation modes are 64QAM, an interval between two adjacent code rates is small and even. Therefore, the higher-order modulation scheme can be selected as much as possible when the modulation scheme is determined, to improve the rate and reliability of data transmission.

In still another possible implementation of the first aspect and the second aspect, there are five MCS information subsets whose modulation modes are 256QAM in the predefined MCS information set. A spectral efficiency set corresponding to the MCS information subsets whose modulation modes are 256QAM is {5.2813, 5.7188, 6.1797, 6.6016, 7.0000}, or includes a proper subset of {5.2813, 5.7188, 6.1797, 6.6016, 7.0000}, or a code rate set corresponding to the MCS information subsets is {0.6602, 0.7148, 0.7725, 0.8252, 0.8750}, or includes a proper subset of {0.6602, 0.7148, 0.7725, 0.8252, 0.8750}. Alternatively, a spectral efficiency set corresponding to the MCS information subsets whose modulation modes are 256QAM is {5.7188, 6.1797, 6.6016, 7.0000, 7.3203}, or includes a proper subset of {5.7188, 6.1797, 6.6016, 7.0000, 7.3203}, or a code rate set corresponding to the MCS information subsets is {0.7148, 0.7725, 0.8252, 0.8750, 0.9150}, or includes a proper subset of {0.7148, 0.7725, 0.8252, 0.8750, 0.9150}.

The foregoing describes one possible quantity of the MCS information subsets whose modulation modes are 256QAM in the 32 information subsets, and a device that supports 256QAM can select a modulation scheme with better performance by using the five information subsets whose modulation modes are 256QAM. Further, in the MCS information subsets whose modulation modes are 256QAM, an interval between two adjacent code rates is small and even. Therefore, the higher-order modulation scheme can be selected as much as possible when the modulation scheme is determined, to improve the rate and reliability of data transmission.

In still another possible implementation of the first aspect and the second aspect, there are five MCS information subsets whose modulation modes are 1024QAM in the predefined MCS information set, and/or a spectral efficiency set corresponding to the MCS information subsets whose modulation modes are 1024QAM is {7.0996, 7.5000, 7.9297, 8.3594, 8.7500}, or a code rate set corresponding to the MCS information subsets is {0.7100, 0.7500, 0.7930, 0.8359, 0.8750}.

In still another possible implementation of the first aspect and the second aspect, there are four MCS information subsets whose modulation modes are 1024QAM in the predefined MCS information set, and a spectral efficiency set corresponding to the MCS information subsets whose modulation modes are 1024QAM is {7.5000, 7.9297, 8.3594, 9.2285}, or a code rate set corresponding to the MCS information subsets is {0.7500, 0.7930, 0.8359, 0.9229}.

In still another possible implementation of the first aspect and the second aspect, there are four or five MCS information subsets whose modulation modes are 1024QAM in the predefined MCS information set, and a spectral efficiency set corresponding to the MCS information subsets whose modulation modes are 1024QAM includes the universal set or a subset of a set {7.5000, 7.9297, 8.3594, 9.2285}, or a code rate set corresponding to the MCS information subsets includes the universal set or a subset of a set {0.7500, 0.7930, 0.8359, 0.9229}. For example, if there are five MCS information subsets whose modulation modes are 1024QAM in the predefined MCS information set, a spectral efficiency set corresponding to the MCS information subsets whose modulation modes are 1024QAM includes the universal set or a proper subset of the set {7.5000, 7.9297, 8.3594, 9.2285}, or a code rate set corresponding to the MCS information subsets includes the universal set or a proper subset of the set {0.7500, 0.7930, 0.8359, 0.9229}.

The foregoing describes one possible quantity of the MCS information subsets whose modulation modes are 1024QAM in the 32 information subsets, so that a device that supports 1024QAM can select a better modulation scheme. Further, in the MCS information subsets whose modulation modes are 1024QAM, an interval between two adjacent code rates is small and even. Therefore, the higher-order modulation scheme can be selected as much as possible when the modulation scheme is determined, to improve the rate and reliability of data transmission.

In still another possible implementation of the first aspect and the second aspect, there is an information subset whose code rate is greater than or equal to a predefined value in the predefined MCS information set. For example, the predefined value is 0.875.

To further improve a system throughput, the code rate may be increased to a higher value greater than or equal to, for example, 12/13 or 0.9229. Optionally, there is an information subset whose code rate is greater than or equal to 0.9229 in the predefined MCS information set.

The code rate is also referred to as a code rate, code efficiency, or a code rate, and is a proportion of wanted data in a data stream. A larger code rate indicates a larger proportion of wanted data and higher information transmission efficiency. Usually, when the channel quality is poor, more redundant information needs to be added to ensure that a receive end can correctly demodulate a signal. In this case, the code rate is lower. When the channel quality is good, few redundancy check bits can correctly demodulate the signal. In this case, the code rate is higher. Therefore, an appropriate code rate is selected based on a channel change, so that a user with the good channel quality can obtain a higher information transmission rate.

In the foregoing implementation, because there is the information subset whose code rate is greater than or equal to 0.875 in the information set, when the channel quality is good, a modulation mode corresponding to an information subset whose code rate is greater than 0.875, for example, 0.9229, can be selected for modulation, to improve efficiency of data transmission.

In still another possible implementation of the first aspect and the second aspect, in the information subsets whose modulation modes are 1024QAM, 256QAM, and 64QAM in the predefined MCS information set, there is the information subset whose code rate is greater than or equal to 0.875 in information subsets corresponding to one or more modulation modes. Alternatively, in the information subsets whose modulation modes are 1024QAM, 256QAM, and 64QAM in the predefined MCS information set, there is the information subset whose code rate is greater than or equal to 0.9229 in information subsets corresponding to one or more modulation modes.

In still another possible implementation of the first aspect and the second aspect, for the plurality of MCS information subsets, an interval between a first reference code rate difference and a difference between code rates corresponding to any two adjacent indexes whose corresponding modulation modes are the same is less than or equal to a first code rate threshold.

The foregoing describes a code rate distribution rule between information subsets whose modulation modes are the same. A difference between two adjacent code rates is always distributed within a specific range. When the rule is reflected, the difference between the two adjacent code rates is always distributed around the first reference code rate difference, and an interval (or a deviation) between the difference and the first reference code rate difference is less than or equal to the first code rate threshold (for example, the first reference code rate difference is 0.07, and the first code rate threshold is 0.045. The difference between the two adjacent code rates is always approximately 0.07, and the interval between the difference and 0.07 does not exceed 0.045. In other words, the difference between the code rates falls within an interval [0.025, 0.15]). Therefore, the interval between the code rates is small and even. In this way, the higher-order modulation scheme can be selected as much as possible within the signal to noise ratio range, to improve the rate and reliability of data transmission. The first reference code rate difference is used to describe the code rate distribution rule, and may not be a fixed value.

In still another possible implementation of the first aspect and the second aspect, there are four MCS information subsets whose modulation modes are QPSK in the predefined MCS information set, and/or a spectral efficiency set corresponding to the MCS information subsets whose modulation modes are QPSK is {0.3086, 0.4453, 0.6309, 0.8652}, or a code rate set corresponding to the MCS information subsets is {0.1543, 0.2227, 0.3154, 0.4326}.

The foregoing describes another possible quantity of the MCS information subsets whose modulation modes are QPSK in the 32 information subsets. Because QPSK has a good anti-noise capability but low efficiency of data transmission, QSPK is usually used on a channel with a low SNR. However, because an SNR in some scenarios is high, for example, a vehicle-mounted wireless channel, to adapt to the scenario with the high SNR, a quantity of the QPSK modulation modes can be reduced or an interval between code rates of the QPSK modulation mode can be increased. A performance difference between modulation modes working in a low signal to noise ratio is increased, so that a performance difference between modulation modes working in a high signal to noise ratio is reduced, to improve transmission efficiency and reliability of a communication system working in the scenario with the high signal to noise ratio.

In still another possible implementation of the first aspect and the second aspect, there are seven MCS information subsets whose modulation modes are 16QAM in the predefined MCS information set, and/or a spectral efficiency set corresponding to the MCS information subsets whose modulation modes are 16QAM is {0.9219, 1.1211, 1.3203, 1.5586, 1.8203, 2.0781, 2.3594}, or a code rate set corresponding to the MCS information subsets is {0.2305, 0.2803, 0.3301, 0.3896, 0.4551, 0.5195, 0.5898}.

In still another possible implementation of the first aspect and the second aspect, there are 10 MCS information subsets whose modulation modes are 64QAM in the predefined MCS information set, and/or a spectral efficiency set corresponding to the MCS information subsets whose modulation modes are 64QAM is {2.3613, 2.6660, 2.9766, 3.2813, 3.6445, 3.9785, 4.3066, 4.6523, 4.9512, 5.2500}, or a code rate set corresponding to the MCS information subsets is {0.3936, 0.4443, 0.4961, 0.5469, 0.6074, 0.6631, 0.7178, 0.7754, 0.8252, 0.8750}.

In still another possible implementation of the first aspect and the second aspect, there are six MCS information subsets whose modulation modes are 256QAM in the predefined MCS information set, and/or a spectral efficiency set corresponding to the MCS information subsets whose modulation modes are 256QAM is {5.2813, 5.6328, 6.0000, 6.3125, 6.6797, 7.0000}, or a code rate set corresponding to the MCS information subsets is {0.6602, 0.7041, 0.7500, 0.7891, 0.8350, 0.8750}.

In still another possible implementation of the first aspect and the second aspect, there are five MCS information subsets whose modulation modes are 1024QAM in the predefined MCS information set, and/or a spectral efficiency set corresponding to the MCS information subsets whose modulation modes are 1024QAM is {7.0996, 7.5000, 7.9297, 8.3594, 8.7500}, or a code rate set corresponding to the MCS information subsets is {0.7100, 0.7500, 0.7930, 0.8359, 0.8750}.

In still another possible implementation of the first aspect and the second aspect, for information subsets whose modulation modes are 16QAM, 64QAM, or 1024QAM in the MCS information set, an interval between a second reference code rate difference and a difference between code rates corresponding to any two adjacent indexes whose corresponding modulation modes are the same is less than or equal to a second code rate threshold. Further, the second reference code rate difference is less than the first reference code rate difference, and the second code rate threshold is less than the first code rate threshold.

The foregoing describes a code rate distribution rule between information subsets whose modulation modes are the same in the information subsets whose modulation modes are 16QAM, 64QAM, or 1024QAM. Compared with QPSK, 16QAM, 64QAM, or 1024QAM has a higher information transmission rate but a poorer anti-noise capability, and therefore, works on a channel with a high signal to noise ratio. However, in a communication scenario, for example, vehicle-mounted communication, a signal to noise ratio of a channel is high. Therefore, in this scenario, an interval between code rates of the information subsets of 16QAM, 64QAM, or 1024QAM may be reduced, so that the performance difference between the modulation modes working in the high signal to noise ratio is small, to improve transmission efficiency and reliability of the communication system working in the scenario with the high signal to noise ratio.

It should be noted that the second reference code rate difference and the second code rate threshold are used to describe the code rate distribution rule, and may not be fixed values. For example, the second reference code rate difference may be 0.055, and the second code rate threshold is 0.02. In this way, a difference between two adjacent code rates falls within a range of an interval [0.035, 0.075], and a performance difference between modulation modes is small.

In still another possible implementation of the first aspect and the second aspect, there are four MCS information subsets whose modulation modes are QPSK in the predefined MCS information set, and/or a spectral efficiency set corresponding to the MCS information subsets whose modulation modes are QPSK is {0.2617, 0.3828, 0.5469, 0.7578}, or a code rate set corresponding to the MCS information subsets is {0.1309, 0.1914, 0.2734, 0.3789}.

The foregoing describes still another possible quantity of the MCS information subsets whose modulation modes are QPSK in the 32 information subsets. A performance difference between modulation modes working in a low signal to noise ratio is increased, so that a performance difference between modulation modes working in a high signal to noise ratio is reduced, to improve transmission efficiency and reliability of a communication system working in a scenario with a high signal to noise ratio.

In still another possible implementation of the first aspect and the second aspect, there are four MCS information subsets whose modulation modes are 16QAM in the predefined MCS information set, and/or a spectral efficiency set corresponding to the MCS information subsets whose modulation modes are QPSK is {0.8008, 1.1211, 1.5000, 1.9219}, or a code rate set corresponding to the MCS information subsets is {0.2002, 0.2803, 0.3750, 0.4805}.

In still another possible implementation of the first aspect and the second aspect, there are 12 MCS information subsets whose modulation modes are 64QAM in the predefined MCS information set, and/or a spectral efficiency set corresponding to the MCS information subsets whose modulation modes are 64QAM is {2.0508, 2.3613, 2.6367, 2.9414, 3.2168, 3.5098, 3.8203, 4.1016, 4.4121, 4.6992, 4.9863, 5.2500}, or a code rate set corresponding to the MCS information subsets is {0.3418, 0.3936, 0.4395, 0.4902, 0.5361, 0.5850, 0.6367, 0.6836, 0.7354, 0.7832, 0.8311, 0.8750}.

In still another possible implementation of the first aspect and the second aspect, there are six MCS information subsets whose modulation modes are 256QAM in the predefined MCS information set, and/or a spectral efficiency set corresponding to the MCS information subsets whose modulation modes are 256QAM is {5.2813, 5.6328, 6.0000, 6.3125, 6.6797, 7.0000}, or a code rate set corresponding to the MCS information subsets is {0.6602, 0.704, 0.7500, 0.7891, 0.8350, 0.8750}.

In still another possible implementation of the first aspect and the second aspect, there are six MCS information subsets whose modulation modes are 1024QAM in the predefined MCS information set, and/or a spectral efficiency set corresponding to the MCS information subsets whose modulation modes are 1024QAM is {7.0313, 7.3730, 7.6953, 8.0957, 8.4570, 8.7500}, or a code rate set corresponding to the MCS information subsets is {0.7031, 0.7373, 0.7695, 0.8096, 0.8457, 0.8750}.

In still another possible implementation of the first aspect and the second aspect, when a modulation mode and spectral efficiency or a code rate that correspond to any MCS index in the 32 MCS information subsets are used to modulate a wireless communication signal, a signal to noise ratio required for reaching the target block error rate falls within an interval [−5 dB, 30 dB] or [−5 dB, 32 dB].

According to a third aspect, an embodiment of this application provides an information transmission apparatus, including:

a communication unit, configured to receive a first modulation and coding scheme MCS index from a second node, where the first MCS index corresponds to a first modulation mode; and a processing unit, configured to receive, by using the communication unit, data from the second node or send, by using the communication unit, data to the second node based on the first MCS index, where a first MCS information subset in which the first MCS index is located belongs to a predefined MCS information set, and the predefined MCS information set includes 32 MCS information subsets; and the first MCS information subset includes first spectral efficiency and/or a first code rate corresponding to the first MCS index, and the first modulation mode or a modulation order corresponding to the first modulation mode, and the first code rate is a ratio of spectral efficiency corresponding to the first MCS index to the modulation order corresponding to the first modulation mode.

It can be learned that the foregoing apparatus can receive an MCS index, and send or receive the data based on the first modulation mode corresponding to the first MCS index. In this way, a modulation scheme (which specifically includes a modulation mode, spectral efficiency, a code rate, or the like) can be dynamically adjusted based on different MCS indexes. For example, when a channel condition is poor, a modulation mode and spectral efficiency that correspond to a smaller MCS index in the 32 MCS information subsets can be selected to send or receive the data. When the channel condition is good, a modulation mode corresponding to a larger MCS index in the 32 MCS information subsets can be selected to send or receive the data. This improves flexibility of selecting the modulation mode, maximizes a transmission capability of a wireless channel, and improves efficiency and reliability of data transmission.

In a possible implementation of the third aspect, the communication unit is further configured to report an SINR indicator to the second node, and the first MCS index corresponds to the SINR indicator.

It can be learned that, because a wireless communication channel changes randomly, the foregoing apparatus can report the SINR indicator, and the SINR indicator may correspond to channel quality, so that the second node can dynamically adjust a modulation and coding mode based on the channel quality, to change a transmission rate.

According to a fourth aspect, an embodiment of this application provides an information transmission apparatus, including:

a communication unit, configured to send a first modulation and coding scheme MCS index to a first node, where the first MCS index corresponds to a first modulation mode; and a processing unit, configured to receive, by using the communication unit, data from the first node or send, by using the communication unit, data to the first node based on the first modulation mode, where a first MCS information subset in which the first MCS index is located belongs to a predefined MCS information set, and the predefined MCS information set includes 32 MCS information subsets; and the first MCS information subset includes first spectral efficiency and/or a first code rate corresponding to the first MCS index, and the first modulation mode or a modulation order corresponding to the first modulation mode, and the first code rate is a ratio of spectral efficiency corresponding to the first MCS index to the modulation order corresponding to the first modulation mode.

It can be learned that the foregoing information transmission apparatus can determine an MCS index, send the MCS index to the first node, and send or receive the data based on the first modulation mode corresponding to the first MCS index. In this way, a modulation scheme (which specifically includes a modulation mode, spectral efficiency, a code rate, or the like) can be dynamically adjusted based on different MCS indexes. For example, when a channel condition is poor, a modulation mode and spectral efficiency that correspond to a smaller MCS index in the 32 MCS information subsets can be selected to send or receive the data. When the channel condition is good, a modulation mode corresponding to a larger MCS index in the 32 MCS information subsets can be selected to send or receive the data. This improves flexibility of selecting the modulation mode, maximizes a transmission capability of a wireless channel, and improves efficiency and reliability of data transmission.

In a possible implementation of the fourth aspect, the communication unit is further configured to receive a signal to interference plus noise ratio SINR indicator reported by the first node; and the processing unit is further configured to determine the first MCS index based on the SINR indicator.

It can be learned that, because a wireless communication channel changes randomly, the first node can report the SINR indicator, and the SINR indicator may correspond to channel quality, so that a second node can dynamically adjust a modulation and coding mode based on the channel quality, to change a transmission rate.

In any possible implementation of the third aspect and the fourth aspect, each MCS information subset in the predefined MCS information set includes an MCS index, spectral efficiency and/or a code rate corresponding to the MCS index, and a modulation mode corresponding to the MCS index or a modulation order of the modulation mode. The code rate is a ratio of the spectral efficiency corresponding to the MCS index to the modulation order corresponding to the modulation mode. It may also be understood that the predefined MCS information set does not include a reserved entry.

In a possible implementation of the third aspect and the fourth aspect, the predefined MCS information set includes at least one of quadrature phase shift keying (QPSK), 16 quadrature amplitude modulation (QAM), 64QAM, 256QAM, or 1024QAM.

The foregoing describes the modulation mode included in the predefined MCS information set. Because different nodes support different modulation modes, a plurality of modulation modes can be used by a node to select a modulation mode and spectral efficiency that correspond to modulation, based on a modulation mode supported by the node.

Usually, a higher-order modulation mode has higher transmission efficiency but a lower anti-noise capability, and a lower-order modulation mode has lower transmission efficiency but a higher anti-noise capability. In addition, the higher-order modulation mode further has a higher device requirement on a transmit end node. The transmit end node can select a modulation mode and spectral efficiency, that correspond to modulation, based on a modulation mode supported by the transmit end node, to achieve higher transmission efficiency. For example, a scenario of vehicle-mounted wireless communication is greatly different from a conventional communication scenario, for example, a macro base station or a cell, and channel conditions for vehicle-mounted wireless signal transmission are also greatly different. Signal and interference plus noise ratios SINRs of received signals in vehicle-mounted communication are more ideal in distribution. Therefore, the higher-order modulation mode (for example, 1024QAM) can be introduced for a vehicle (or a specific node in a vehicle) to select.

In another possible implementation of the third aspect and the fourth aspect, there are nine MCS information subsets whose modulation modes are QPSK in the predefined MCS information set, and/or a spectral efficiency set corresponding to the MCS information subsets whose modulation modes are QPSK is {0.2891, 0.3691, 0.4668, 0.5801, 0.7207, 0.8828, 1.0586, 1.2441, 1.4258}, or a code rate set corresponding to the MCS information subsets is {0.1445, 0.1846, 0.2334, 0.2900, 0.3604, 0.4414, 0.5293, 0.6221, 0.7129}.

In still another possible implementation of the third aspect and the fourth aspect, there are 10 MCS information subsets whose modulation modes are QPSK in the predefined MCS information set, and/or a spectral efficiency set corresponding to the MCS information subsets whose modulation modes are QPSK is {0.2891, 0.3691, 0.4668, 0.5801, 0.7207, 0.8828, 1.0586, 1.2441, 1.4258, 1.6016}, or a code rate set corresponding to the MCS information subsets is {0.1445, 0.1846, 0.2334, 0.2900, 0.3604, 0.4414, 0.5293, 0.6221, 0.7129, 0.8008}.

In still another possible implementation of the third aspect and the fourth aspect, there are four MCS information subsets whose modulation modes are 16QAM in the predefined MCS information set, and/or a spectral efficiency set corresponding to the MCS information subsets whose modulation modes are 16QAM is {1.5273, 1.8008, 2.0781, 2.4023}, or a code rate set corresponding to the MCS information subsets is {0.3818, 0.4502, 0.5195, 0.6006}.

In still another possible implementation of the third aspect and the fourth aspect, there are seven MCS information subsets whose modulation modes are 16QAM in the predefined MCS information set, and/or a spectral efficiency set corresponding to the MCS information subsets whose modulation modes are 16QAM is {1.8008, 2.0781, 2.4023, 2.7344, 3.0430, 3.3320, 3.5430}, or a code rate set corresponding to the MCS information subsets is {0.4502, 0.5195, 0.6006, 0.6836, 0.7607, 0.8330, 0.8857}.

In still another possible implementation of the third aspect and the fourth aspect, there are nine MCS information subsets whose modulation modes are 64QAM in the predefined MCS information set, and/or a spectral efficiency set corresponding to the MCS information subsets whose modulation modes are 64QAM is {2.4199, 2.7480, 3.1055, 3.4746, 3.8379, 4.2129, 4.5879, 4.9102, 5.2500}, or a code rate set corresponding to the MCS information subsets is {0.4033, 0.4580, 0.5176, 0.5791, 0.6396, 0.7021, 0.7646, 0.8184, 0.8750}.

In still another possible implementation of the third aspect and the fourth aspect, there are six MCS information subsets whose modulation modes are 64QAM in the predefined MCS information set, and/or a spectral efficiency set corresponding to the MCS information subsets whose modulation modes are 64QAM is {3.8379, 4.2129, 4.5879, 4.9102, 5.2500, 5.5020}, or a code rate set corresponding to the MCS information subsets is {0.6396, 0.7021, 0.7646, 0.8184, 0.8750, 0.9170}.

In still another possible implementation of the third aspect and the fourth aspect, there are five MCS information subsets whose modulation modes are 256QAM in the predefined MCS information set, and/or a spectral efficiency set corresponding to the MCS information subsets whose modulation modes are 256QAM is {5.2813, 5.7188, 6.1797, 6.6016, 7.0000} or {5.7188, 6.1797, 6.6016, 7.0000, 7.3203}, or a code rate set corresponding to the MCS information subsets is {0.6602, 0.7148, 0.7725, 0.8252, 0.8750} or {0.7148, 0.7725, 0.8252, 0.8750, 0.9150}.

In still another possible implementation of the third aspect and the fourth aspect, there are five MCS information subsets whose modulation modes are 1024QAM in the predefined MCS information set, and/or a spectral efficiency set corresponding to the MCS information subsets whose modulation modes are 1024QAM is {7.0996, 7.5000, 7.9297, 8.3594, 8.7500}, or a code rate set corresponding to the MCS information subsets is {0.7100, 0.7500, 0.7930, 0.8359, 0.8750}.

In still another possible implementation of the third aspect and the fourth aspect, there are four MCS information subsets whose modulation modes are 1024QAM in the predefined MCS information set, and/or a spectral efficiency set corresponding to the MCS information subsets whose modulation modes are 1024QAM is {7.5000, 7.9297, 8.3594, 9.2285}, or a code rate set corresponding to the MCS information subsets is {0.7500, 0.7930, 0.8359, 0.9229}.

In still another possible implementation of the third aspect and the fourth aspect, there is an information subset whose code rate is greater than or equal to a predefined value in the predefined MCS information set. For example, the predefined value is 0.875 or 0.9229.

In still another possible implementation of the third aspect and the fourth aspect, in the information subsets whose modulation modes are 1024QAM, 256QAM, and 64QAM in the predefined MCS information set, there is the information subset whose code rate is greater than or equal to 0.875 or 0.9229 in information subsets corresponding to one or more modulation modes.

In still another possible implementation of the third aspect and the fourth aspect, for the plurality of MCS information subsets, an interval between a first reference code rate difference and a difference between code rates corresponding to any two adjacent indexes whose corresponding modulation modes are the same is less than or equal to a first code rate threshold.

In still another possible implementation of the third aspect and the fourth aspect, there are four MCS information subsets whose modulation modes are QPSK in the predefined MCS information set, and/or a spectral efficiency set corresponding to the MCS information subsets whose modulation modes are QPSK is {0.3086, 0.4453, 0.6309, 0.8652}, or a code rate set corresponding to the MCS information subsets is {0.1543, 0.2227, 0.3154, 0.4326}.

In still another possible implementation of the third aspect and the fourth aspect, there are seven MCS information subsets whose modulation modes are 16QAM in the predefined MCS information set, and/or a spectral efficiency set corresponding to the MCS information subsets whose modulation modes are 16QAM is {0.9219, 1.1211, 1.3203, 1.5586, 1.8203, 2.0781, 2.3594}, or a code rate set corresponding to the MCS information subsets is {0.2305, 0.2803, 0.3301, 0.3896, 0.4551, 0.5195, 0.5898}.

In still another possible implementation of the third aspect and the fourth aspect, there are 10 MCS information subsets whose modulation modes are 64QAM in the predefined MCS information set, and/or a spectral efficiency set corresponding to the MCS information subsets whose modulation modes are 64QAM is {2.3613, 2.6660, 2.9766, 3.2813, 3.6445, 3.9785, 4.3066, 4.6523, 4.9512, 5.2500}, or a code rate set corresponding to the MCS information subsets is {0.3936, 0.4443, 0.4961, 0.5469, 0.6074, 0.6631, 0.7178, 0.7754, 0.8252, 0.8750}.

In still another possible implementation of the third aspect and the fourth aspect, there are six MCS information subsets whose modulation modes are 256QAM in the predefined MCS information set, and/or a spectral efficiency set corresponding to the MCS information subsets whose modulation modes are 256QAM is {5.2813, 5.6328, 6.0000, 6.3125, 6.6797, 7.0000}, or a code rate set corresponding to the MCS information subsets is {0.6602, 0.7041, 0.7500, 0.7891, 0.8350, 0.8750}.

In still another possible implementation of the third aspect and the fourth aspect, there are five MCS information subsets whose modulation modes are 1024QAM in the predefined MCS information set, and/or a spectral efficiency set corresponding to the MCS information subsets whose modulation modes are 1024QAM is {7.0996, 7.5000, 7.9297, 8.3594, 8.7500}, or a code rate set corresponding to the MCS information subsets is {0.7100, 0.7500, 0.7930, 0.8359, 0.8750}.

In still another possible implementation of the third aspect and the fourth aspect, for information subsets whose modulation modes are 16QAM, 64QAM, or 1024QAM in the MCS information set, an interval between a second reference code rate difference and a difference between code rates corresponding to any two adjacent indexes whose corresponding modulation modes are the same is less than or equal to a second code rate threshold. Further, the second reference code rate difference is less than the first reference code rate difference, and the second code rate threshold is less than the first code rate threshold.

In still another possible implementation of the third aspect and the fourth aspect, there are four MCS information subsets whose modulation modes are QPSK in the predefined MCS information set, and/or a spectral efficiency set corresponding to the MCS information subsets whose modulation modes are QPSK is {0.2617, 0.3828, 0.5469, 0.7578}, or a code rate set corresponding to the MCS information subsets is {0.1309, 0.1914, 0.2734, 0.3789}.

The foregoing describes another possible quantity of the MCS information subsets whose modulation modes are QPSK in the 32 information subsets. A performance difference between modulation modes working in a low signal to noise ratio is increased, so that a performance difference between modulation modes working in a high signal to noise ratio is reduced, to improve transmission efficiency and reliability of a communication system working in a scenario with a high signal to noise ratio.

In still another possible implementation of the third aspect and the fourth aspect, there are four MCS information subsets whose modulation modes are 16QAM in the predefined MCS information set, and/or a spectral efficiency set corresponding to the MCS information subsets whose modulation modes are QPSK is {0.8008, 1.1211, 1.5000, 1.9219}, or a code rate set corresponding to the MCS information subsets is {0.2002, 0.2803, 0.3750, 0.4805}.

In still another possible implementation of the third aspect and the fourth aspect, there are 12 MCS information subsets whose modulation modes are 64QAM in the predefined MCS information set, and/or a spectral efficiency set corresponding to the MCS information subsets whose modulation modes are 64QAM is {2.0508, 2.3613, 2.6367, 2.9414, 3.2168, 3.5098, 3.8203, 4.1016, 4.4121, 4.6992, 4.9863, 5.2500}, or a code rate set corresponding to the MCS information subsets is {0.3418, 0.3936, 0.4395, 0.4902, 0.5361, 0.5850, 0.6367, 0.6836, 0.7354, 0.7832, 0.8311, 0.8750}.

In still another possible implementation of the third aspect and the fourth aspect, there are six MCS information subsets whose modulation modes are 256QAM in the predefined MCS information set, and/or a spectral efficiency set corresponding to the MCS information subsets whose modulation modes are 256QAM is {5.2813, 5.6328, 6.0000, 6.3125, 6.6797, 7.0000}, or a code rate set corresponding to the MCS information subsets is {0.6602, 0.704, 0.7500, 0.7891, 0.8350, 0.8750}.

In still another possible implementation of the third aspect and the fourth aspect, there are six MCS information subsets whose modulation modes are 1024QAM in the predefined MCS information set, and/or a spectral efficiency set corresponding to the MCS information subsets whose modulation modes are 1024QAM is {7.0313, 7.3730, 7.6953, 8.0957, 8.4570, 8.7500}, or a code rate set corresponding to the MCS information subsets is {0.7031, 0.7373, 0.7695, 0.8096, 0.8457, 0.8750}.

In still another possible implementation of the third aspect and the fourth aspect, when a modulation mode and spectral efficiency or a code rate that correspond to any MCS index in the 32 MCS information subsets are used to modulate a wireless communication signal, a signal to noise ratio required for reaching a target block error rate falls within an interval [−5 dB, 30 dB] or [−5 dB, 32 dB].

According to a fifth aspect, an embodiment of this application provides an information transmission apparatus, including at least one processor and a communication interface. The at least one processor is configured to invoke a computer program stored in at least one memory, to enable the information transmission apparatus to implement the method according to any one of the first aspect and the possible implementations of the first aspect, or implement the method according to any one of the second aspect and the possible implementations of the second aspect.

According to a sixth aspect, an embodiment of this application provides a chip system, including at least one processor and a communication interface. The at least one processor is configured to invoke a computer program stored in at least one memory, to enable an apparatus in which the chip system is located to implement the method according to any one of the first aspect and the possible implementations of the first aspect, or implement the method according to any one of the second aspect and the possible implementations of the second aspect.

According to a seventh aspect, an embodiment of this application further provides an information transmission system. The information transmission system includes a first node and a second node. The first node includes the information transmission apparatus according to any one of the third aspect and the possible implementations of the third aspect. The second node includes the information transmission apparatus according to any one of the fourth aspect and the possible implementations of the fourth aspect.

According to an eighth aspect, an embodiment of this application discloses a computer-readable storage medium. The computer-readable storage medium stores a computer program. When the computer program is run on one or more processors, the method according to any one of the first aspect and the possible implementations of the first aspect is implemented, or the method according to any one of the second aspect and the possible implementations of the second aspect is implemented.

According to a ninth aspect, an embodiment of this application discloses a computer program product. When the computer program product runs on one or more processors, the method according to any one of the first aspect and the possible implementations of the first aspect is implemented, or the method according to any one of the second aspect and the possible implementations of the second aspect is implemented.

According to a tenth aspect, an embodiment of this application discloses a terminal. The terminal may be an intelligent cockpit product, a vehicle, or the like, and the terminal includes a first node and/or a second node. The first node (for example, one or more of modules such as a camera, a screen, a microphone, a speaker, a radar, an electronic key, a keyless entry and start system controller, and user equipment (UE)) includes the apparatus according to any one of the third aspect and the possible implementations of the third aspect. The second node (for example, a base station or a cockpit domain controller (CDC)) includes the information transmission apparatus according to any one of the fourth aspect and the possible implementations of the fourth aspect. Alternatively, the vehicle may be replaced with an intelligent terminal or a transportation vehicle, for example, an uncrewed aerial vehicle or a robot.

BRIEF DESCRIPTION OF DRAWINGS

The following describes the accompanying drawings used in embodiments of this application.

FIG. 4 is a schematic diagram of an MCS table according to an embodiment of this application;

FIG. 5 is a schematic diagram of another MCS table according to an embodiment of this application;

FIG. 6 is a schematic diagram of still another MCS table according to an embodiment of this application;

FIG. 8 is a schematic diagram of yet still another MCS table according to an embodiment of this application;

FIG. 9 is a schematic diagram of yet still another MCS table according to an embodiment of this application;

FIG. 11 is a schematic diagram of yet still another MCS table according to an embodiment of this application;

FIG. 12 is a schematic diagram of yet still another MCS table according to an embodiment of this application;

FIG. 17 is a schematic diagram of yet still another MCS table according to an embodiment of this application;

FIG. 18 is a schematic diagram of yet still another MCS table according to an embodiment of this application;

FIG. 19 is a schematic diagram of yet still another MCS table according to an embodiment of this application;

DESCRIPTION OF EMBODIMENTS

The following describes embodiments of this application with reference to the accompanying drawings in embodiments of this application. In this application, the word such as "example" or "for example" is used to represent giving an example, an illustration, or a description. Any embodiment or design scheme described using "example" or "for example" in this application should not be explained as being more preferred or having more advantages than another embodiment or design scheme. Use of the word such as "example" or "for example" is intended to present a related concept in a specific manner.

It should be noted that a node in embodiments of this application is an electronic device having a data receiving and sending processing capability, and may include a terminal device or a network side device, or may be a chip included in a terminal device or a network side device. For example, the node may be a cockpit domain device, or a module (for example, one or more of modules such as a cockpit domain controller (CDC), a camera, a screen, a microphone, a speaker, an electronic key, and a keyless entry or start system controller) in a cockpit domain device. In a specific implementation process, the node may be alternatively a data transfer device, for example, a base station, a router, a repeater, a bridge, or a switch, or may be a terminal device, for example, various types of user equipment (UE), a mobile phone, a tablet computer (pad), a desktop computer, a headset, or a speaker, or may further include a machine intelligence device, for example, a self-driving device, a transportation safety device, a virtual reality (VR) terminal device, an augmented reality (AR) terminal device, a machine type communication (MTC) device, an industrial control device, a remote medical device, a smart grid device, or a smart city device, or may further include a wearable device (for example, a smartwatch, a smart band, or a pedometer), or the like.

In some technical scenarios, a name of a device with a similar data receiving and sending capability may not be node. However, for ease of description, electronic devices that have a data receiving and sending capability are collectively referred to as nodes in embodiments of this application.

The following describes a system architecture and a service scenario in embodiments of this application. It should be noted that the system architecture and the service scenario described in this application are intended to describe the technical solutions in this application more clearly, and do not constitute a limitation on the technical solutions provided in this application. A person of ordinary skill in the art may know that with evolution of the system architecture and emergence of new service scenarios, the technical solutions provided in this application are also applicable to similar technical problems.

Figure 1:
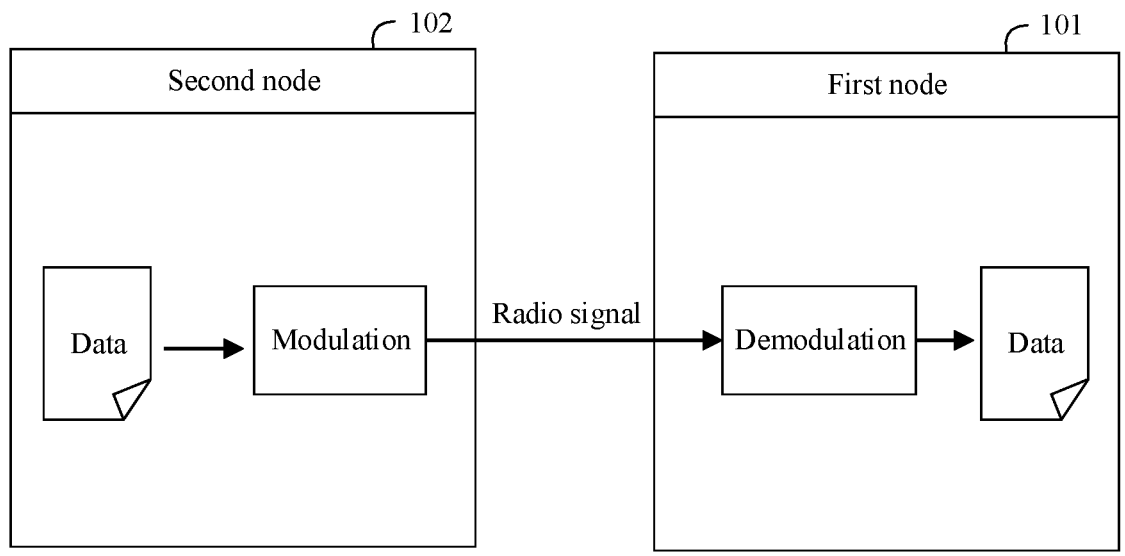
FIG. 1 is a schematic diagram of an architecture of an information transmission system according to an embodiment of this application.

FIG. 1 is a schematic diagram of a possible wireless communication system according to an embodiment of this application. The wireless communication system includes a first node 101 and a second node 102. The second node 102 modulates data based on a modulation mode (specifically, further including spectral efficiency, a code rate, and the like), to form a symbol, and sends a radio signal through an antenna. The first node 101 demodulates the radio signal to obtain the transmitted data. A wireless communication link between the first node 101 and the second node 102 may include various types of connection media, for example, may be a short-range connection technology, including 802.11b/g, Bluetooth, Zigbee, radio frequency identification (RFID), an ultra-wideband (UWB) technology, and a wireless short-range communication system (for example, a vehicle-mounted wireless short-range communication system), or may be a long-range connection technology, including other radio access technologies such as a global system for mobile communications (GSM), a general packet radio service (GPRS), and a universal mobile telecommunications system (UMTS). Certainly, there is another wireless communication technology that may be used to support communication between the first node and the second node.

In some specific implementation scenarios, the second node may also be referred to as a C node or a control node, and the first node may also be referred to as a T node or a terminal. A transmission link from the C node to the T node may be referred to as a C link or a downlink, and a transmission link from the T node to the C node may be referred to as a T link or an uplink.

In a wireless communication process, a communication channel changes randomly, and has frequency selectivity and a time-varying characteristic. However, with an increasing quantity of service types on an intelligent terminal, in a data transmission process of a plurality of service types, how to improve flexibility and reliability of data transmission is a technical problem to be urgently resolved.

Figure 2:
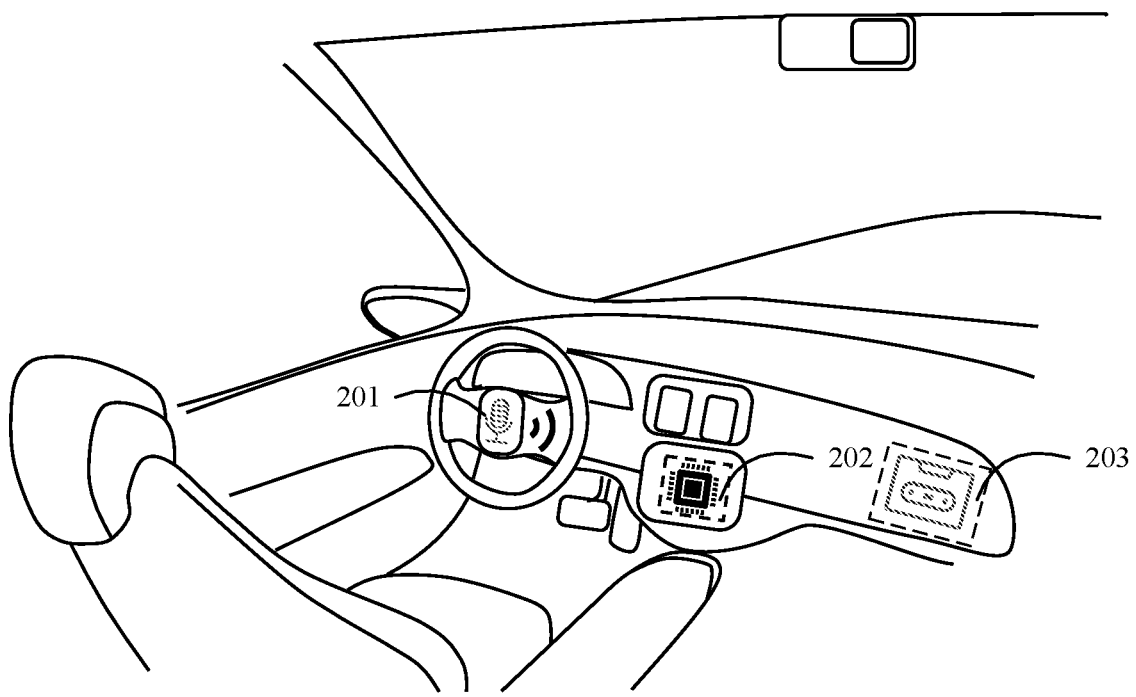
FIG. 2 is a diagram of an application scenario of an information transmission method according to an embodiment of this application.

For example, FIG. 2 is a schematic diagram of a scenario of wireless communication in a vehicle according to an embodiment of this application. A microphone 201 that supports a wireless communication technology in the vehicle may be considered as the first node 101, and a cabin domain controller (CDC) 202 of the vehicle is a control center in an intelligent cabin device, and may be considered as the second node 102. A wireless connection may be established between the CDC 202 and the microphone 201, to reduce a quantity of harnesses in the vehicle. The CDC 202 may further obtain, by using the wireless communication technology, audio recorded by the microphone 201, and record a driving process. For another example, a speaker (or referred to as a loudspeaker) 203 that supports a wireless communication technology in the vehicle may be considered as the first node 101, and a wireless connection may be established between the CDC 202 and the speaker 203. In this way, the speaker 203 may receive and play audio sent by the CDC 202. Because a wireless communication channel changes at any time, to improve transmission efficiency and transmission quality of the data, a modulation and coding mode needs to be dynamically adjusted based on instant quality of the channel. For example, when a channel condition is poor, a lower-order modulation mode is selected (that is, a requirement on a signal to noise ratio is low, but a transmission rate is also low). When the channel condition is good, a higher-order modulation mode may be selected (that is, the requirement on the signal to noise ratio is high, but the transmission rate is also high), so that a transmission capability of the wireless channel can be appropriately used.

Figure 3:
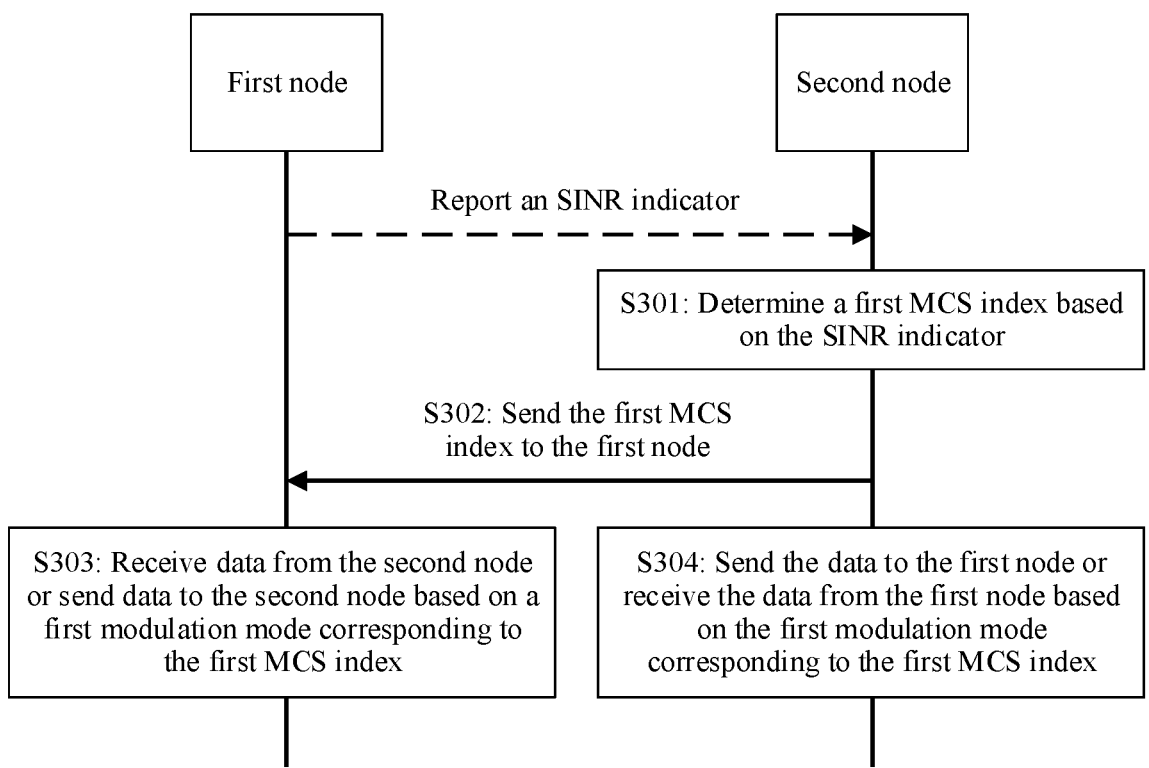
FIG. 3 is a schematic flowchart of an information transmission method according to an embodiment of this application.

FIG. 3 is a schematic flowchart of an information transmission method according to an embodiment of this application. The method includes at least the following steps.

Optionally, the information transmission method may include step S301, which is specifically as follows.

Step S301: A second node determines a first MCS index based on an SINR indicator. The "optionally" herein may be understood as that, in actual communication, the second node may determine the first MCS index based on the SINR indicator, or may not determine the first MCS index based on the SINR indicator, or may determine the first MCS index based on the SINR indicator and another parameter (for example, one or more of reference signal received power (RSRP) and reference signal received quality (RSRQ)) that reflects channel quality. Determining the first MCS index may specifically depend on an implementation by the second node, a pre-agreement, or a definition in a standard.

Specifically, a signal to interference plus noise ratio (Signal to Interference plus Noise Ratio (SINR), also referred to as a signal to interference plus noise ratio) is a ratio of strength of a received wanted signal to strength of a received interference signal (noise and interference), and may be used to indicate quality of a channel, including one or more of quality of an uplink channel (for example, one or more of an uplink data channel, an uplink access channel, and an uplink control channel) and quality of a downlink channel (for example, one or more of a downlink data channel, a downlink broadcast channel, and a downlink control channel). In some implementation solution, the channel may also be replaced with a link, for example, a C link or a T link. The C link includes a data channel, a broadcast channel, and a control channel (which includes one or more of a channel used to transmit a channel state information-reference signal (CSI-RS), a channel used to transmit a demodulation reference signal (DMRS), and the like), and may also be understood as a downlink. The T link includes a data channel, an access channel, and a control channel (which includes one or more of a channel used to transmit an acknowledge character (ACK), a channel used to transmit a sounding reference signal (SRS), a channel used to transmit a DMRS, and the like), and may also be understood as an uplink. Usually, a larger SINR indicates higher strength of the received wanted signal, better channel quality, and higher communication quality. Correspondingly, a smaller SINR indicates lower strength of the received wanted signal, poorer channel quality, and lower communication quality. Optionally, the SINR indicator may be reported by the first node to the second node, or may be obtained by the second node (specifically, may be collected or measured). For example, the second node may send a signal A to the first node through a C link (or a downlink channel). The signal A is transmitted through the C link. The first node receives a signal A1, and the first node may obtain an SINR of the C link based on the received signal A1 and the original signal A, and report the SINR to the second node. In this way, the second node obtains the SINR reported by the first node. For another example, the first node sends a signal B to the second node through a T link (or an uplink channel). Correspondingly, the signal B is transmitted through the T link. The second node receives a signal B1, and may determine an SINR of the T link based on the received signal B1 and the original signal B.

In a design, the second node may determine the first MCS index based on the SINR indicator, and the first MCS index corresponds to a first modulation mode.

Step S302: The second node sends the first MCS index to the first node.

Specifically, the first MCS index belongs to a first MCS information subset, and the first MCS information subset corresponds to the first modulation mode. For example, the first MCS index is an MCS 0, and the MCS 0 belongs to an information subset {index: MCS 0, modulation mode: QPSK, code rate: 0.125}. A modulation mode corresponding to the MCS 0 is QPSK. For another example, the MCS 0 belongs to an information subset {index: MCS 0, modulation order (Qm): 2, spectral efficiency: 0.250}. Because a modulation order corresponding to QPSK is 2, a modulation order corresponding to 16QAM is 4, a modulation order corresponding to 64QAM is 6, a modulation order corresponding to 256QAM is 8, and a modulation order corresponding to 1024QAM is 10, a modulation mode corresponding to the MCS 0 is a modulation mode whose modulation order is 2, namely, QPSK.

Further, the first MCS information subset in which the first MCS index is located belongs to a predefined MCS information set. The predefined MCS information set includes M information subsets, where M is an integer greater than 1. Optionally, M=32. For ease of description, the following mainly uses that M=32 as an example for description. The first MCS information subset includes first spectral efficiency and/or a first code rate corresponding to the first MCS index, and the first modulation mode or a modulation order corresponding to the first modulation mode. In other words, in addition to the first MCS index, the first MCS information subset may further include at least one of the first frequency efficiency or the first code rate, and at least one of the first modulation mode or the modulation order corresponding to the first modulation mode. The first code rate is a ratio of spectral efficiency corresponding to the first MCS index to the modulation order corresponding to the first modulation mode. In other words, a product of the first code rate and the modulation order corresponding to the first modulation mode is equal to the spectral efficiency corresponding to the first MCS index. Generally, a smaller MCS index indicates a lower corresponding modulation mode and lower corresponding spectral efficiency, and a larger MCS index indicates a higher corresponding modulation mode and higher corresponding spectral efficiency. In another definition manner, a change trend of an MCS index may be alternatively opposite to change trends of a modulation mode and spectral efficiency. This is not specifically limited in this application. The foregoing general manner is used as an example. When the channel condition is poor, a modulation mode and spectral efficiency that correspond to a smaller MCS index in the 32 MCS information subsets may be selected to send or receive data. When the channel condition is good, a modulation mode corresponding to a larger MCS index in the 32 MCS information subsets may be selected to send or receive the data. This improves flexibility of selecting the modulation mode, maximizes a transmission capability of a wireless channel, and improves efficiency and reliability of data transmission.

Further, optionally, each MCS information subset in the predefined MCS information set includes a corresponding MCS index, spectral efficiency and/or a code rate corresponding to the MCS index, and a modulation mode corresponding to the MCS index or a modulation order of the modulation mode. The code rate is a ratio of the spectral efficiency corresponding to the MCS index to the modulation order corresponding to the modulation mode. In other words, the predefined MCS information set includes the M (for example, M=32) information subsets, and each MCS index in the M MCS indexes corresponds to spectral efficiency or a code rate and a modulation mode or a modulation order of a modulation mode. It may also be understood that the predefined MCS information set includes the M MCS information subsets, and the M MCS information subsets do not include a reserved entry. Specifically, there is no spectral efficiency and/or code rate corresponding to the corresponding MCS index in the reserved entry. In other words, the spectral efficiency and/or the code rate corresponding to the MCS index in the reserved entry is reserved (reserved).

Optionally, the predefined MCS information set includes at least one of quadrature phase shift keying QPSK, 16 quadrature amplitude modulation QAM, 64QAM, 256QAM, or 1024QAM. Because different nodes support different modulation modes, a plurality of modulation modes can be used by a node to select a modulation mode and spectral efficiency that correspond to modulation, based on a modulation mode supported by the node. Usually, a higher-order modulation mode (for example, 1024QAM or 256QAM) has higher transmission efficiency but a lower anti-noise capability, and a lower-order modulation mode (for example, QPSK or 16QAM) has lower transmission efficiency but a higher anti-noise capability. In addition, the higher-order modulation mode further has a higher device requirement on a transmit end node. The transmit end node can select a modulation mode and spectral efficiency, that correspond to modulation, based on a modulation mode supported by the transmit end node, to achieve higher transmission efficiency. For example, a scenario of vehicle-mounted wireless communication is greatly different from a conventional communication scenario, for example, a macro base station or a cell, and channel conditions for vehicle-mounted wireless signal transmission are also greatly different. Signal and interference plus noise ratios SINRs of received signals in vehicle-mounted communication are more ideal in distribution. Therefore, the higher-order modulation mode (for example, 1024QAM) can be introduced for a vehicle (or a specific node in a vehicle) to select.

Further, the predefined MCS information set may be stored in a format, for example, a table, a set, an array, or JSON data. In a specific implementation process, at least one of the following several designs is included.

Design 1: There are nine MCS information subsets whose modulation modes are QPSK in the predefined MCS information set. Further, a spectral efficiency set corresponding to the MCS information subsets whose modulation modes are QPSK is {0.2891, 0.3691, 0.4668, 0.5801, 0.7207, 0.8828, 1.0586, 1.2441, 1.4258}, or a code rate set corresponding to the MCS information subsets is {0.1445, 0.1846, 0.2334, 0.2900, 0.3604, 0.4414, 0.5293, 0.6221, 0.7129}. Because a performance difference between different modulation modes is great, a relationship between a signal to noise ratio and a block error rate is reflected as that signal to noise ratios required by the different modulation modes for reaching a target block error rate differ greatly. In a communication system, if a performance difference between modulation schemes is great, to meet a block error rate requirement, a smaller quantity of modulation schemes can be selected within a signal to noise ratio range. In this case, it is difficult to meet a user requirement. Therefore, in the foregoing solution, the nine information subsets whose modulation modes are QPSK enable the performance difference between the modulation schemes to be small, so that a device that supports QPSK can appropriately select a better modulation scheme within a signal to noise ratio range.

Further, optionally, there are four MCS information subsets whose modulation modes are 16QAM in the predefined MCS information set. Further, a spectral efficiency set corresponding to the MCS information subsets whose modulation modes are 16QAM is {1.5273, 1.8008, 2.0781, 2.4023}, or a code rate set corresponding to the MCS information subsets is {0.3818, 0.4502, 0.5195, 0.6006}. In this way, a device that supports 16QAM can select a modulation scheme with better performance.

Further, optionally, there are nine MCS information subsets whose modulation modes are 64QAM in the predefined MCS information set. Further, a spectral efficiency set corresponding to the MCS information subsets whose modulation modes are 64QAM is {2.4199, 2.7480, 3.1055, 3.4746, 3.8379, 4.2129, 4.5879, 4.9102, 5.2500}, or a code rate set corresponding to the MCS information subsets is {0.4033, 0.4580, 0.5176, 0.5791, 0.6396, 0.7021, 0.7646, 0.8184, 0.8750}. In this way, a device that supports 64QAM can select a modulation scheme with better performance.

Further, optionally, there are five MCS information subsets whose modulation modes are 256QAM in the predefined MCS information set. Further, a spectral efficiency set corresponding to the MCS information subsets whose modulation modes are 256QAM is {5.2813, 5.7188, 6.1797, 6.6016, 7.0000}, or a code rate set corresponding to the MCS information subsets is {0.6602, 0.7148, 0.7725, 0.8252, 0.8750}. In this way, a device that supports 256QAM can select a modulation scheme with better performance.

Further, optionally, there are five MCS information subsets whose modulation modes are 1024QAM in the predefined MCS information set. Further, a spectral efficiency set corresponding to the MCS information subsets whose modulation modes are 1024QAM is {7.0996, 7.5000, 7.9297, 8.3594, 8.7500}, or a code rate set corresponding to the MCS information subsets is {0.7100, 0.7500, 0.7930, 0.8359, 0.8750}. In this way, a device that supports 1024QAM can select a modulation scheme with better performance.

In a design, the predefined set may include MCS information subsets of any one or more modulation modes in the MCS information subsets of the plurality of modulation modes. For example, the predefined set may include MCS information subsets whose modulation modes are one or more of QPSK, 16QAM, 64QAM, 256QAM or 1024QAM.

Further, optionally, MCS information subsets whose modulation modes are any one of QPSK, 16QAM, 64QAM, 256QAM, and 1024QAM and that are included in the predefined set may include some or all of MCS information subsets of corresponding modulation modes enumerated above. Specifically, for example, there are five MCS information subsets whose modulation modes are 256QAM and five MCS information subsets whose modulation modes are 1024QAM in the predefined MCS information set. For another example, there are nine MCS information subsets whose modulation modes are QPSK, four MCS information subsets whose modulation modes are 16QAM, nine MCS information subsets whose modulation modes are 64QAM, five MCS information subsets whose modulation modes are 256QAM, and five MCS information subsets whose modulation modes are 1024QAM in the predefined MCS information set.

Specifically, for example, Table 1 is a possible MCS table provided in this embodiment of this application. The MCS table includes 32 MCS indexes. In the table, indexes MSC 0 to MCS 31 (in a specific implementation process, the index may be alternatively represented by using five bits. For example, "00000" represents the MCS 0) is in the first column, modulation modes (Modulation) that include four modulation modes: quadrature phase shift keying QPSK, 16 quadrature amplitude modulation QAM, 64QAM, 256QAM, and 1024QAM, are in the second column, spectral efficiency (Efficiency) is in the third column, and code rates (R) are in the fourth column. It can be learned that, in Table 1, modulation modes corresponding to nine MCS indexes are QPSK, modulation modes corresponding to four MCS indexes are 16QAM, modulation modes corresponding to nine MCS indexes are 64QAM, modulation modes corresponding to five MCS indexes are 256QAM, and modulation modes corresponding to five MCS indexes are 1024QAM.

TABLE 1

MCS table
MCS table 1

| MCS index | Modulation | Efficiency | R |
|---|---|---|---|
| MCS 0 | QPSK | 0.2891 | 0.1445 |
| MCS 1 | QPSK | 0.3691 | 0.1846 |
| MCS 2 | QPSK | 0.4668 | 0.2334 |
| MCS 3 | QPSK | 0.5801 | 0.2900 |
| MCS 4 | QPSK | 0.7207 | 0.3604 |
| MCS 5 | QPSK | 0.8828 | 0.4414 |
| MCS 6 | QPSK | 1.0586 | 0.5293 |
| MCS 7 | QPSK | 1.2441 | 0.6221 |
| MCS 8 | QPSK | 1.4258 | 0.7129 |
| MCS 9 | 16 QAM | 1.5273 | 0.3818 |
| MCS 10 | 16 QAM | 1.8008 | 0.4502 |
| MCS 11 | 16 QAM | 2.0781 | 0.5195 |
| MCS 12 | 16 QAM | 2.4023 | 0.6006 |
| MCS 13 | 64 QAM | 2.4199 | 0.4033 |
| MCS 14 | 64 QAM | 2.7480 | 0.4580 |
| MCS 15 | 64 QAM | 3.1055 | 0.5176 |
| MCS 16 | 64 QAM | 3.4746 | 0.5791 |
| MCS 17 | 64 QAM | 3.8379 | 0.6396 |
| MCS 18 | 64 QAM | 4.2129 | 0.7021 |
| MCS 19 | 64 QAM | 4.5879 | 0.7646 |
| MCS 20 | 64 QAM | 4.9102 | 0.8184 |
| MCS 21 | 64 QAM | 5.2500 | 0.8750 |
| MCS 22 | 256 QAM | 5.2813 | 0.6602 |
| MCS 23 | 256 QAM | 5.7188 | 0.7148 |
| MCS 24 | 256 QAM | 6.1797 | 0.7725 |
| MCS 25 | 256 QAM | 6.6016 | 0.8252 |

TABLE 1-continued

MCS table
MCS table 1

| MCS index | Modulation | Efficiency | R |
|---|---|---|---|
| MCS 26 | 256 QAM | 7.0000 | 0.8750 |
| MCS 27 | 1024 QAM | 7.0996 | 0.7100 |
| MCS 28 | 1024 QAM | 7.5000 | 0.7500 |
| MCS 29 | 1024 QAM | 7.9297 | 0.7930 |
| MCS 30 | 1024 QAM | 8.3594 | 0.8359 |
| MCS 31 | 1024 QAM | 8.7500 | 0.8750 |

It should be noted that, in embodiments of this application, a value of spectral efficiency and a value of a code rate each are accurate to 4 decimal places. In some possible implementations, there may be alternatively other precision. For example, FIG. 4 is a schematic diagram of a possible MCS according to an embodiment of this application. The indexes MSC 0 to MCS 31 are in the first column, modulation modes (Modulation) are in the second column, spectral efficiency (Efficiency) is in the third column, and code rates (R) are in the fourth column. The value of the spectral efficiency is accurate to 9 decimal places, and the value of the code rate is accurate to 10 decimal places.

It may be understood that, in an MCS information set shown in Table 1 or FIG. 4, some parameters are converted into other parameters for representation. For example, the modulation mode may be replaced with a modulation order Qm (a modulation order corresponding to QPSK is 2, a modulation order corresponding to 16QAM is 4, a modulation order corresponding to 64QAM is 6, a modulation order corresponding to 256AQM is 8, and a modulation order corresponding to 1024QAM is 10). For another example, the code rate may be replaced with "a length of an information bit obtained by calculating the code rater 1024". For example, FIG. 5 is a schematic diagram of another possible MCS table according to an embodiment of this application. The indexes MSC 0 to MCS 31 are in the first column, modulation modes (Modulation) are in the second column, lengths (also referred to as mother codes 1024 in some implementation scenarios) of information bits obtained by calculating code rates×1024 are in the third column, and spectral efficiency (Efficiency) are in the fourth column. In addition, in some specific implementation scenarios, the information set may further include other information, for example, may further include at least one of a modulation order and a signal to noise ratio (SNR, or referred to as S/N) required during modulation for reaching a target block error rate (BLER) (for example, $10^{-3}$). Examples are not described herein again.

Optionally, in embodiments of this application, the MCS information set may be alternatively divided into a plurality of tables for representation. For example, (a) in FIG. 6 shows information subsets whose indexes are MCS 0 to MCS 8 and modulation modes are QPSK, (b) in FIG. 6 shows information subsets whose indexes are MCS 9 to MCS 12 and modulation modes are 16QAM, (c) in FIG. 6 shows information subsets whose indexes are MCS 13 to MCS 21 and modulation modes are 64QAM, (d) in FIG. 6 shows information subsets whose indexes are MCS 22 to MCS 26 and modulation modes are 256QAM, and (e) in FIG. 6 shows information subsets whose indexes are MCS 27 to MCS 31 and modulation modes are 1024QAM.

Figure 7A:
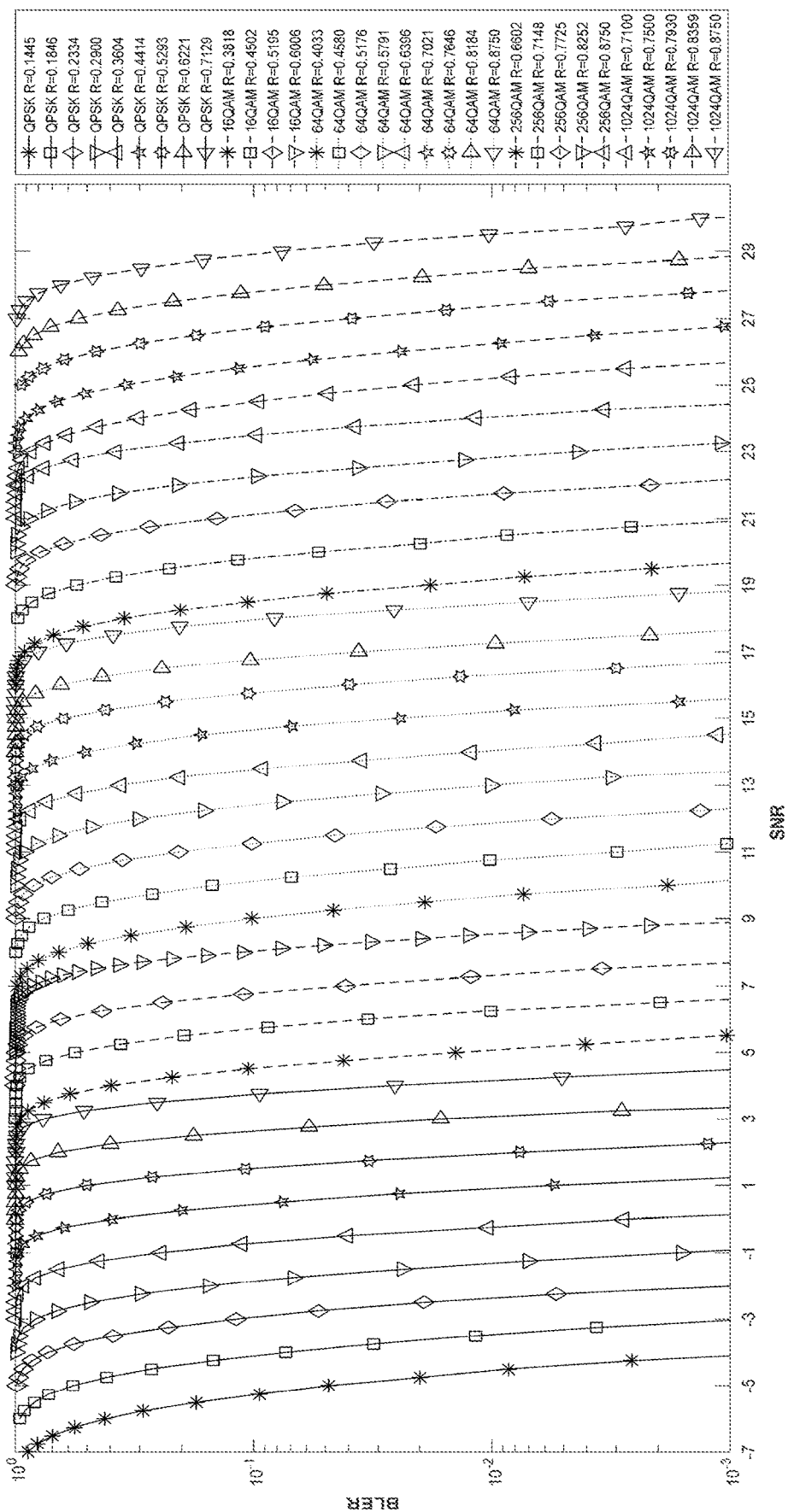
FIG. 7A is a schematic diagram of possible performance of a modulation scheme according to an embodiment of this application.

FIG. 7A is a schematic diagram of possible performance of a modulation scheme in the MCS information set in Design 1 according to an embodiment of this application, and specifically, a schematic diagram of a relationship between a BLER and an SNR that are obtained on an additive white Gaussian noise (AWGN) channel by modulating, during coding by using a polar code with a 1024-bit code length (namely, a 1024-bit length of a data block obtained through coding), a signal by using modulation modes and code rates that correspond to the MCS 0 to the MCS 31 in Table 1.

Figure 7B:
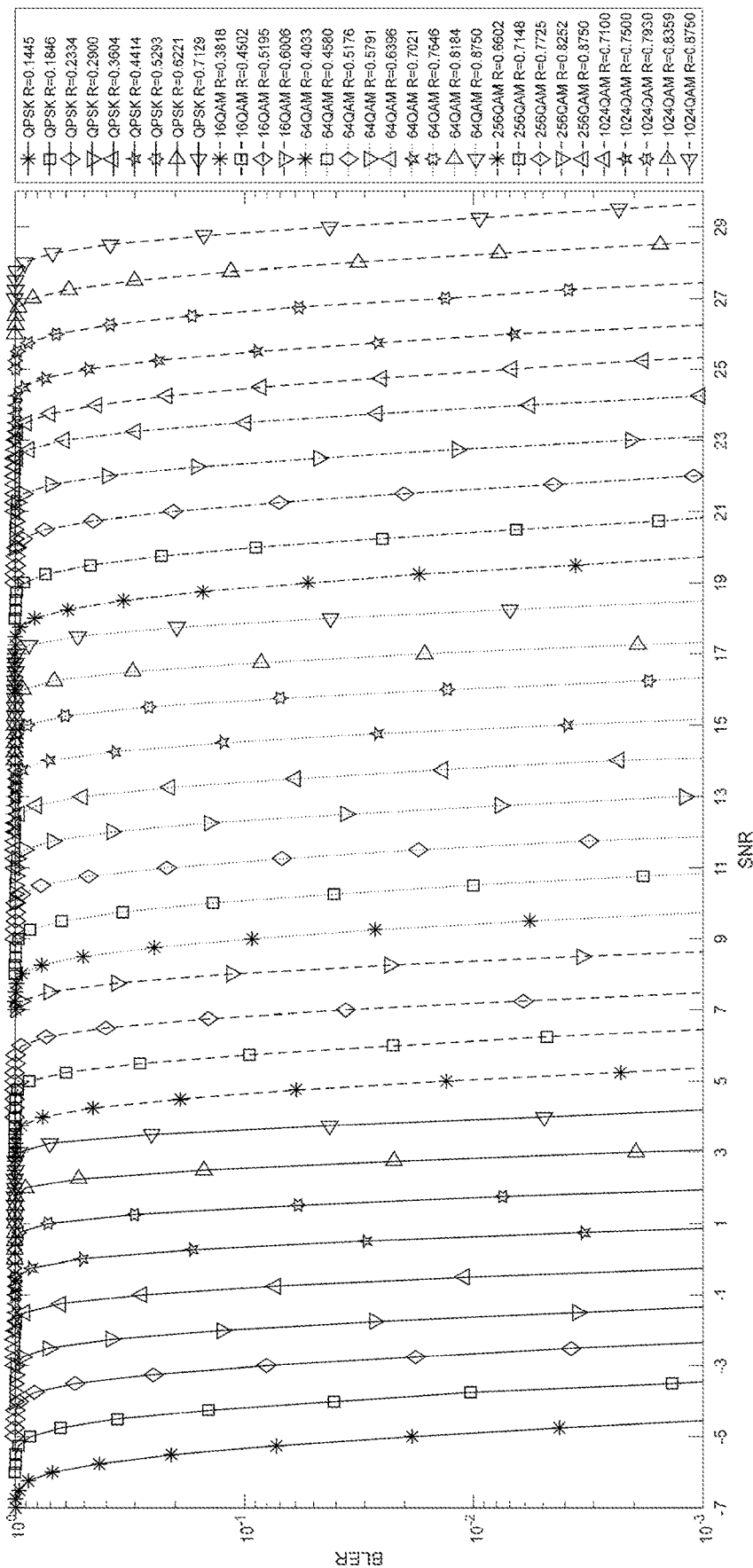
FIG. 7B is a schematic diagram of possible performance of another modulation scheme according to an embodiment of this application.

FIG. 7B is a schematic diagram of other possible performance of the modulation scheme in the MCS information set in Design 1 according to an embodiment of this application, and specifically, a schematic diagram of a relationship between a BLER and an SNR that are obtained on the AWGN channel by modulating, during coding by using a polar code with a 2048-bit code length (namely, a 2048-bit length of a data block obtained through coding), the signal by using the modulation modes and the code rates that correspond to the MCS 0 to the MCS 31 in Table 1. It can be learned that, when a modulation scheme (which specifically includes a modulation mode and spectral efficiency or a code rate) corresponding to any MCS index in the 32 MCS information subsets is used to modulate a wireless communication signal, a signal to noise ratio required for reaching a block error rate $10^{-3}$ falls within an interval [−5 dB, 30 dB] (in consideration of a difference in an actual communication scenario, an appropriate error range is allowed). Further, a performance difference between the modulation modes is small, so that a higher-order modulation scheme can be selected as much as possible within any signal to noise ratio range falling within [−5 dB, 30 dB], to improve a rate and reliability of data transmission.

Optionally, for the plurality of MCS information subsets, an interval between a first reference code rate difference and a difference between code rates corresponding to any two adjacent indexes whose corresponding modulation modes are the same is less than or equal to a first code rate threshold. It can be learned that a difference between two adjacent code rates is always distributed within a specific range. When a rule is reflected, the difference between the two adjacent code rates is always distributed around the first reference code rate difference, and an interval (or a deviation) between the difference and the first reference code rate difference is less than or equal to the first code rate threshold (for example, the first reference code rate difference is 0.07, and the first code rate threshold is 0.045. The difference between the two adjacent code rates is always approximately 0.07, and the interval between the difference and 0.07 does not exceed 0.045. In other words, the difference between the code rates falls within an interval [0.025, 0.15]). Therefore, the interval between the code rates is small and even. In this way, the higher-order modulation scheme can be selected as much as possible within the signal to noise ratio range, to improve the rate and reliability of data transmission.

It should be noted that the first reference code rate difference is used to describe a code rate distribution rule, and may not be a fixed value. The first code rate threshold is used to represent that there may be an error that is within a small range and that is between the reference code rate difference and the difference between the code rates, and may not be a fixed value.

Alternatively, the code rate corresponding to the MCS 0 in Table 1 may be 0.1250, and/or spectral efficiency corresponding to the MCS 0 may be 0.0250, so that a code rate range covered in Table 1 is wide, to adapt to some services having a low code rate requirement.

Design 2: There are four MCS information subsets whose modulation modes are QPSK in the predefined MCS information set. Further, a spectral efficiency set corresponding to the MCS information subsets whose modulation modes are QPSK is {0.3086, 0.4453, 0.6309, 0.8652}, or a code rate set corresponding to the MCS information subsets is {0.1543, 0.2227, 0.3154, 0.4326}.

Because QSPK has a good anti-noise capability but low efficiency of data transmission, QSPK is usually used on a channel with a low SNR. However, because an SNR in some scenarios is high, for example, a vehicle-mounted wireless channel, to adapt to the scenario with the high SNR, a quantity of the QPSK modulation modes can be reduced or an interval between code rates of the QPSK modulation mode can be increased. A performance difference between modulation modes working in a low signal to noise ratio is increased, so that a performance difference between modulation modes working in a high signal to noise ratio is reduced, to improve transmission efficiency and reliability of a communication system working in the scenario with the high signal to noise ratio.

Further, optionally, there are seven MCS information subsets whose modulation modes are 16QAM in the predefined MCS information set. Further, a spectral efficiency set corresponding to the MCS information subsets whose modulation modes are 16QAM is {0.9219, 1.1211, 1.3203, 1.5586, 1.8203, 2.0781, 2.3594}, or a code rate set corresponding to the MCS information subsets is {0.2305, 0.2803, 0.3301, 0.3896, 0.4551, 0.5195, 0.5898}. By using the seven information subsets whose modulation modes are 16QAM, a device that supports 16QAM can select a modulation scheme with better performance.

Further, optionally, there are 10 MCS information subsets whose modulation modes are 64QAM in the predefined MCS information set. Further, a spectral efficiency set corresponding to the MCS information subsets whose modulation modes are 64QAM is {2.3613, 2.6660, 2.9766, 3.2813, 3.6445, 3.9785, 4.3066, 4.6523, 4.9512, 5.2500}, or a code rate set corresponding to the MCS information subsets is {0.3936, 0.4443, 0.4961, 0.5469, 0.6074, 0.6631, 0.7178, 0.7754, 0.8252, 0.8750}. By using the 10 information subsets whose modulation modes are 64QAM, a device that supports 64QAM can select a modulation scheme with better performance.

Further, optionally, there are six MCS information subsets whose modulation modes are 256QAM in the predefined MCS information set. Further, a spectral efficiency set corresponding to the MCS information subsets whose modulation modes are 256QAM is {5.2813, 5.6328, 6.0000, 6.3125, 6.6797, 7.0000}, or a code rate set corresponding to the MCS information subsets is {0.6602, 0.7041, 0.7500, 0.7891, 0.8350, 0.8750}. By using the six information subsets whose modulation modes are 256QAM, a device that supports 256QAM can select a modulation scheme with better performance.

Further, optionally, there are five MCS information subsets whose modulation modes are 1024QAM in the predefined MCS information set. Further, a spectral efficiency set corresponding to the MCS information subsets whose modulation modes are 1024QAM is {7.0996, 7.5000, 7.9297, 8.3594, 8.7500}, or a code rate set corresponding to the MCS information subsets is {0.7100, 0.7500, 0.7930, 0.8359, 0.8750}. By using the five information subsets whose modulation modes are 1024QAM, a device that supports 1024QAM can select a modulation scheme with better performance.

In a design, the predefined set may include MCS information subsets of any one or more modulation modes in the MCS information subsets of the plurality of modulation modes. For example, the predefined set may include MCS information subsets whose modulation modes are one or more of QPSK, 16QAM, 64QAM, 256QAM or 1024QAM.

Further, optionally, MCS information subsets whose modulation modes are any one of QPSK, 16QAM, 64QAM, 256QAM, and 1024QAM and that are included in the predefined set may include some or all of MCS information subsets of corresponding modulation modes enumerated above. Specifically, for example, there are six MCS information subsets whose modulation modes are 256QAM and five MCS information subsets whose modulation modes are 1024QAM in the predefined MCS information set. For another example, there are four MCS information subsets whose modulation modes are QPSK, seven MCS information subsets whose modulation modes are 16QAM, 10 MCS information subsets whose modulation modes are 64QAM, six MCS information subsets whose modulation modes are 256QAM, and five MCS information subsets whose modulation modes are 1024QAM in the predefined MCS information set.

Specifically, for example, Table 2 is still another possible MCS table provided in this embodiment of this application. The MCS table includes 32 MCS indexes (MCS Indexes). In the MCS table, modulation modes corresponding to four MCS indexes are QPSK, modulation modes corresponding to seven MCS indexes are 16QAM, modulation modes corresponding to 10 MCS indexes are 64QAM, modulation modes corresponding to six MCS indexes are 256QAM, and modulation modes corresponding to five MCS indexes are 1024QAM.

TABLE 2

MCS table
MCS table 2

| MCS index | Modulation | Efficiency | R |
|---|---|---|---|
| MCS 0 | QPSK | 0.3086 | 0.1543 |
| MCS 1 | QPSK | 0.4453 | 0.2227 |
| MCS 2 | QPSK | 0.6309 | 0.3154 |
| MCS 3 | QPSK | 0.8652 | 0.4326 |
| MCS 4 | 16 QAM | 0.9219 | 0.2305 |
| MCS 5 | 16 QAM | 1.1211 | 0.2803 |
| MCS 6 | 16 QAM | 1.3203 | 0.3301 |
| MCS 7 | 16 QAM | 1.5586 | 0.3896 |
| MCS 8 | 16 QAM | 1.8203 | 0.4551 |
| MCS 9 | 16 QAM | 2.0781 | 0.5195 |
| MCS 10 | 16 QAM | 2.3594 | 0.5898 |
| MCS 11 | 64 QAM | 2.3613 | 0.3936 |
| MCS 12 | 64 QAM | 2.6660 | 0.4443 |
| MCS 13 | 64 QAM | 2.9766 | 0.4961 |
| MCS 14 | 64 QAM | 3.2813 | 0.5469 |
| MCS 15 | 64 QAM | 3.6445 | 0.6074 |
| MCS 16 | 64 QAM | 3.9785 | 0.6631 |
| MCS 17 | 64 QAM | 4.3066 | 0.7178 |
| MCS 18 | 64 QAM | 4.6523 | 0.7754 |
| MCS 19 | 64 QAM | 4.9512 | 0.8252 |
| MCS 20 | 64 QAM | 5.2500 | 0.8750 |
| MCS 21 | 256 QAM | 5.2813 | 0.6602 |
| MCS 22 | 256 QAM | 5.6328 | 0.7041 |
| MCS 23 | 256 QAM | 6.0000 | 0.7500 |
| MCS 24 | 256 QAM | 6.3125 | 0.7891 |
| MCS 25 | 256 QAM | 6.6797 | 0.8350 |
| MCS 26 | 256 QAM | 7.0000 | 0.8750 |
| MCS 27 | 1024 QAM | 7.0996 | 0.7100 |
| MCS 28 | 1024 QAM | 7.5000 | 0.7500 |
| MCS 29 | 1024 QAM | 7.9297 | 0.7930 |
| MCS 30 | 1024 QAM | 8.3594 | 0.8359 |
| MCS 31 | 1024 QAM | 8.7500 | 0.8750 |

It should be noted that, in Table 2, a value of spectral efficiency and a value of a code rate each are accurate to 4 decimal places. In some possible implementations, there may be alternatively other precision. For example, FIG. 8 is a schematic diagram of still another possible MCS according to an embodiment of this application. A value of spectral efficiency is accurate to 9 decimal places, and a value of a code rate is accurate to 10 decimal places.

It may be understood that some parameters in an MCS information set shown in Table 2 or FIG. 7 may be alternatively replaced with corresponding parameters. For example, FIG. 9 is a schematic diagram of still another possible MCS according to an embodiment of this application. For information about each column, refer to related descriptions of FIG. 5. In addition, in some specific implementation scenarios, the information set may further include other information, for example, may further include at least one of a modulation order and an SNR required for reaching a target BLER (for example, $10^{-3}$).

Figure 10A:
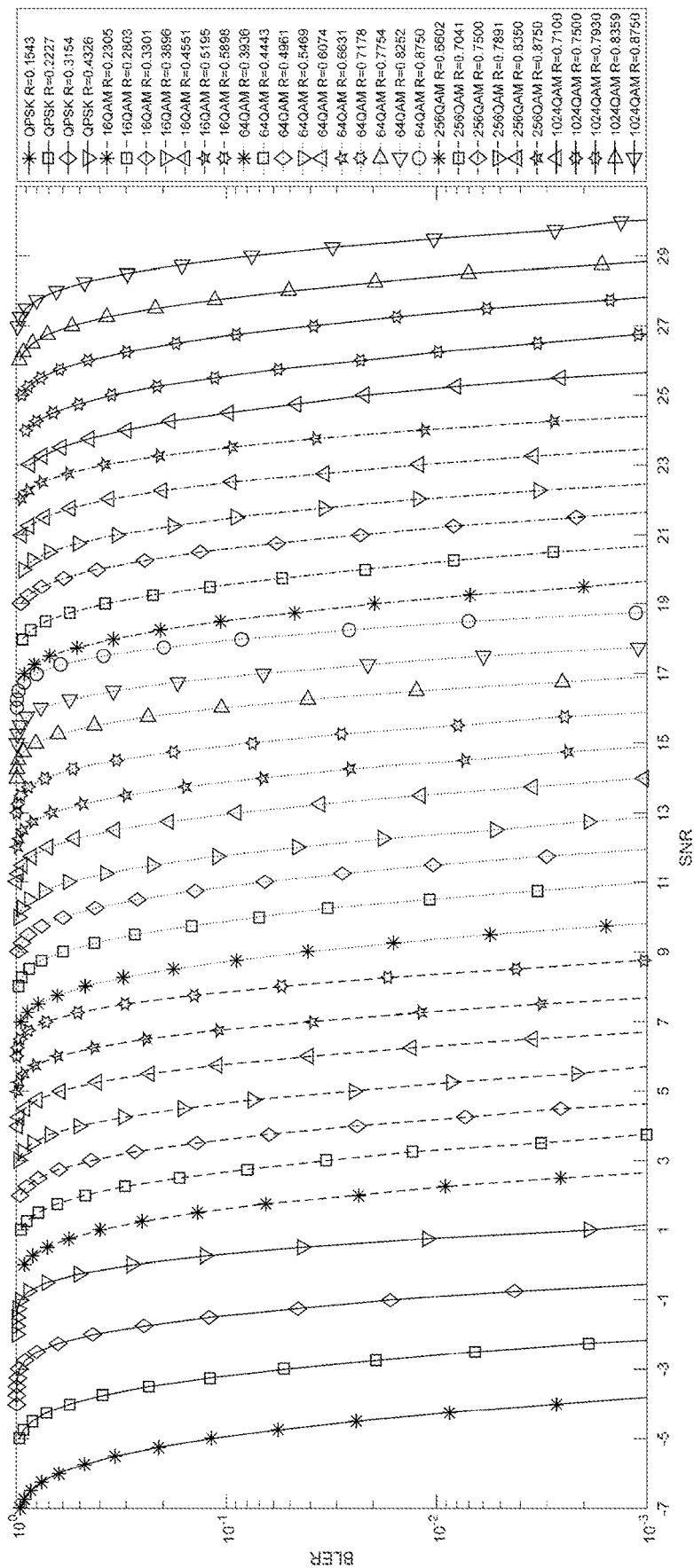
FIG. 10A is a schematic diagram of possible performance of still another modulation scheme according to an embodiment of this application.
Figure 10B:
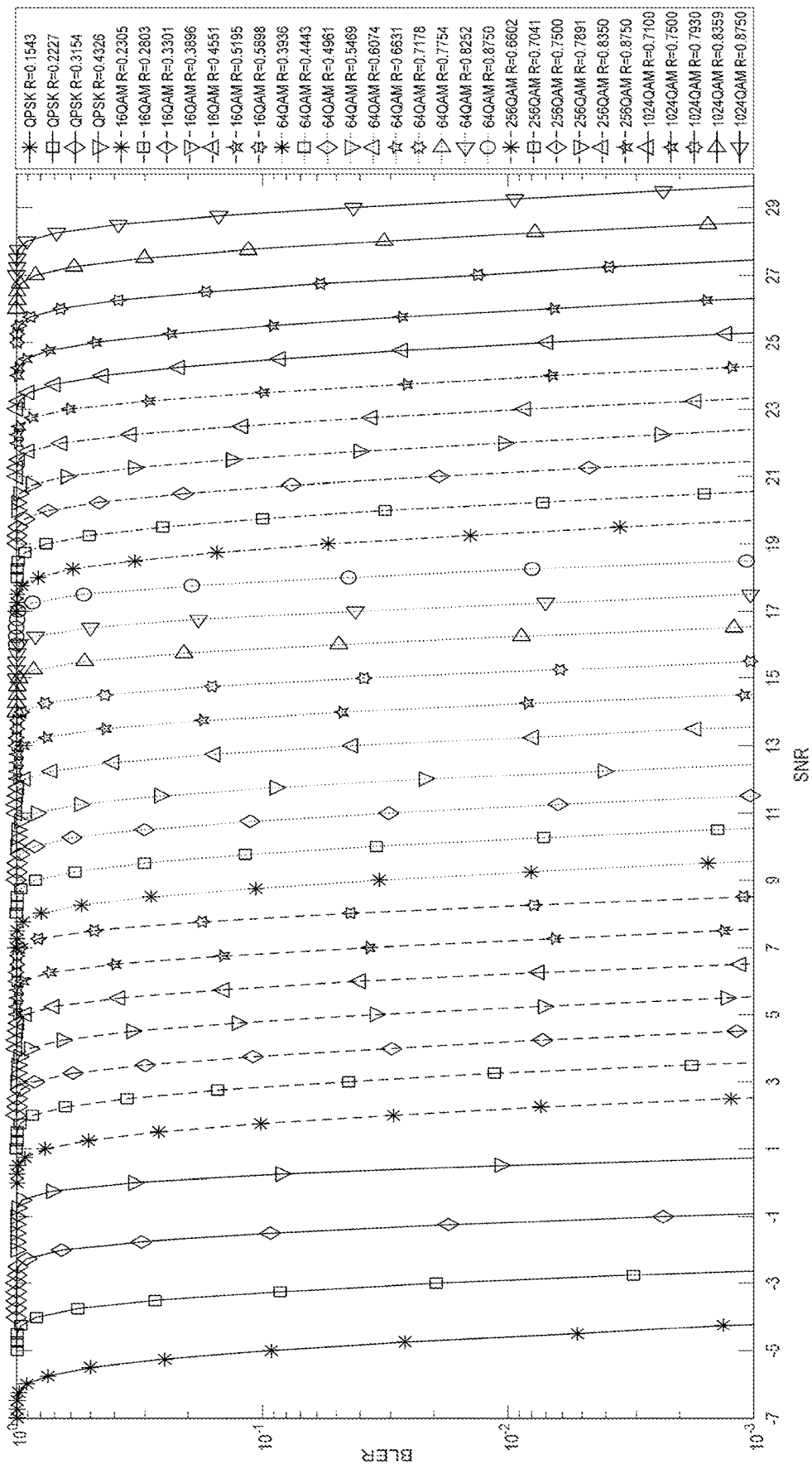
FIG. 10B is a schematic diagram of possible performance of yet still another modulation scheme according to an embodiment of this application.

FIG. 10B is a schematic diagram of possible performance of a modulation scheme in the MCS information set in Design 2 according to an embodiment of this application, and specifically, a schematic diagram of a relationship between a BLER and an SNR that are obtained on an AWGN channel by modulating, during coding by using a polar code with a 1024-bit code length, a signal by using modulation modes and code rates that correspond to the MCS 0 to the MCS 31 in Table 2. FIG. 10B is a schematic diagram of other possible performance of the modulation scheme in the MCS information set in Design 2 according to an embodiment of this application, and specifically, a schematic diagram of a relationship between a BLER and an SNR that are obtained on the AWGN channel by modulating, during coding by using a polar code with a 2048-bit code length, the signal by using the modulation modes and the code rates that correspond to the MCS 0 to the MCS 31 in Table 2. It can be learned that, when a modulation scheme (which specifically includes a modulation mode and spectral efficiency or a code rate) corresponding to any MCS index in the 32 MCS information subsets is used to modulate a wireless communication signal, a signal to noise ratio required for reaching a block error rate $10^{-3}$ falls within an interval [−5 dB, 30 dB] (in consideration of a difference in an actual communication scenario, an appropriate error range is allowed).

In Design 2, it is considered that, in some scenarios (for example, a vehicle-mounted communication system) with a high signal to noise ratio, the signal to noise ratio is usually greater than 3 dB (usually greater than 10 dB in some scenarios). Therefore, a performance difference between modulation modes of 16QAM and above is small, so that, in any signal to noise ratio range falling within [3 dB, 30 dB], the performance difference between the modulation modes is further reduced. Therefore, a higher-order modulation scheme can be selected as much as possible within a signal to noise ratio range [3 dB, 30 dB], to improve a rate and reliability of data transmission.

In a possible implementation, for information subsets whose modulation modes are 16QAM, 64QAM, or 1024QAM in the MCS information set, an interval between a second reference code rate difference and a difference between code rates corresponding to any two adjacent indexes whose corresponding modulation modes are the same is less than or equal to a second code rate threshold. Further, the second reference code rate difference is less than the first reference code rate difference, and the second code rate threshold is less than the first code rate threshold. Compared with QPSK, 16QAM, 64QAM, or 1024QAM has a higher information transmission rate but a poorer anti-noise capability, and therefore, works on a channel with a high signal to noise ratio. However, in a communication scenario, for example, vehicle-mounted communication, a signal to noise ratio of a channel is high. Therefore, in this scenario, an interval between code rates of the information subsets of 16QAM, 64QAM, or 1024QAM may be reduced, so that the performance difference between the modulation modes working in the high signal to noise ratio is small, to improve transmission efficiency and reliability of the communication system working in the scenario with the high signal to noise ratio. It should be noted that the second reference code rate difference and the second code rate threshold are used to describe a code rate distribution rule, and may not be fixed values. For example, the second reference code rate difference may be 0.055, and the second code rate threshold is 0.02. In this way, a difference between two adjacent code rates falls within a range of an interval [0.035, 0.075], and the performance difference between the modulation modes is small. It should be noted that the second reference code rate difference is used to describe the code rate distribution rule, and may not be a fixed value. The second code rate threshold is used to represent that there may be an error that is within a small range and that is between the reference code rate difference and the difference between the code rates, and may not be a fixed value.

Design 3: There are four MCS information subsets whose modulation modes are QPSK in the predefined MCS information set. Further, a spectral efficiency set corresponding to the MCS information subsets whose modulation modes are QPSK is {0.2617, 0.3828, 0.5469, 0.7578}, or a code rate set corresponding to the MCS information subsets is {0.1309, 0.1914, 0.2734, 0.3789}. A performance difference between modulation modes working in a low signal to noise ratio is increased, so that a performance difference between modulation modes working in a high signal to noise ratio is reduced, to improve transmission efficiency and reliability of a communication system working in a scenario with a high signal to noise ratio.

Further, optionally, there are four MCS information subsets whose modulation modes are 16QAM in the predefined MCS information set. Further, a spectral efficiency set corresponding to the MCS information subsets whose modulation modes are 16QAM is {0.8008, 1.1211, 1.5000, 1.9219}, or a code rate set corresponding to the MCS information subsets is {0.2002, 0.2803, 0.3750, 0.4805}. A performance difference between modulation schemes whose modulation modes are 16QAM is increased, so that the performance difference between the modulation modes working in the high signal to noise ratio is reduced, to improve transmission efficiency and reliability of the communication system working in the scenario with the high signal to noise ratio.

Further, optionally, there are 12 MCS information subsets whose modulation modes are 64QAM in the predefined MCS information set. Further, a spectral efficiency set corresponding to the MCS information subsets whose modulation modes are 64QAM is {2.0508, 2.3613, 2.6367, 2.9414, 3.2168, 3.5098, 3.8203, 4.1016, 4.4121, 4.6992, 4.9863, 5.2500}, or a code rate set corresponding to the MCS information subsets is {0.3418, 0.3936, 0.4395, 0.4902, 0.5361, 0.5850, 0.6367, 0.6836, 0.7354, 0.7832, 0.8311, 0.8750}. The 12 information subsets whose modulation modes are 16QAM enable a performance difference between modulation schemes to be reduced, so that a device that supports 16QAM can appropriately select a better modulation scheme within a signal to noise ratio range.

Further, optionally, there are six MCS information subsets whose modulation modes are 256QAM in the predefined MCS information set. Further, a spectral efficiency set corresponding to the MCS information subsets whose modulation modes are 256QAM is {5.2813, 5.6328, 6.0000, 6.3125, 6.6797, 7.0000}, or a code rate set corresponding to the MCS information subsets is {0.6602, 0.704, 0.7500, 0.7891, 0.8350, 0.8750}. By using the six information subsets whose modulation modes are 256QAM, a device that supports 256QAM can select a modulation scheme with better performance.

Further, optionally, there are six MCS information subsets whose modulation modes are 1024QAM in the predefined MCS information set. Further, a spectral efficiency set corresponding to the MCS information subsets whose modulation modes are 1024QAM is {7.0313, 7.3730, 7.6953, 8.0957, 8.4570, 8.7500}, or a code rate set corresponding to the MCS information subsets is {0.7031, 0.7373, 0.7695, 0.8096, 0.8457, 0.8750}. By using the six information subsets whose modulation modes are 1024QAM, a device that supports 1024QAM can select a modulation scheme with better performance.

In a design, the predefined set may include MCS information subsets of any one or more modulation modes in the MCS information subsets of the plurality of modulation modes. For example, the predefined set may include MCS information subsets whose modulation modes are one or more of QPSK, 16QAM, 64QAM, 256QAM or 1024QAM.

Further, optionally, MCS information subsets whose modulation modes are any one of QPSK, 16QAM, 64QAM, 256QAM, and 1024QAM and that are included in the predefined set may include some or all of MCS information subsets of corresponding modulation modes enumerated above. Specifically, for example, there are six MCS information subsets whose modulation modes are 256QAM and six MCS information subsets whose modulation modes are 1024QAM in the predefined MCS information set. For another example, there are four MCS information subsets whose modulation modes are QPSK, four MCS information subsets whose modulation modes are 16QAM, 12 MCS information subsets whose modulation modes are 64QAM, six MCS information subsets whose modulation modes are 256QAM, and six MCS information subsets whose modulation modes are 1024QAM in the predefined MCS information set.

Specifically, for example, Table 3 is still another possible MCS table provided in this embodiment of this application. The MCS table includes 32 MCS indexes (MCS Indexes). It can be learned that, in Table 1, modulation modes corresponding to four MCS indexes are QPSK, modulation modes corresponding to four MCS indexes are 16QAM, modulation modes corresponding to 12 MCS indexes are 64QAM, modulation modes corresponding to six MCS indexes are 256QAM, and modulation modes corresponding to six MCS indexes are 1024QAM.

TABLE 3

MCS table
MCS table 3

| MCS index | Modulation | Efficiency | R (decimal) |
| --- | --- | --- | --- |
| MCS 0 | QPSK | 0.2617 | 0.1309 |
| MCS 1 | QPSK | 0.3828 | 0.1914 |
| MCS 2 | QPSK | 0.5469 | 0.2734 |
| MCS 3 | QPSK | 0.7578 | 0.3789 |
| MCS 4 | 16 QAM | 0.8008 | 0.2002 |
| MCS 5 | 16 QAM | 1.1211 | 0.2803 |
| MCS 6 | 16 QAM | 1.5000 | 0.3750 |
| MCS 7 | 16 QAM | 1.9219 | 0.4805 |
| MCS 8 | 64 QAM | 2.0508 | 0.3418 |

TABLE 3-continued

MCS table
MCS table 3

| MCS index | Modulation | Efficiency | R (decimal) |
|---|---|---|---|
| MCS 9 | 64 QAM | 2.3613 | 0.3936 |
| MCS 10 | 64 QAM | 2.6367 | 0.4395 |
| MCS 11 | 64 QAM | 2.9414 | 0.4902 |
| MCS 12 | 64 QAM | 3.2168 | 0.5361 |
| MCS 13 | 64 QAM | 3.5098 | 0.5850 |
| MCS 14 | 64 QAM | 3.8203 | 0.6367 |
| MCS 15 | 64 QAM | 4.1016 | 0.6836 |
| MCS 16 | 64 QAM | 4.4121 | 0.7354 |
| MCS 17 | 64 QAM | 4.6992 | 0.7832 |
| MCS 18 | 64 QAM | 4.9863 | 0.8311 |
| MCS 19 | 64 QAM | 5.2500 | 0.8750 |
| MCS 20 | 256 QAM | 5.2813 | 0.6602 |
| MCS 21 | 256 QAM | 5.6328 | 0.7041 |
| MCS 22 | 256 QAM | 6.0000 | 0.7500 |
| MCS 23 | 256 QAM | 6.3125 | 0.7891 |
| MCS 24 | 256 QAM | 6.6797 | 0.8350 |
| MCS 25 | 256 QAM | 7.0000 | 0.8750 |
| MCS 26 | 1024 QAM | 7.0313 | 0.7031 |
| MCS 27 | 1024 QAM | 7.3730 | 0.7373 |
| MCS 28 | 1024 QAM | 7.6953 | 0.7695 |
| MCS 29 | 1024 QAM | 8.0957 | 0.8096 |
| MCS 30 | 1024 QAM | 8.4570 | 0.8457 |
| MCS 31 | 1024 QAM | 8.7500 | 0.8750 |

It should be noted that, in Table 3, a value of spectral efficiency and a value of a code rate each are accurate to 4 decimal places. In some possible implementations, there may be alternatively other precision. For example, FIG. 11 is a schematic diagram of still another possible MCS according to an embodiment of this application. A value of spectral efficiency is accurate to 9 decimal places, and a value of a code rate is accurate to 10 decimal places.

It may be understood that some parameters in an MCS information set shown in Table 3 or FIG. 11 may be alternatively replaced with corresponding parameters. For example, FIG. 12 is a schematic diagram of still another possible MCS according to an embodiment of this application. For information about each column, refer to related descriptions of FIG. 5. In addition, in some specific implementation scenarios, the information set may further include other information, for example, may further include at least one of a modulation order and an SNR required for reaching a target BLER (for example, $10^{-3}$).

Figure 13A:
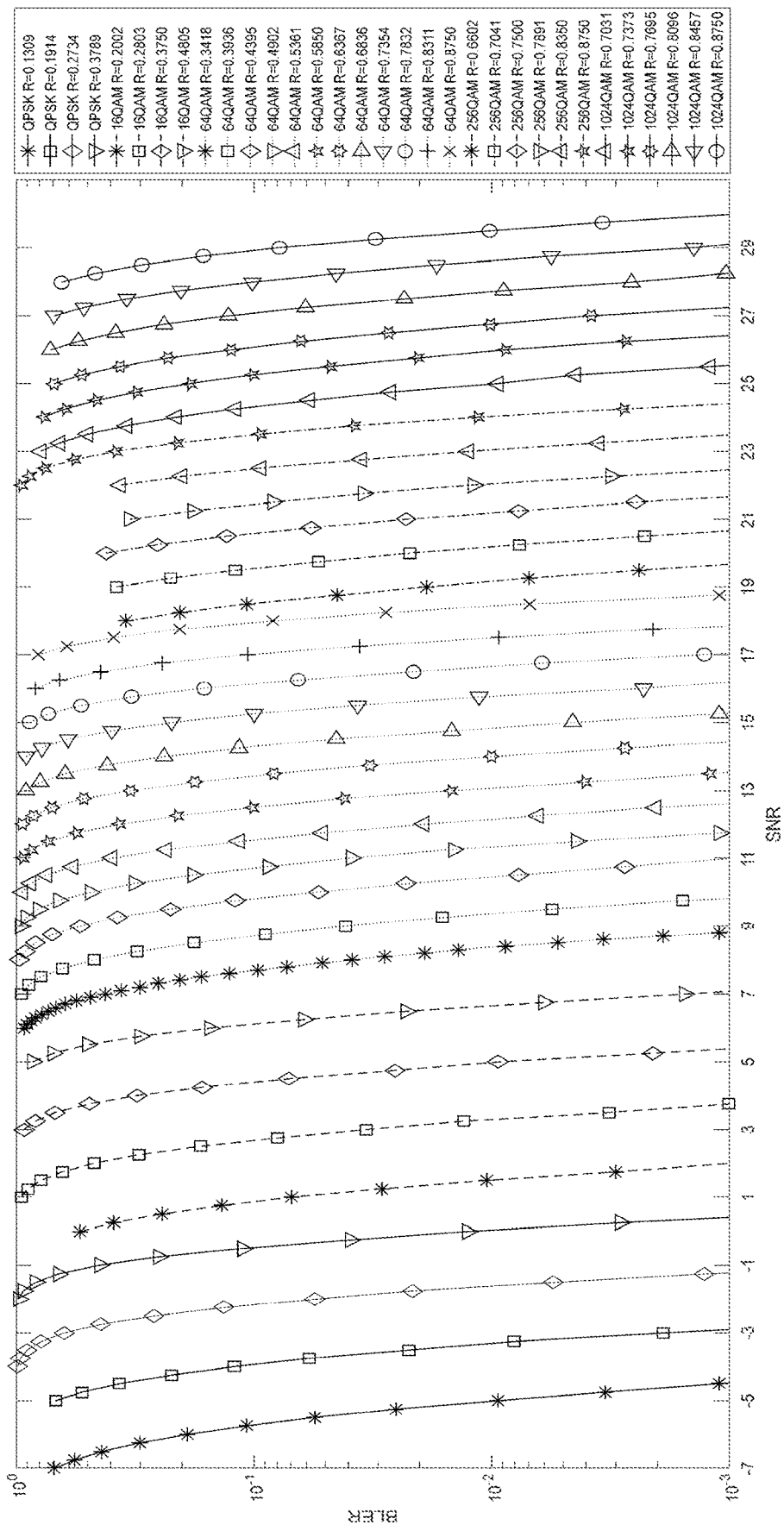
FIG. 13A is a schematic diagram of possible performance of yet still another modulation scheme according to an embodiment of this application.
Figure 13B:
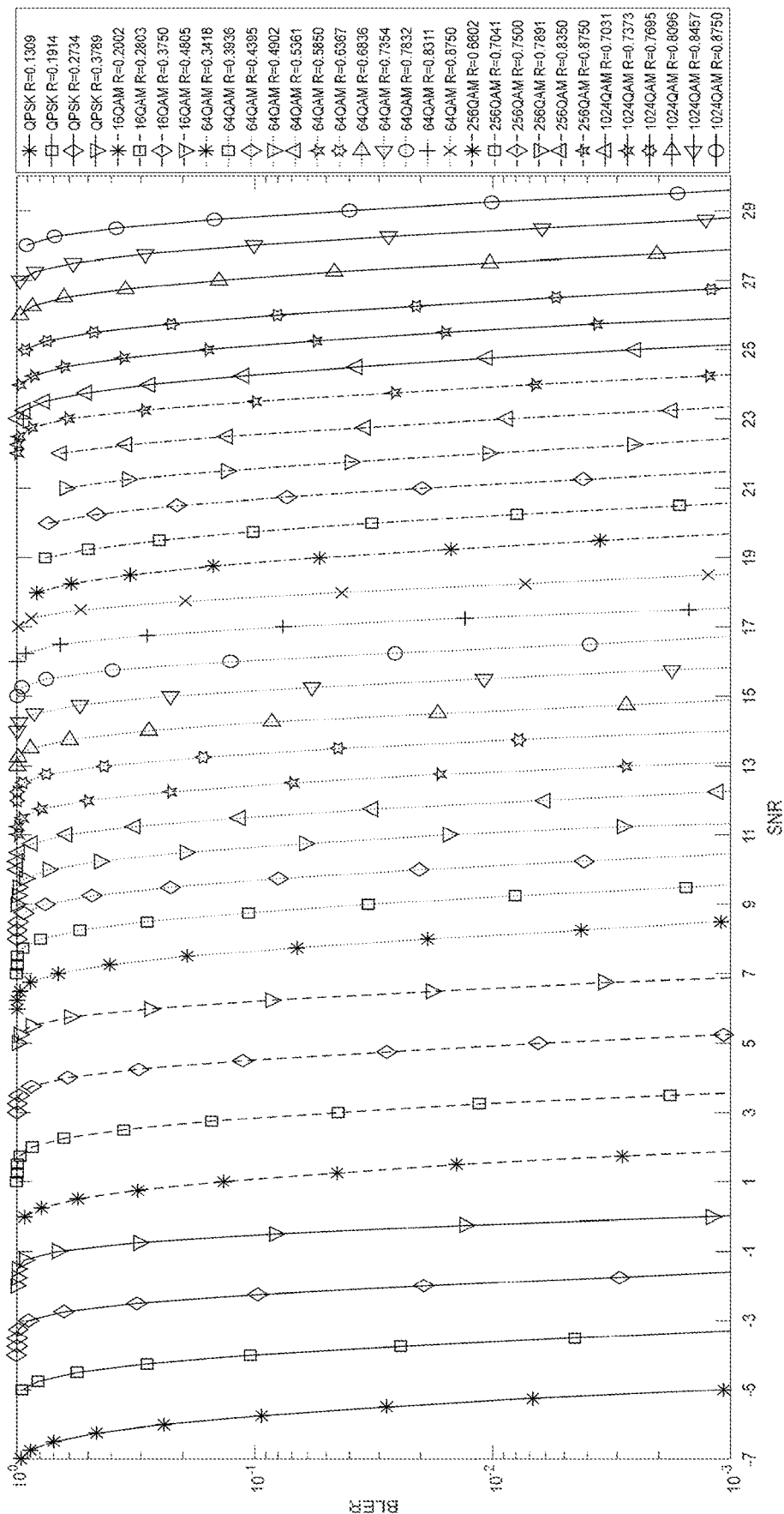
FIG. 13B is a schematic diagram of possible performance of yet still another modulation scheme according to an embodiment of this application.

FIG. 13A is a schematic diagram of possible performance of a modulation scheme in the MCS information set in Design 3 according to an embodiment of this application, and specifically, a schematic diagram of a relationship between a BLER and an SNR that are obtained on an AWGN channel by modulating, during coding by using a polar code with a 1024-bit code length, a signal by using modulation modes and code rates that correspond to the MCS 0 to the MCS 31 in Table 3. FIG. 13B is a schematic diagram of other possible performance of a modulation scheme in the MCS information set in Design 3 according to an embodiment of this application, and specifically, a schematic diagram of a relationship between a BLER and an SNR that are obtained on the AWGN channel by modulating, during coding by using a polar code with a 2048-bit code length, the signal by using the modulation modes and the code rates that correspond to the MCS 0 to the MCS 31 in Table 3. It can be learned that, when a modulation scheme (which specifically includes a modulation mode and spectral efficiency or a code rate) corresponding to any MCS index in the 32 MCS information subsets is used to modulate a wireless communication signal, a signal to noise ratio required for reaching a target block error rate falls within an interval [−5 dB, 30 dB] (in consideration of a difference in an actual communication scenario, an appropriate error range is allowed).

In Design 3, it is considered that, in some scenarios (for example, a vehicle-mounted communication system) that is ideal in signal to noise ratio distribution, for example, a communication scenario in which a signal to noise ratio is greater than 10 dB, a performance difference between modulation modes of 64QAM and above is small, so that, in any signal to noise ratio range falling within [10 dB, 30 dB], the performance difference between the modulation modes is further reduced. Therefore, a higher-order modulation scheme can be selected as much as possible within a signal to noise ratio range [3 dB, 30 dB], to improve a rate and reliability of data transmission.

Optionally, there is an information subset whose code rate is greater than or equal to 0.875 in the predefined MCS information set. For example, a code rate corresponding to the MCS 21 in Table 1 is 0.875. Because there is the information subset whose code rate is greater than or equal to 0.875 in the information set, when the channel quality is good, a modulation mode corresponding to an information subset whose code rate is greater than 0.875 can be selected for modulation, to improve efficiency of data transmission. The code rate (code rate) is also referred to as a code rate, code efficiency, or a code rate, and is a proportion of wanted data in a data stream. A larger code rate indicates a larger proportion of wanted data and higher information transmission efficiency. Usually, when the channel quality is poor, more redundant information needs to be added to ensure that a receive end can correctly demodulate a signal. In this case, the code rate is lower. When the channel quality is good, few redundancy check bits can correctly demodulate the signal. In this case, the code rate is higher. Therefore, an appropriate code rate is selected based on a channel change, so that a user with the good channel quality can obtain a higher information transmission rate.

Further, optionally, in the information subsets whose modulation modes are 1024QAM, 256QAM, and 64QAM in the predefined MCS information set, there is an information subset whose code rate is greater than or equal to 0.875 in information subsets corresponding to one or more modulation modes. For example, in Table 1, a modulation mode corresponding to the MCS 21 is 64QAM, and the code rate corresponding to the MCS 21 is 0.875, a modulation mode corresponding to the MCS 26 is 256QAM, and a code rate corresponding to the MCS 26 is 0.875, and a modulation mode corresponding to the MCS 31 is 1024QAM, and a code rate corresponding to the MCS 31 is 0.875. In this way, if a highest-order modulation mode supported by the node is 64QAM, because 64QAM also has the information subset whose code rate is greater than or equal to 0.875, when the channel quality is supported, the code rate of 0.875 (even a code rate greater than 0.875) can be used to modulate the signal, to improve an information transmission rate. Correspondingly, if the highest-order modulation mode supported by the node is 256QAM or 1024QAM, the code rate of 0.875 (even the code rate greater than 0.875) can also be used to modulate the signal, to improve the information transmission rate.

Optionally, the first MCS index may be indicated by using N bits (bits) in a message sent by the second node to the first node. For example, the first index may be indicated by using five bits in the message. If the five bits in the message are "01100", the first index is the MCS 20. Further, optionally, for example, the predefined MCS set is the MCS information table described in Table 1, and the first MCS index is the MCS 20. A modulation mode corresponding to the MCS 20 is 64QAM, spectral efficiency corresponding to the MCS 20 is 4.9102, and/or a code rate corresponding to the MCS 20 is 0.8184.

It may be understood that the second node sends the first MCS index to the first node, and correspondingly, the first node receives the first MCS index from the second node.

Step S303: The first node receives data sent by the second node or sends data to the second node based on the first modulation mode.

In a possible implementation solution, according to a protocol specification, for the C link (or the downlink channel), the second node sends the first MCS index to the first node. The second node modulates the data in the first modulation mode corresponding to the first index, and sends a modulated signal to the first node. The first node may demodulate the signal from the second node in the first modulation mode corresponding to the MCS index, to receive the data from the second node. For the T link (or the uplink channel), the second node sends the first MCS index to the first node, and the first node may modulate the data in the first modulation mode corresponding to the first MCS index, and send a modulated signal to the second node. The second node demodulates the signal from the first node, to receive the data from the first node.

For example, the MCS information set is Table 1, and the first MCS index is the MCS 20. The corresponding first modulation mode is 64QAM. Therefore, when sending the data to the second node, the first node may modulate a signal in the mode 64QAM, and then send a modulated signal. Optionally, if spectral efficiency included in a first information subset in which the MCS 20 is located is 4.9102, when the signal is modulated, the signal is modulated by using the spectral efficiency of 4.9102. Alternatively, if a code rate included in a first information subset in which the MCS 20 is located is 0.8184, when the signal is modulated, the data is modulated by using the code rate of 0.8184. Then, the modulated signal is sent.

For another example, the MCS information set is Table 1, and the first MCS index is the MCS 20. The corresponding first modulation mode is 64QAM. Because a modulation process corresponds to a demodulation process, generally, if a node that sends data uses a modulation mode to perform modulation, a node that receives the data also uses the same modulation mode to perform demodulation. Therefore, the first node demodulates the received signal from the second node based on the modulation mode 64QAM and the spectral efficiency of 4.9102 (or the code rate of 0.8184), to receive the data sent by the second node.

Step S304: The second node receives the data sent by the first node or sends the data to the first node based on the first modulation mode corresponding to the first MCS index.

For example, the MCS information set is Table 1, and the first MCS index is the MCS 20. The corresponding first modulation mode is 64QAM. Therefore, when sending the data to the first node, the second node may modulate the signal in the mode 64QAM, and then send the modulated signal. Optionally, if the spectral efficiency included in the first information subset in which the MCS 20 is located is 4.9102, when the signal is modulated, the signal is modulated by using the spectral efficiency of 4.9102. Alternatively, if the code rate included in the first information subset in which the MCS 20 is located is 0.8184, when the signal is modulated, the data is modulated by using the code rate of 0.8184. Then, the modulated signal is sent.

For another example, the MCS information set is Table 1, and the first MCS index is the MCS 20. The corresponding first modulation mode is 64QAM. The modulation process corresponds to the demodulation process. Therefore, the second node demodulates the received signal based on the modulation mode 64QAM and the spectral efficiency of 4.9102 (or the code rate of 0.8184), to receive the data sent by the first node.

In the embodiment shown in FIG. 3, the first node can receive the first MCS index, and send or receive the data based on the first modulation mode corresponding to the first MCS index. In this way, a modulation scheme (which specifically includes a modulation mode, spectral efficiency, a code rate, or the like) can be dynamically adjusted based on different MCS indexes. For example, when the channel condition is poor, the modulation mode (which may specifically further include the corresponding spectral efficiency or a corresponding code rate) corresponding to the smaller MCS index in the 32 MCS information subsets can be selected to send or receive the data. When the channel condition is good, the modulation mode corresponding to the larger MCS index in the 32 MCS information subsets can be selected to send or receive the data. This improves flexibility of selecting the modulation mode, maximizes the transmission capability of the wireless channel, and improves efficiency and reliability of data transmission.

As mentioned above, the predefined MCS information set may be stored in the format, for example, the table, the set, the array, or the JSON data. In still another optional design, the predefined MCS information set may include:

Design 4

In an implementation, there are 10 MCS information subsets whose modulation modes are QPSK in the predefined MCS information set. Further, a spectral efficiency set corresponding to the MCS information subsets whose modulation modes are QPSK is {0.2891, 0.3691, 0.4668, 0.5801, 0.7207, 0.8828, 1.0586, 1.2441, 1.4258, 1.6016}, or a code rate set corresponding to the MCS information subsets is {0.1445, 0.1846, 0.2334, 0.2900, 0.3604, 0.4414, 0.5293, 0.6221, 0.7129, 0.8008}. Because a performance difference between different modulation modes is great, a relationship between a signal to noise ratio and a block error rate is reflected as that signal to noise ratios required by the different modulation modes for reaching a target block error rate differ greatly. In a communication system, if a performance difference between modulation schemes is great, to meet a block error rate requirement, a smaller quantity of modulation schemes can be selected within a signal to noise ratio range. In this case, it is difficult to meet a user requirement. Therefore, in the foregoing solution, the foregoing design of the MCS information subsets whose modulation modes are QPSK makes the performance difference between the modulation schemes small, so that a device that supports QPSK can appropriately select a better modulation scheme within a signal to noise ratio range. Further, in the foregoing solution, the information subset can implement a highest code rate of 0.8008 (or a highest code rate of 0.8008 corresponding to spectral efficiency), so that the device that supports QPSK can achieve a high throughput.

For the MCS information subsets whose modulation modes are QPSK, alternatively, there are less than or equal to 10 (for example, any one of 7 to 10) MCS information subsets whose modulation modes are QPSK in the predefined MCS information set. A spectral efficiency set corresponding to the MCS information subsets whose modulation modes are QPSK includes the universal set or a subset of a set {0.2891, 0.3691, 0.4668, 0.5801, 0.7207, 0.8828, 1.0586, 1.2441, 1.4258, 1.6016}, or a code rate set corresponding to the MCS information subsets includes the universal set or a subset of a set {0.1445, 0.1846, 0.2334, 0.2900, 0.3604, 0.4414, 0.5293, 0.6221, 0.7129, 0.8008}. For example, if a quantity of the MCS information subsets whose modulation modes are QPSK is one of 7 to 10, a spectral efficiency set corresponding to the MCS information subsets whose modulation modes are QPSK includes the subset of {0.2891, 0.3691, 0.4668, 0.5801, 0.7207, 0.8828, 1.0586, 1.2441, 1.4258, 1.6016}, for example, {0.4668, 0.5801, 0.7207, 0.8828, 1.0586, 1.2441, 1.4258, 1.6016}. For another example, when a quantity of the MCS information subsets whose modulation modes are QPSK is 10, a spectral efficiency set corresponding to the MCS information subsets whose modulation modes are QPSK includes a proper subset of {0.2891, 0.3691, 0.4668, 0.5801, 0.7207, 0.8828, 1.0586, 1.2441, 1.4258, 1.6016}, but is not {0.2891, 0.3691, 0.4668, 0.5801, 0.7207, 0.8828, 1.0586, 1.2441, 1.4258. 1.6016}. Correspondingly, for descriptions of the code rate set, correspondingly refer to the descriptions of the frequency efficiency set.

Further, optionally, there are seven MCS information subsets whose modulation modes are 16QAM in the predefined MCS information set. Further, a spectral efficiency set corresponding to the MCS information subsets whose modulation modes are 16QAM is {1.8008, 2.0781, 2.4023, 2.7344, 3.0430, 3.3320, 3.5430}, or a code rate set corresponding to the MCS information subsets is {0.4502, 0.5195, 0.6006, 0.6836, 0.7607, 0.8330, 0.8857}. In the foregoing solution, a highest code rate in the information subset is 0.8857, so that a device that supports 16QAM can achieve a high throughput.

For the MCS information subsets whose modulation modes are 16QAM, alternatively, there are less than or equal to seven (for example, four, five, or six) MCS information subsets whose modulation modes are 16QAM in the predefined MCS information set, and/or a spectral efficiency set corresponding to the MCS information subsets whose modulation modes are 16QAM includes the universal set or a subset of a set {1.8008, 2.0781, 2.4023, 2.7344, 3.0430, 3.3320, 3.5430}, or a code rate set corresponding to the MCS information subsets includes the universal set or a subset of a set {0.4502, 0.5195, 0.6006, 0.6836, 0.7607, 0.8330, 0.8857}. For example, if a quantity of the MCS information subsets whose modulation modes are 16QAM is 6, a spectral efficiency set corresponding to the MCS information subsets whose modulation modes are QPSK includes the subset of {1.8008, 2.0781, 2.4023, 2.7344, 3.0430, 3.3320, 3.5430}, for example, {2.0781, 2.4023, 2.7344, 3.0430, 3.3320, 3.5430}. For another example, when a quantity of the MCS information subsets whose modulation modes are 16QAM is 7, a spectral efficiency set corresponding to the MCS information subsets whose modulation modes are QPSK includes a proper subset of {1.8008, 2.0781, 2.4023, 2.7344, 3.0430, 3.3320, 3.5430}, but is not {1.8008, 2.0781, 2.4023, 2.7344, 3.0430, 3.3320, 3.5430}.

Further, optionally, there are six MCS information subsets whose modulation modes are 64QAM in the predefined MCS information set. Further, a spectral efficiency set corresponding to the MCS information subsets whose modulation modes are 64QAM is {3.8379, 4.2129, 4.5879, 4.9102, 5.2500, 5.5020}, or a code rate set corresponding to the MCS information subsets is {0.6396, 0.7021, 0.7646, 0.8184, 0.8750, 0.9170}. In the foregoing solution, a highest code rate in the information subset is 0.9170, so that a device that supports 64QAM can achieve a high throughput.

For the MCS information subsets whose modulation modes are 64QAM, alternatively, there are six, seven, eight, or nine MCS information subsets whose modulation modes are 64QAM in the predefined MCS information set, and a spectral efficiency set corresponding to the MCS information subsets whose modulation modes are 64QAM includes the universal set or a subset of a set {3.8379, 4.2129, 4.5879, 4.9102, 5.2500, 5.5020}, or a code rate set corresponding to the MCS information subsets includes the universal set or a subset of a set {0.6396, 0.7021, 0.7646, 0.8184, 0.8750, 0.9170}. For example, if there are eight MCS information subsets whose modulation modes are 64QAM in the predefined MCS information set, a spectral efficiency set corresponding to the eight MCS information subsets whose modulation modes are 64QAM includes the set {3.8379, 4.2129, 4.5879, 4.9102, 5.2500, 5.5020}, or includes a proper subset but does not include the universal set of the set {3.8379, 4.2129, 4.5879, 4.9102, 5.2500, 5.5020}.

Further, optionally, there are five MCS information subsets whose modulation modes are 256QAM in the predefined MCS information set. Further, a spectral efficiency set corresponding to the MCS information subsets whose modulation modes are 256QAM is {5.7188, 6.1797, 6.6016, 7.0000, 7.3203}, or a code rate set corresponding to the MCS information subsets is {0.7148, 0.7725, 0.8252, 0.8750, 0.9150}. In the foregoing solution, a highest code rate in the information subset is 0.9150, so that a device that supports 256QAM can achieve a high throughput.

For the MCS information subsets whose modulation modes are 256QAM, alternatively, the spectral efficiency set corresponding to the MCS information subsets whose modulation modes are 256QAM may include a proper subset of {5.7188, 6.1797, 6.6016, 7.0000, 7.3203}, or the code rate set corresponding to the MCS information subsets includes a proper subset of {0.7148, 0.7725, 0.8252, 0.8750, 0.9150}.

Further, optionally, there are four MCS information subsets whose modulation modes are 1024QAM in the predefined MCS information set. Further, a spectral efficiency set corresponding to the MCS information subsets whose modulation modes are 1024QAM is {7.5000, 7.9297, 8.3594, 9.2285}, or a code rate set corresponding to the MCS information subsets is {0.7500, 0.7930, 0.8359, 0.9229}. In the foregoing solution, a highest code rate in the information subset is 0.9229, so that a device that supports 1024QAM can achieve a high throughput.

For the MCS information subsets whose modulation modes are 1024QAM, alternatively, there may be four or five MCS information subsets whose modulation modes are 1024QAM in the predefined MCS information set, and a spectral efficiency set corresponding to the MCS information subsets whose modulation modes are 1024QAM includes the universal set or a subset of a set {7.5000, 7.9297, 8.3594, 9.2285}, or a code rate set corresponding to the MCS information subsets includes the universal set or a subset of a set {0.7500, 0.7930, 0.8359, 0.9229}. For example, if there are five MCS information subsets whose modulation modes are 1024QAM in the predefined MCS information set, a spectral efficiency set corresponding to the MCS information subsets whose modulation modes are 1024QAM includes the universal set or a proper subset of the set {7.5000, 7.9297, 8.3594, 9.2285}, or a code rate set corresponding to the MCS information subsets includes the universal set or a proper subset of the set {0.7500, 0.7930, 0.8359, 0.9229}.

In an implementation, the predefined set may include MCS information subsets of any one or more modulation modes in the MCS information subsets of the plurality of modulation modes. For example, the predefined set may include MCS information subsets whose modulation modes are one or more of QPSK, 16QAM, 64QAM, 256QAM or 1024QAM.

Further, optionally, MCS information subsets whose modulation modes are any one of QPSK, 16QAM, 64QAM, 256QAM, and 1024QAM and that are included in the predefined set may include some or all of MCS information subsets of corresponding modulation modes enumerated above. Specifically, for example, there are five MCS information subsets whose modulation modes are 256QAM and four MCS information subsets whose modulation modes are 1024QAM in the predefined MCS information set. For another example, there are 10 MCS information subsets whose modulation modes are QPSK, seven MCS information subsets whose modulation modes are 16QAM, six MCS information subsets whose modulation modes are 64QAM, five MCS information subsets whose modulation modes are 256QAM, and four MCS information subsets whose modulation modes are 1024QAM in the predefined MCS information set.

Specifically, for example, Table 4 is a possible MCS table provided in this embodiment of this application. The MCS table includes 32 MCS indexes (MCS Indexes). In the table, indexes MSC 0 to MCS 31 (in a specific implementation process, the index may be alternatively represented by using five bits. For example, "00000" represents the MCS 0) is in the first column, modulation modes (Modulation) that include four modulation modes: quadrature phase shift keying QPSK, 16 quadrature amplitude modulation QAM, 64QAM, 256QAM, and 1024QAM, are in the second column, spectral efficiency (Efficiency) is in the third column, and code rates (R) are in the fourth column. It can be learned that, in Table 4, modulation modes corresponding to 10 MCS indexes are QPSK, modulation modes corresponding to seven MCS indexes are 16QAM, modulation modes corresponding to six MCS indexes are 64QAM, modulation modes corresponding to five MCS indexes are 256QAM, and modulation modes corresponding to four MCS indexes are 1024QAM.

TABLE 4

MCS table
MCS table 4

| MCS index | Modulation | Efficiency | R |
| --- | --- | --- | --- |
| MCS 0 | QPSK | 0.2891 | 0.1445 |
| MCS 1 | QPSK | 0.3691 | 0.1846 |
| MCS 2 | QPSK | 0.4668 | 0.2334 |
| MCS 3 | QPSK | 0.5801 | 0.2900 |
| MCS 4 | QPSK | 0.7207 | 0.3604 |
| MCS 5 | QPSK | 0.8828 | 0.4414 |
| MCS 6 | QPSK | 1.0586 | 0.5293 |
| MCS 7 | QPSK | 1.2441 | 0.6221 |
| MCS 8 | QPSK | 1.4258 | 0.7129 |
| MCS 9 | QPSK | 1.6016 | 0.8008 |
| MCS 10 | 16 QAM | 1.8008 | 0.4502 |
| MCS 11 | 16 QAM | 2.0781 | 0.5195 |
| MCS 12 | 16 QAM | 2.4023 | 0.6006 |
| MCS 13 | 16 QAM | 2.7344 | 0.6836 |
| MCS 14 | 16 QAM | 3.0430 | 0.7607 |
| MCS 15 | 16 QAM | 3.3320 | 0.8330 |
| MCS 16 | 16 QAM | 3.5430 | 0.8857 |
| MCS 17 | 64 QAM | 3.8379 | 0.6396 |
| MCS 18 | 64 QAM | 4.2129 | 0.7021 |
| MCS 19 | 64 QAM | 4.5879 | 0.7646 |
| MCS 20 | 64 QAM | 4.9102 | 0.8184 |
| MCS 21 | 64 QAM | 5.2500 | 0.8750 |
| MCS 22 | 64 QAM | 5.5020 | 0.9170 |
| MCS 23 | 256 QAM | 5.7188 | 0.7148 |
| MCS 24 | 256 QAM | 6.1797 | 0.7725 |

TABLE 4-continued

MCS table
MCS table 4

| MCS index | Modulation | Efficiency | R |
| --- | --- | --- | --- |
| MCS 25 | 256 QAM | 6.6016 | 0.8252 |
| MCS 26 | 256 QAM | 7.0000 | 0.8750 |
| MCS 27 | 256 QAM | 7.3203 | 0.9150 |
| MCS 28 | 1024 QAM | 7.5000 | 0.7500 |
| MCS 29 | 1024 QAM | 7.9297 | 0.7930 |
| MCS 30 | 1024 QAM | 8.3594 | 0.8359 |
| MCS 31 | 1024 QAM | 9.2285 | 0.9229 |

It should be noted that, in embodiments of this application, a value of spectral efficiency and a value of a code rate each are accurate to 4 decimal places. In some possible implementations, there may be alternatively other precision. For example, FIG. 17 is a schematic diagram of a possible MCS according to an embodiment of this application. The indexes MSC 0 to MCS 31 are in the first column, modulation modes (Modulation) are in the second column, spectral efficiency (Efficiency) is in the third column, and code rates (R) are in the fourth column. The value of the spectral efficiency is accurate to 9 decimal places, and the value of the code rate is accurate to 10 decimal places.

It may be understood that, in an MCS information set shown in Table 4 or FIG. 17, some parameters are converted into other parameters for representation. For example, the modulation mode may be replaced with a modulation order Qm (a modulation order corresponding to QPSK is 2, a modulation order corresponding to 16QAM is 4, a modulation order corresponding to 64QAM is 6, a modulation order corresponding to 256AQM is 8, and a modulation order corresponding to 1024QAM is 10). For another example, the code rate may be replaced with "a length of an information bit obtained by calculating the code rate×1024". For example, FIG. 18 is a schematic diagram of another possible MCS table according to an embodiment of this application. The indexes MSC 0 to MCS 31 are in the first column, modulation modes (Modulation) are in the second column, lengths (also referred to as mother codes 1024 in some implementation scenarios) of information bits obtained by calculating code rates×1024 are in the third column, and spectral efficiency (Efficiency) are in the fourth column. In addition, in some specific implementation scenarios, the information set may further include other information, for example, may further include at least one of a modulation order and a signal to noise ratio (SNR, or referred to as S/N) required during modulation for reaching a target block error rate (block error rate, BLER) (for example, $10^{-3}$). Examples are not described herein again.

Optionally, in embodiments of this application, the MCS information set may be alternatively divided into a plurality of tables for representation. For example, (a) in FIG. 19 shows information subsets whose indexes are MCS 0 to MCS 9 and modulation modes are QPSK, (b) in FIG. 19 shows information subsets whose indexes are MCS 10 to MCS 16 and modulation modes are 16QAM, (c) in FIG. 19 shows information subsets whose indexes are MCS 17 to MCS 22 and modulation modes are 64QAM, (d) in FIG. 19 shows information subsets whose indexes are MCS 23 to MCS 27 and modulation modes are 256QAM, and (e) in FIG. 19 shows information subsets whose indexes are MCS 28 to MCS 31 and modulation modes are 1024QAM.

Figure 20A:
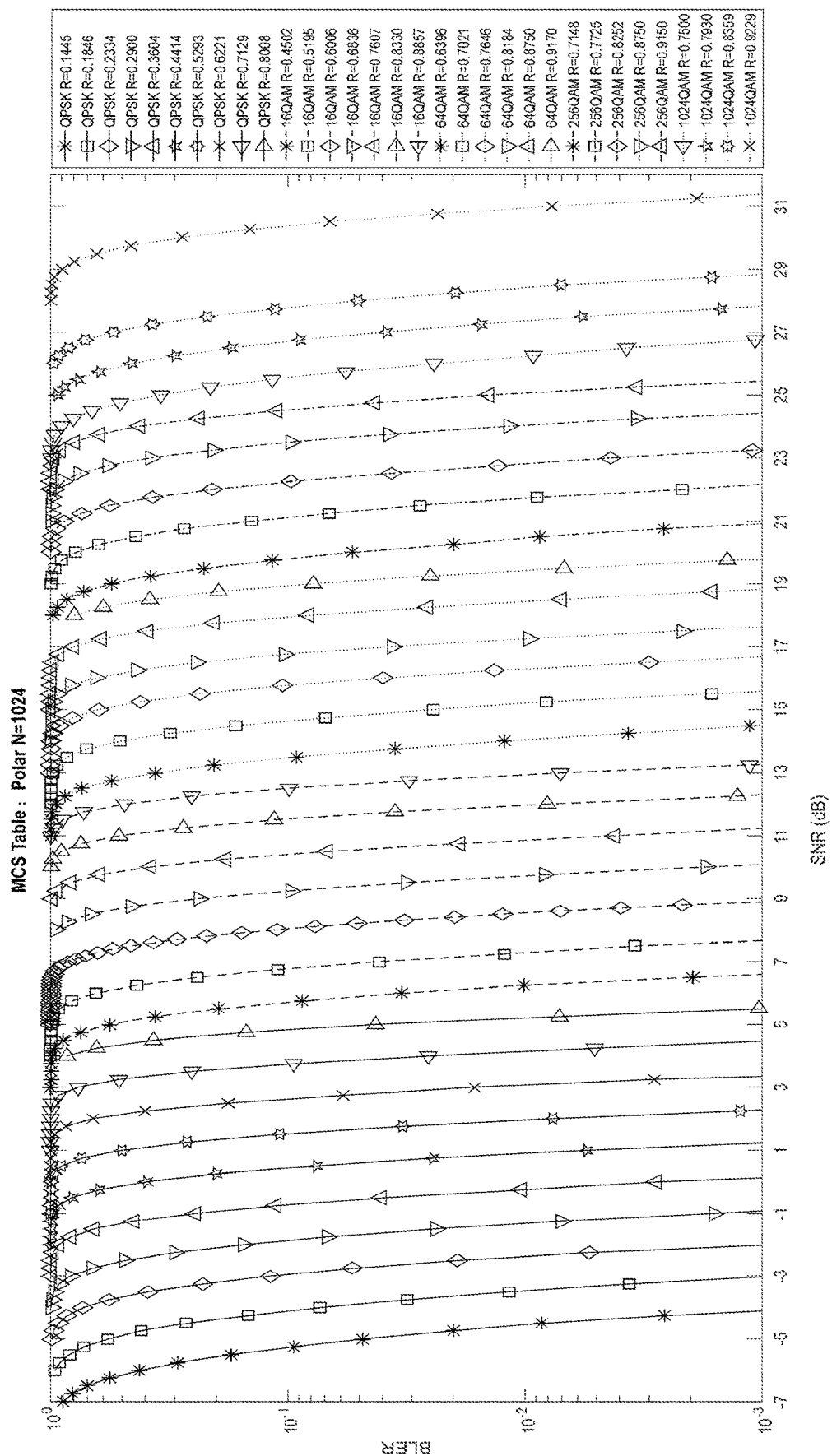
FIG. 20A is a schematic diagram of possible performance of yet still another modulation scheme according to an embodiment of this application.

FIG. 20A is a schematic diagram of possible performance of a modulation scheme in the MCS information set in Design 4 according to an embodiment of this application, and specifically, a schematic diagram of a relationship between a BLER and an SNR that are obtained on an additive white Gaussian noise (AWGN) channel by modulating, during coding by using a polar code with a 1024-bit code length (namely, a 1024-bit length of a data block obtained through coding), a signal by using modulation modes and code rates that correspond to the MCS 0 to the MCS 31 in Table 4.

Figure 20B:
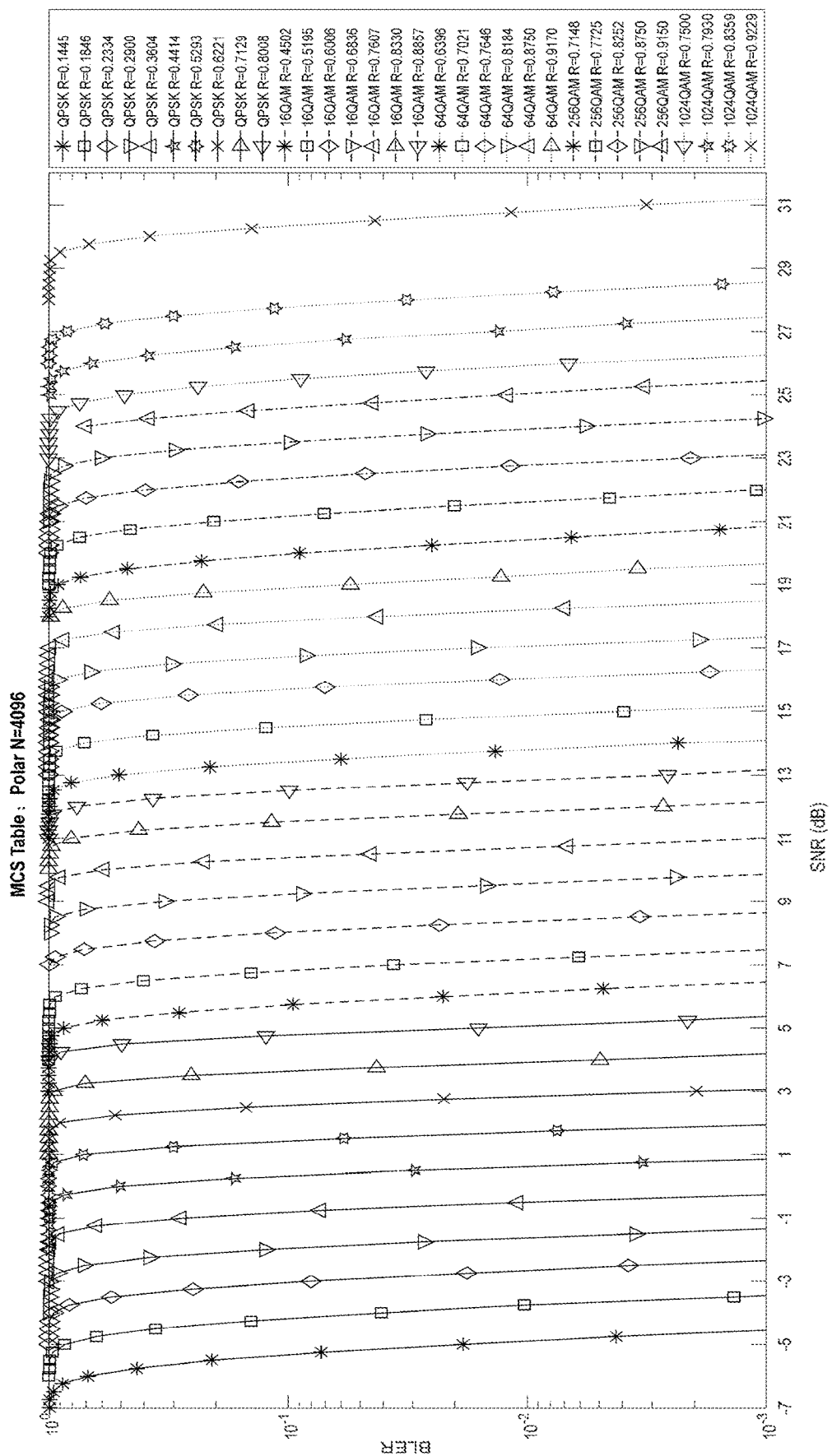
FIG. 20B is a schematic diagram of possible performance of yet still another modulation scheme according to an embodiment of this application.

FIG. 20B is a schematic diagram of other possible performance of the modulation scheme in the MCS information set in Design 4 according to an embodiment of this application, and specifically, a schematic diagram of a relationship between a BLER and an SNR that are obtained on the AWGN channel by modulating, during coding by using a polar code with a 4096-bit code length (namely, a 4096-bit length of a data block obtained through coding), the signal by using the modulation modes and the code rates that correspond to the MCS 0 to the MCS 31 in Table 4. It can be learned that, when a modulation scheme (which specifically includes a modulation mode, and spectral efficiency or a code rate) corresponding to any MCS index in the 32 MCS information subsets is used to modulate a wireless communication signal, a signal to noise ratio required for reaching a block error rate $10^{-3}$ falls within an interval [−5 dB, 32 dB] (in consideration of a difference in an actual communication scenario, an appropriate error range is allowed). Further, the performance difference between the modulation modes is small, so that a higher-order modulation scheme can be selected as much as possible within any signal to noise ratio range falling within [−5 dB, 32 dB], to improve a rate and reliability of data transmission.

Optionally, for the plurality of MCS information subsets, an interval between a first reference code rate difference and a difference between code rates corresponding to any two adjacent indexes whose corresponding modulation modes are the same is less than or equal to a first code rate threshold. It can be learned that a difference between two adjacent code rates is always distributed within a specific range. When a rule is reflected, the difference between the two adjacent code rates is always distributed around the first reference code rate difference, and an interval (or a deviation) between the difference and the first reference code rate difference is less than or equal to the first code rate threshold (for example, the first reference code rate difference is 0.07, and the first code rate threshold is 0.045. The difference between the two adjacent code rates is always approximately 0.07, and the interval between the difference and 0.07 does not exceed 0.045. In other words, the difference between the code rates falls within an interval [0.025, 0.15]). Therefore, the interval between the code rates is small and even. In this way, the higher-order modulation scheme can be selected as much as possible within the signal to noise ratio range, to improve the rate and reliability of data transmission.

It should be noted that the first reference code rate difference is used to describe a code rate distribution rule, and may not be a fixed value. The first code rate threshold is used to represent that there may be an error that is within a small range and that is between the reference code rate difference and the difference between the code rates, and may not be a fixed value.

Alternatively, the code rate corresponding to the MCS 0 in Table 4 may be 0.1250, and/or spectral efficiency corresponding to the MCS 0 may be 0.0250, so that a code rate range covered in Table 4 is wide, to adapt to some services having a low code rate requirement.

The foregoing describes the method in embodiments of this application in detail. The following describes apparatuses in embodiments of this application.

Figure 14:
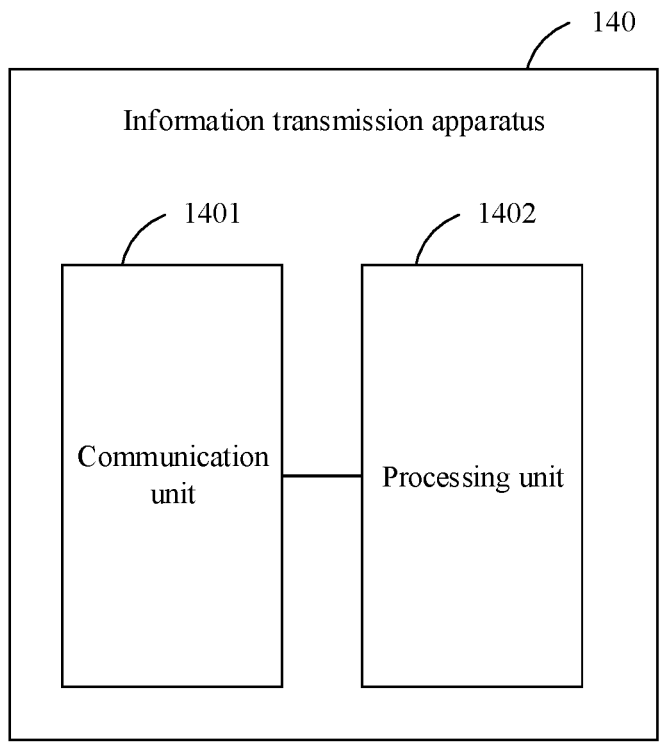
FIG. 14 is a schematic diagram of a structure of an information transmission apparatus according to an embodiment of this application.

FIG. 14 is a schematic diagram of a structure of an information transmission apparatus 140 according to an embodiment of this application. The apparatus 140 may be a node, or may be a component in a node, for example, a chip or an integrated circuit. The apparatus 140 may include a communication unit 1401 and a processing unit 1402. The information transmission apparatus 140 is configured to implement the foregoing information transmission method, for example, the information transmission method in the embodiment shown in FIG. 3.

In a possible implementation, the communication unit 1401 is configured to receive a first modulation and coding scheme MCS index from a second node, and the first MCS index corresponds to a first modulation mode.

The processing unit 1402 is configured to receive, by using the communication unit, data from the second node or send, by using the communication unit, data to the second node based on the first MCS index.

A first MCS information subset in which the first MCS index is located belongs to a predefined MCS information set, and the predefined MCS information set includes 32 MCS information subsets.

The first MCS information subset includes first spectral efficiency and/or a first code rate corresponding to the first MCS index, and the first modulation mode or a modulation order corresponding to the first modulation mode. The first code rate is a ratio of spectral efficiency corresponding to the first MCS index to the modulation order corresponding to the first modulation mode.

It can be learned that the apparatus 140 can receive an MCS index, and send or receive the data based on the first modulation mode corresponding to the first MCS index. In this way, a modulation scheme (which specifically includes a modulation mode, spectral efficiency, a code rate, or the like) can be dynamically adjusted based on different MCS indexes. For example, when a channel condition is poor, a modulation mode and spectral efficiency that correspond to a smaller MCS index in the 32 MCS information subsets can be selected to send or receive the data. When the channel condition is good, a modulation mode corresponding to a larger MCS index in the 32 MCS information subsets can be selected to send or receive the data. This improves flexibility of selecting the modulation mode, maximizes a transmission capability of a wireless channel, and improves efficiency and reliability of data transmission.

In another possible implementation, the communication unit 1401 is further configured to report an SINR indicator to the second node, and the first MCS index corresponds to the SINR indicator.

In still another possible implementation, each MCS information subset in the predefined MCS information set includes a corresponding MCS index, spectral efficiency and/or a code rate corresponding to the MCS index, and a modulation mode corresponding to the MCS index or a modulation order of the modulation mode. The code rate is a ratio of the spectral efficiency corresponding to the MCS index to the modulation order corresponding to the modulation mode. It may also be understood that the predefined MCS information set does not include a reserved entry. For an explanation of the reserved entry, refer to the foregoing descriptions.

In still another possible implementation, the predefined MCS information set includes at least one of quadrature phase shift keying QPSK, 16 quadrature amplitude modulation QAM, 64QAM, 256QAM, or 1024QAM.

In still another possible implementation, there are nine MCS information subsets whose modulation modes are QPSK in the predefined MCS information set, and/or a spectral efficiency set corresponding to the MCS information subsets whose modulation modes are QPSK is {0.2891, 0.3691, 0.4668, 0.5801, 0.7207, 0.8828, 1.0586, 1.2441, 1.4258}, or a code rate set corresponding to the MCS information subsets is {0.1445, 0.1846, 0.2334, 0.2900, 0.3604, 0.4414, 0.5293, 0.6221, 0.7129}.

The foregoing describes one possible quantity of the MCS information subsets whose modulation modes are QPSK in the 32 information subsets. Because a performance difference between different modulation modes is great, a relationship between a signal to noise ratio and a block error rate is reflected as that signal to noise ratios required by the different modulation modes for reaching a target block error rate differ greatly. For example, when a code rate is 0.15, based on the case that a polar code with a 1024-bit code length reaches a block error rate of $10^{-3}$, the QPSK modulation mode requires a signal to noise ratio of approximately −4, but in a channel condition in which a code rate is 0.35, based on the case that the polar code with the 1024-bit code length reaches the block error rate of $10^{-3}$, 16QAM requires a signal to noise ratio of approximately 5. A performance difference between the two modulation schemes (which specifically include the modulation modes, and further include the code rates or spectral efficiency) is great. In a communication system, if a performance difference between modulation schemes is great, to meet a block error rate requirement, a smaller quantity of modulation schemes can be selected within a signal to noise ratio range. In this case, it is difficult to meet a user requirement. Therefore, in the foregoing solution, the nine information subsets whose modulation modes are QPSK enable the performance difference between the modulation schemes to be small, so that a device that supports QPSK can appropriately select a better modulation scheme within a signal to noise ratio range. Further, in the MCS information subsets whose modulation modes are QPSK, an interval between two adjacent code rates is small and even. In this way, a higher-order modulation scheme can be selected as much as possible within the signal to noise ratio range, to improve a rate and reliability of data transmission.

In still another possible implementation, there are four MCS information subsets whose modulation modes are 16QAM in the predefined MCS information set, and/or a spectral efficiency set corresponding to the MCS information subsets whose modulation modes are 16QAM is {1.5273, 1.8008, 2.0781, 2.4023}, or a code rate set corresponding to the MCS information subsets is {0.3818, 0.4502, 0.5195, 0.6006}.

The foregoing describes one possible quantity of the MCS information subsets whose modulation modes are 16QAM in the 32 information subsets, and a device that supports 16QAM can select a modulation scheme with better performance by using the four information subsets whose modulation modes are 16QAM. Further, in the MCS information subsets whose modulation modes are 16QAM, an interval between two adjacent code rates is small and even. Therefore, the higher-order modulation scheme can be selected as much as possible when the modulation scheme is determined, to improve the rate and reliability of data transmission.

In still another possible implementation, there are nine MCS information subsets whose modulation modes are 64QAM in the predefined MCS information set, and/or a spectral efficiency set corresponding to the MCS information subsets whose modulation modes are 64QAM is {2.4199, 2.7480, 3.1055, 3.4746, 3.8379, 4.2129, 4.5879, 4.9102, 5.2500}, or a code rate set corresponding to the MCS information subsets is {0.4033, 0.4580, 0.5176, 0.5791, 0.6396, 0.7021, 0.7646, 0.8184, 0.8750}.

The foregoing describes one possible quantity of the MCS information subsets whose modulation modes are 64QAM in the 32 information subsets, and a device that supports 64QAM can select a modulation scheme with better performance by using the nine information subsets whose modulation modes are 64QAM. Further, in the MCS information subsets whose modulation modes are 64QAM, an interval between two adjacent code rates is small and even. Therefore, the higher-order modulation scheme can be selected as much as possible when the modulation scheme is determined, to improve the rate and reliability of data transmission.

In still another possible implementation, there are five MCS information subsets whose modulation modes are 256QAM in the predefined MCS information set, and/or a spectral efficiency set corresponding to the MCS information subsets whose modulation modes are 256QAM is {5.2813, 5.7188, 6.1797, 6.6016, 7.0000}, or a code rate set corresponding to the MCS information subsets is {0.6602, 0.7148, 0.7725, 0.8252, 0.8750}.

The foregoing describes one possible quantity of the MCS information subsets whose modulation modes are 256QAM in the 32 information subsets, and a device that supports 256QAM can select a modulation scheme with better performance by using the five information subsets whose modulation modes are 256QAM. Further, in the MCS information subsets whose modulation modes are 256QAM, an interval between two adjacent code rates is small and even. Therefore, the higher-order modulation scheme can be selected as much as possible when the modulation scheme is determined, to improve the rate and reliability of data transmission.

In still another possible implementation, there are five MCS information subsets whose modulation modes are 1024QAM in the predefined MCS information set, and/or a spectral efficiency set corresponding to the MCS information subsets whose modulation modes are 1024QAM is {7.0996, 7.5000, 7.9297, 8.3594, 8.7500}, or a code rate set corresponding to the MCS information subsets is {0.7100, 0.7500, 0.7930, 0.8359, 0.8750}.

The foregoing describes one possible quantity of the MCS information subsets whose modulation modes are 1024QAM in the 32 information subsets, and a device that supports 1024QAM can select a modulation scheme with better performance by using the five information subsets whose modulation modes are 1024QAM. Further, in the MCS information subsets whose modulation modes are 1024QAM, an interval between two adjacent code rates is small and even. Therefore, the higher-order modulation scheme can be selected as much as possible when the modulation scheme is determined, to improve the rate and reliability of data transmission.

In still another possible implementation, there is an information subset whose code rate is greater than or equal to 0.875 in the predefined MCS information set.

The code rate (code rate) is also referred to as a code rate, code efficiency, or a code rate, and is a proportion of wanted data in a data stream. A larger code rate indicates a larger proportion of wanted data and higher information transmission efficiency. Usually, when channel quality is poor, more redundant information needs to be added to ensure that a receive end can correctly demodulate a signal. In this case, the code rate is lower. When the channel quality is good, few redundancy check bits can correctly demodulate the signal. In this case, the code rate is higher. Therefore, an appropriate code rate is selected based on a channel change, so that a user with the good channel quality can obtain a higher information transmission rate.

In the foregoing implementation, because there is the information subset whose code rate is greater than or equal to 0.875 in the information set, when the channel quality is good, a modulation mode corresponding to an information subset whose code rate is greater than 0.875 can be selected for modulation, to improve efficiency of data transmission.

In still another possible implementation, in the information subsets whose modulation modes are 1024QAM, 256QAM, and 64QAM in the predefined MCS information set, there is an information subset whose code rate is greater than or equal to 0.875 in information subsets corresponding to one or more modulation modes.

According to the foregoing implementation, if a highest-order modulation mode supported by a node is 64QAM, because 64QAM also has the information subset whose code rate is greater than or equal to 0.875, when the channel quality is supported, the code rate of 0.875 (even a code rate greater than 0.875) can be used to modulate the signal, to improve an information transmission rate. Correspondingly, if the highest-order modulation mode supported by the node is 256QAM or 1024QAM, the code rate of 0.875 (even the code rate greater than 0.875) can also be used to modulate the signal, to improve the information transmission rate.

In still another possible implementation, for the plurality of MCS information subsets, an interval between a first reference code rate difference and a difference between code rates corresponding to any two adjacent indexes whose corresponding modulation modes are the same is less than or equal to a first code rate threshold.

The foregoing describes a code rate distribution rule between information subsets whose modulation modes are the same. A difference between two adjacent code rates is always distributed within a specific range. When the rule is reflected, the difference between the two adjacent code rates is always distributed around the first reference code rate difference, and an interval (or a deviation) between the difference and the first reference code rate difference is less than or equal to the first code rate threshold (for example, the first reference code rate difference is 0.07, and the first code rate threshold is 0.045. The difference between the two adjacent code rates is always approximately 0.07, and the interval between the difference and 0.07 does not exceed 0.045. In other words, the difference between the code rates falls within an interval [0.025, 0.15]). Therefore, the interval between the code rates is small and even. In this way, the higher-order modulation scheme can be selected as much as possible within the signal to noise ratio range, to improve the rate and reliability of data transmission. The first reference code rate difference is used to describe the code rate distribution rule, and may not be a fixed value.

In still another possible implementation, there are four MCS information subsets whose modulation modes are QPSK in the predefined MCS information set, and/or a spectral efficiency set corresponding to the MCS information subsets whose modulation modes are QPSK is {0.3086, 0.4453, 0.6309, 0.8652}, or a code rate set corresponding to the MCS information subsets is {0.1543, 0.2227, 0.3154, 0.4326}.

The foregoing describes another possible quantity of the MCS information subsets whose modulation modes are QPSK in the 32 information subsets. Because QSPK has a good anti-noise capability but low efficiency of data transmission, QSPK is usually used on a channel with a low SNR. However, because an SNR in some scenarios is high, for example, a vehicle-mounted wireless channel, to adapt to the scenario with the high SNR, a quantity of the QPSK modulation modes can be reduced or an interval between code rates of the QPSK modulation mode can be increased. A performance difference between modulation modes working in a low signal to noise ratio is increased, so that a performance difference between modulation modes working in a high signal to noise ratio is reduced, to improve transmission efficiency and reliability of a communication system working in the scenario with the high signal to noise ratio.

In still another possible implementation, there are seven MCS information subsets whose modulation modes are 16QAM in the predefined MCS information set, and/or a spectral efficiency set corresponding to the MCS information subsets whose modulation modes are 16QAM is {0.9219, 1.1211, 1.3203, 1.5586, 1.8203, 2.0781, 2.3594}, or a code rate set corresponding to the MCS information subsets is {0.2305, 0.2803, 0.3301, 0.3896, 0.4551, 0.5195, 0.5898}.

The foregoing describes one possible quantity of the MCS information subsets whose modulation modes are 16QAM in the 32 information subsets, and a device that supports 16QAM can select a modulation scheme with better performance by using the seven information subsets whose modulation modes are 16QAM. Further, in the MCS information subsets whose modulation modes are 16QAM, an interval between two adjacent code rates is small and even. Therefore, a higher-order modulation scheme can be selected as much as possible when the modulation scheme is determined, to improve the rate and reliability of data transmission.

In still another possible implementation, there are 10 MCS information subsets whose modulation modes are 64QAM in the predefined MCS information set, and/or a spectral efficiency set corresponding to the MCS information subsets whose modulation modes are 64QAM is {2.3613, 2.6660, 2.9766, 3.2813, 3.6445, 3.9785, 4.3066, 4.6523, 4.9512, 5.2500}, or a code rate set corresponding to the MCS information subsets is {0.3936, 0.4443, 0.4961, 0.5469, 0.6074, 0.6631, 0.7178, 0.7754, 0.8252, 0.8750}.

The foregoing describes one possible quantity of the MCS information subsets whose modulation modes are 64QAM in the 32 information subsets, and a device that supports 64QAM can select a modulation scheme with better performance by using the 10 information subsets whose modulation modes are 64QAM. Further, in the MCS information subsets whose modulation modes are 64QAM, an interval between two adjacent code rates is small and even. Therefore, the higher-order modulation scheme can be selected as much as possible when the modulation scheme is determined, to improve the rate and reliability of data transmission.

In still another possible implementation, there are six MCS information subsets whose modulation modes are 256QAM in the predefined MCS information set, and/or a spectral efficiency set corresponding to the MCS information subsets whose modulation modes are 256QAM is {5.2813, 5.6328, 6.0000, 6.3125, 6.6797, 7.0000}, or a code rate set corresponding to the MCS information subsets is {0.6602, 0.7041, 0.7500, 0.7891, 0.8350, 0.8750}.

The foregoing describes one possible quantity of the MCS information subsets whose modulation modes are 256QAM in the 32 information subsets, and a device that supports 256QAM can select a modulation scheme with better performance by using the six information subsets whose modulation modes are 256QAM. Further, in the MCS information subsets whose modulation modes are 256QAM, an interval between two adjacent code rates is small and even. Therefore, the higher-order modulation scheme can be selected as much as possible when the modulation scheme is determined, to improve the rate and reliability of data transmission.

In still another possible implementation, there are five MCS information subsets whose modulation modes are 1024QAM in the predefined MCS information set, and/or a spectral efficiency set corresponding to the MCS information subsets whose modulation modes are 1024QAM is {7.0996, 7.5000, 7.9297, 8.3594, 8.7500}, or a code rate set corresponding to the MCS information subsets is {0.7100, 0.7500, 0.7930, 0.8359, 0.8750}.

The foregoing describes one possible quantity of the MCS information subsets whose modulation modes are 1024QAM in the 32 information subsets, and a device that supports 1024QAM can select a modulation scheme with better performance by using the five information subsets whose modulation modes are 1024QAM. Further, in the MCS information subsets whose modulation modes are 1024QAM, an interval between two adjacent code rates is small and even. Therefore, the higher-order modulation scheme can be selected as much as possible when the modulation scheme is determined, to improve the rate and reliability of data transmission.

In still another possible implementation, for information subsets whose modulation modes are 16QAM, 64QAM, or 1024QAM in the MCS information set, an interval between a second reference code rate difference and a difference between code rates corresponding to any two adjacent indexes whose corresponding modulation modes are the same is less than or equal to a second code rate threshold. Further, the second reference code rate difference is less than the first reference code rate difference, and the second code rate threshold is less than the first code rate threshold.

The foregoing describes a code rate distribution rule between information subsets whose modulation modes are the same in the information subsets whose modulation modes are 16QAM, 64QAM, or 1024QAM. Compared with QPSK, 16QAM, 64QAM, or 1024QAM has a higher information transmission rate but a poorer anti-noise capability, and therefore, works on a channel with a high signal to noise ratio. However, in a communication scenario, for example, vehicle-mounted communication, a signal to noise ratio of a channel is high. Therefore, in this scenario, an interval between code rates of the information subsets of 16QAM, 64QAM, or 1024QAM may be reduced, so that the performance difference between the modulation modes working in the high signal to noise ratio is small, to improve transmission efficiency and reliability of the communication system working in the scenario with the high signal to noise ratio.

It should be noted that the second reference code rate difference and the second code rate threshold are used to describe the code rate distribution rule, and may not be fixed values. For example, the second reference code rate difference may be 0.055, and the second code rate threshold is 0.02. In this way, a difference between two adjacent code rates falls within a range of an interval [0.035, 0.075], and the performance difference between the modulation modes is small.

In still another possible implementation, there are four MCS information subsets whose modulation modes are QPSK in the predefined MCS information set, and/or a spectral efficiency set corresponding to the MCS information subsets whose modulation modes are QPSK is {0.2617, 0.3828, 0.5469, 0.7578}, or a code rate set corresponding to the MCS information subsets is {0.1309, 0.1914, 0.2734, 0.3789}.

The foregoing describes still another possible quantity of the MCS information subsets whose modulation modes are QPSK in the 32 information subsets. A performance difference between modulation modes working in a low signal to noise ratio is increased, so that a performance difference between modulation modes working in a high signal to noise ratio is reduced, to improve transmission efficiency and reliability of a communication system working in a scenario with a high signal to noise ratio.

In still another possible implementation, there are four MCS information subsets whose modulation modes are 16QAM in the predefined MCS information set, and/or a spectral efficiency set corresponding to the MCS information subsets whose modulation modes are 16QAM is {0.8008, 1.1211, 1.5000, 1.9219}, or a code rate set corresponding to the MCS information subsets is {0.2002, 0.2803, 0.3750, 0.4805}.

The foregoing describes still another possible quantity of the MCS information subsets whose modulation modes are 16QAM in the 32 information subsets. A performance difference between modulation schemes whose modulation modes are 16QAM is increased, so that the performance difference between the modulation modes working in the high signal to noise ratio is reduced, to improve transmission efficiency and reliability of the communication system working in the scenario with the high signal to noise ratio.

In still another possible implementation, there are 12 MCS information subsets whose modulation modes are 64QAM in the predefined MCS information set, and/or a spectral efficiency set corresponding to the MCS information subsets whose modulation modes are 64QAM is {2.0508, 2.3613, 2.6367, 2.9414, 3.2168, 3.5098, 3.8203, 4.1016, 4.4121, 4.6992, 4.9863, 5.2500}, or a code rate set corresponding to the MCS information subsets is {0.3418, 0.3936, 0.4395, 0.4902, 0.5361, 0.5850, 0.6367, 0.6836, 0.7354, 0.7832, 0.8311, 0.8750}.

The foregoing describes still another possible quantity of the MCS information subsets whose modulation modes are 16QAM in the 32 information subsets, and the 12 information subsets whose modulation modes are 16QAM enable a performance difference between the modulation schemes to be reduced, so that a device that supports 16QAM can appropriately select a better modulation scheme within the signal to noise ratio range.

In still another possible implementation, there are six MCS information subsets whose modulation modes are 256QAM in the predefined MCS information set, and/or a spectral efficiency set corresponding to the MCS information subsets whose modulation modes are 256QAM is {5.2813, 5.6328, 6.0000, 6.3125, 6.6797, 7.0000}, or a code rate set corresponding to the MCS information subsets is {0.6602, 0.704, 0.7500, 0.7891, 0.8350, 0.8750}.

The foregoing describes one possible quantity of the MCS information subsets whose modulation modes are 256QAM in the 32 information subsets, and the six information subsets whose modulation modes are 256QAM enable the performance difference between the modulation schemes to be small, so that a device that supports 256QAM can appropriately select a better modulation scheme within the signal to noise ratio range. Further, in the MCS information subsets whose modulation modes are 256QAM, an interval between two adjacent code rates is small and even. In this way, a higher-order modulation scheme can be selected as much as possible within the signal to noise ratio range, to improve a rate and reliability of data transmission.

In still another possible implementation, there are six MCS information subsets whose modulation modes are 1024QAM in the predefined MCS information set, and/or a spectral efficiency set corresponding to the MCS information subsets whose modulation modes are 1024QAM is {7.0313, 7.3730, 7.6953, 8.0957, 8.4570, 8.7500}, or a code rate set corresponding to the MCS information subsets is {0.7031, 0.7373, 0.7695, 0.8096, 0.8457, 0.8750}.

The foregoing describes one possible quantity of the MCS information subsets whose modulation modes are 1024QAM in the 32 information subsets, and the six information subsets whose modulation modes are 1024QAM enable the performance difference between the modulation schemes to be small, so that a device that supports 1024QAM can appropriately select a better modulation scheme within the signal to noise ratio range. Further, in the MCS information subsets whose modulation modes are 1024QAM, an interval between two adjacent code rates is small and even. In this way, the higher-order modulation scheme can be selected as much as possible within the signal to noise ratio range, to improve the rate and reliability of data transmission.

Refer to Design 4 in the method embodiment, in a possible implementation, there are the 10 MCS information subsets whose modulation modes are QPSK in the predefined MCS information set, and the spectral efficiency set corresponding to the MCS information subsets whose modulation modes are QPSK is {0.2891, 0.3691, 0.4668, 0.5801, 0.7207, 0.8828, 1.0586, 1.2441, 1.4258, 1.6016}, or the code rate set corresponding to the MCS information subsets is {0.1445, 0.1846, 0.2334, 0.2900, 0.3604, 0.4414, 0.5293, 0.6221, 0.7129, 0.8008}.

Further, optionally, there are the seven MCS information subsets whose modulation modes are 16QAM in the predefined MCS information set, and the spectral efficiency set corresponding to the MCS information subsets whose modulation modes are 16QAM is {1.8008, 2.0781, 2.4023, 2.7344, 3.0430, 3.3320, 3.5430}, or the code rate set corresponding to the MCS information subsets is {0.4502, 0.5195, 0.6006, 0.6836, 0.7607, 0.8330, 0.8857}.

Further, optionally, there are the six MCS information subsets whose modulation modes are 64QAM in the predefined MCS information set, and the spectral efficiency set corresponding to the MCS information subsets whose modulation modes are 64QAM is {3.8379, 4.2129, 4.5879, 4.9102, 5.2500, 5.5020}, or the code rate set corresponding to the MCS information subsets is {0.6396, 0.7021, 0.7646, 0.8184, 0.8750, 0.9170}.

Further, optionally, there are the five MCS information subsets whose modulation modes are 256QAM in the predefined MCS information set, and the spectral efficiency set corresponding to the MCS information subsets whose modulation modes are 256QAM is {5.7188, 6.1797, 6.6016, 7.0000, 7.3203}, or the code rate set corresponding to the MCS information subsets is {0.7148, 0.7725, 0.8252, 0.8750, 0.9150}.

Further, optionally, there are the four MCS information subsets whose modulation modes are 1024QAM in the predefined MCS information set, and the spectral efficiency set corresponding to the MCS information subsets whose modulation modes are 1024QAM is {7.5000, 7.9297, 8.3594, 9.2285}, or the code rate set corresponding to the MCS information subsets is {0.7500, 0.7930, 0.8359, 0.9229}.

A modulation mode and spectral efficiency or a code rate that correspond to any MCS index in the 32 MCS information subsets are used to modulate a wireless communication signal, a signal to noise ratio required for reaching the target block error rate can fall within an interval [−5 dB, 30 dB] or [−5 dB, 32 dB].

It should be noted that, for an implementation of each unit, refer to the corresponding descriptions of the embodiment shown in FIG. 3. The information transmission apparatus 140 may be the first node in the embodiment shown in FIG. 3.

It should be understood that, in the apparatus embodiments of this application, division into a plurality of units or modules is merely logical division based on functions, and is not intended to limit a specific structure of the apparatus. In a specific implementation, some function modules may be further divided into more fine function modules, and some function modules may be combined into one function module. However, regardless of whether the function modules are further divided or combined, general procedures performed by the apparatus 140 in a data communication process are the same. For example, the communication unit in the apparatus 140 may be alternatively divided into a receiving unit and a sending unit. The receiving unit is configured to implement a function of sending data in a communication process, and the sending unit is configured to implement a function of sending data in a communication process. Usually, each unit corresponds to respective program code (or program instructions). When the program code corresponding to the unit is run on a processor, the unit performs a corresponding procedure under control of the processing unit to implement a corresponding function.

Figure 15:
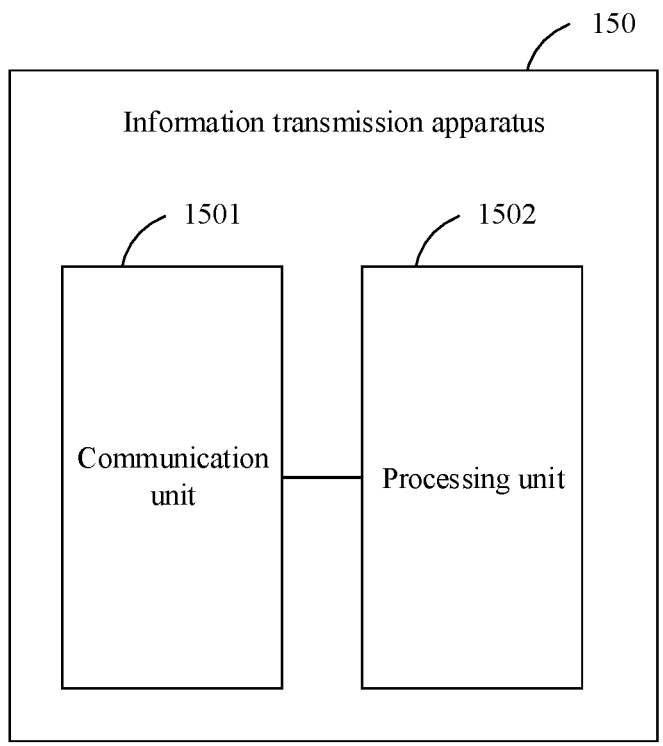
FIG. 15 is a schematic diagram of possible performance of still another modulation scheme according to an embodiment of this application.

FIG. 15 is a schematic diagram of a structure of an information transmission apparatus 150 according to an embodiment of this application. The apparatus 150 may be a node, or may be a component in a node, for example, a chip or an integrated circuit. The apparatus 150 may include a communication unit 1501 and a processing unit 1502. The information transmission apparatus 150 is configured to implement the foregoing information transmission method, for example, the information transmission method in the embodiment shown in FIG. 3.

In a possible implementation, the communication unit 1501 is configured to send a first modulation and coding scheme MCS index to a first node, and the first MCS index corresponds to a first modulation mode.

The processing unit 1502 is configured to receive, by using the communication unit, data from the first node or send, by using the communication unit, data to the first node based on the first modulation mode.

A first MCS information subset in which the first MCS index is located belongs to a predefined MCS information set, and the predefined MCS information set includes 32 MCS information subsets.

The first MCS information subset includes first spectral efficiency and/or a first code rate corresponding to the first MCS index, and the first modulation mode or a modulation order corresponding to the first modulation mode. The first code rate is a ratio of spectral efficiency corresponding to the first MCS index to the modulation order corresponding to the first modulation mode.

It can be learned that the information transmission apparatus 150 can determine an MCS index, send the MCS index to the first node, and send or receive the data based on the first modulation mode corresponding to the first MCS index. In this way, a modulation scheme (which specifically includes a modulation mode, spectral efficiency, a code rate, or the like) can be dynamically adjusted based on different MCS indexes. For example, when a channel condition is poor, a modulation mode and spectral efficiency that correspond to a smaller MCS index in the 32 MCS information subsets can be selected to send or receive the data. When the channel condition is good, a modulation mode corresponding to a larger MCS index in the 32 MCS information subsets can be selected to send or receive the data. This improves flexibility of selecting the modulation mode, maximizes a transmission capability of a wireless channel, and improves efficiency and reliability of data transmission.

In another possible implementation, the communication unit 1501 is further configured to receive a signal to interference plus noise ratio SINR indicator reported by the first node.

The processing unit 1502 is further configured to determine the first MCS index based on the SINR indicator.

It can be learned that, because a wireless communication channel changes randomly, the first node can report the SINR indicator, and the SINR indicator may correspond to channel quality, so that a second node can dynamically adjust a modulation and coding mode based on the channel quality, to change a transmission rate.

In still another possible implementation, each MCS information subset in the predefined MCS information set includes a corresponding MCS index, spectral efficiency and/or a code rate corresponding to the MCS index, and a modulation mode corresponding to the MCS index or a modulation order of the modulation mode. The code rate is a ratio of the spectral efficiency corresponding to the MCS index to the modulation order corresponding to the modulation mode. It may also be understood that the predefined MCS information set does not include a reserved entry. For an explanation of the reserved entry, refer to the foregoing descriptions.

In still another possible implementation, the predefined MCS information set includes at least one of quadrature phase shift keying QPSK, 16 quadrature amplitude modulation QAM, 64QAM, 256QAM, or 1024QAM.

In still another possible implementation, there are nine MCS information subsets whose modulation modes are QPSK in the predefined MCS information set, and/or a spectral efficiency set corresponding to the MCS information subsets whose modulation modes are QPSK is {0.2891, 0.3691, 0.4668, 0.5801, 0.7207, 0.8828, 1.0586, 1.2441, 1.4258}, or a code rate set corresponding to the MCS information subsets is {0.1445, 0.1846, 0.2334, 0.2900, 0.3604, 0.4414, 0.5293, 0.6221, 0.7129}.

The foregoing describes one possible quantity of the MCS information subsets whose modulation modes are QPSK in the 32 information subsets. Because a performance difference between different modulation modes is great, a relationship between a signal to noise ratio and a block error rate is reflected as that signal to noise ratios required by the different modulation modes for reaching a target block error rate differ greatly. For example, when a code rate is 0.15, based on the case that a polar code with a 1024-bit code length reaches a block error rate of $10^{-3}$, the QPSK modulation mode requires a signal to noise ratio of approximately −4, but in a channel condition in which a code rate is 0.35, based on the case that the polar code with the 1024-bit code length reaches the block error rate of $10^{-3}$, 16QAM requires a signal to noise ratio of approximately 5. A performance difference between the two modulation schemes (which specifically include the modulation modes, and further include the code rates or spectral efficiency) is great. In a communication system, if a performance difference between modulation schemes is great, to meet a block error rate requirement, a smaller quantity of modulation schemes can be selected within a signal to noise ratio range. In this case, it is difficult to meet a user requirement. Therefore, in the foregoing solution, the nine information subsets whose modulation modes are QPSK enable the performance difference between the modulation schemes to be small, so that a device that supports QPSK can appropriately select a better modulation scheme within a signal to noise ratio range. Further, in the MCS information subsets whose modulation modes are QPSK, an interval between two adjacent code rates is small and even. In this way, a higher-order modulation scheme can be selected as much as possible within the signal to noise ratio range, to improve a rate and reliability of data transmission.

In still another possible implementation, there are four MCS information subsets whose modulation modes are 16QAM in the predefined MCS information set, and/or a spectral efficiency set corresponding to the MCS information subsets whose modulation modes are 16QAM is {1.5273, 1.8008, 2.0781, 2.4023}, or a code rate set corresponding to the MCS information subsets is {0.3818, 0.4502, 0.5195, 0.6006}.

The foregoing describes one possible quantity of the MCS information subsets whose modulation modes are 16QAM in the 32 information subsets, and a device that supports 16QAM can select a modulation scheme with better performance by using the four information subsets whose modulation modes are 16QAM. Further, in the MCS information subsets whose modulation modes are 16QAM, an interval between two adjacent code rates is small and even. Therefore, the higher-order modulation scheme can be selected as much as possible when the modulation scheme is determined, to improve the rate and reliability of data transmission.

In still another possible implementation, there are nine MCS information subsets whose modulation modes are 64QAM in the predefined MCS information set, and/or a spectral efficiency set corresponding to the MCS information subsets whose modulation modes are 64QAM is {2.4199, 2.7480, 3.1055, 3.4746, 3.8379, 4.2129, 4.5879, 4.9102, 5.2500}, or a code rate set corresponding to the MCS information subsets is {0.4033, 0.4580, 0.5176, 0.5791, 0.6396, 0.7021, 0.7646, 0.8184, 0.8750}.

The foregoing describes one possible quantity of the MCS information subsets whose modulation modes are 64QAM in the 32 information subsets, and a device that supports 64QAM can select a modulation scheme with better performance by using the nine information subsets whose modulation modes are 64QAM. Further, in the MCS information subsets whose modulation modes are 64QAM, an interval between two adjacent code rates is small and even. Therefore, the higher-order modulation scheme can be selected as much as possible when the modulation scheme is determined, to improve the rate and reliability of data transmission.

In still another possible implementation, there are five MCS information subsets whose modulation modes are 256QAM in the predefined MCS information set, and/or a spectral efficiency set corresponding to the MCS information subsets whose modulation modes are 256QAM is {5.2813, 5.7188, 6.1797, 6.6016, 7.0000}, or a code rate set corresponding to the MCS information subsets is {0.6602, 0.7148, 0.7725, 0.8252, 0.8750}.

The foregoing describes one possible quantity of the MCS information subsets whose modulation modes are 256QAM in the 32 information subsets, and a device that supports 256QAM can select a modulation scheme with better performance by using the five information subsets whose modulation modes are 256QAM. Further, in the MCS information subsets whose modulation modes are 64QAM, an interval between two adjacent code rates is small and even. Therefore, the higher-order modulation scheme can be selected as much as possible when the modulation scheme is determined, to improve the rate and reliability of data transmission.

In still another possible implementation, there are five MCS information subsets whose modulation modes are 1024QAM in the predefined MCS information set, and/or a spectral efficiency set corresponding to the MCS information subsets whose modulation modes are 1024QAM is {7.0996, 7.5000, 7.9297, 8.3594, 8.7500}, or a code rate set corresponding to the MCS information subsets is {0.7100, 0.7500, 0.7930, 0.8359, 0.8750}.

The foregoing describes one possible quantity of the MCS information subsets whose modulation modes are 1024QAM in the 32 information subsets, and a device that supports 1024QAM can select a modulation scheme with better performance by using the five information subsets whose modulation modes are 1024QAM. Further, in the MCS information subsets whose modulation modes are 1024QAM, an interval between two adjacent code rates is small and even. Therefore, the higher-order modulation scheme can be selected as much as possible when the modulation scheme is determined, to improve the rate and reliability of data transmission.

In still another possible implementation, there is an information subset whose code rate is greater than or equal to 0.875 in the predefined MCS information set.

The code rate is also referred to as a code rate, code efficiency, or code rate, and is a proportion of wanted data in a data stream. A larger code rate indicates a larger proportion of wanted data and higher information transmission efficiency. Usually, when channel quality is poor, more redundant information needs to be added to ensure that a receive end can correctly demodulate a signal. In this case, the code rate is lower. When the channel quality is good, few redundancy check bits can correctly demodulate the signal. In this case, the code rate is higher. Therefore, an appropriate code rate is selected based on a channel change, so that a user with the good channel quality can obtain a higher information transmission rate.

In the foregoing implementation, because there is the information subset whose code rate is greater than or equal to 0.875 in the information set, when the channel quality is good, a modulation mode corresponding to an information subset whose code rate is greater than 0.875 can be selected for modulation, to improve efficiency of data transmission.

In still another possible implementation, in the information subsets whose modulation modes are 1024QAM, 256QAM, and 64QAM in the predefined MCS information set, there is an information subset whose code rate is greater than or equal to 0.875 in information subsets corresponding to one or more modulation modes.

According to the foregoing implementation, if a highest-order modulation mode supported by a node is 64QAM, because 64QAM also has the information subset whose code rate is greater than or equal to 0.875, when the channel quality is supported, the code rate of 0.875 (even a code rate greater than 0.875) can be used to modulate the signal, to improve an information transmission rate. Correspondingly, if the highest-order modulation mode supported by the node is 256QAM or 1024QAM, the code rate of 0.875 (even the code rate greater than 0.875) can also be used to modulate the signal, to improve the information transmission rate.

In still another possible implementation, for the plurality of MCS information subsets, an interval between a first reference code rate difference and a difference between code rates corresponding to any two adjacent indexes whose corresponding modulation modes are the same is less than or equal to a first code rate threshold.

The foregoing describes a code rate distribution rule between information subsets whose modulation modes are the same. A difference between two adjacent code rates is always distributed within a specific range. When the rule is reflected, the difference between the two adjacent code rates is always distributed around the first reference code rate difference, and an interval (or a deviation) between the difference and the first reference code rate difference is less than or equal to the first code rate threshold (for example, the first reference code rate difference is 0.07, and the first code rate threshold is 0.045. The difference between the two adjacent code rates is always approximately 0.07, and the interval between the difference and 0.07 does not exceed 0.045. In other words, the difference between the code rates falls within an interval [0.025, 0.15]). Therefore, the interval between the code rates is small and even. In this way, the higher-order modulation scheme can be selected as much as possible within the signal to noise ratio range, to improve the rate and reliability of data transmission. The first reference code rate difference is used to describe the code rate distribution rule, and may not be a fixed value.

In still another possible implementation, there are four MCS information subsets whose modulation modes are QPSK in the predefined MCS information set, and/or a spectral efficiency set corresponding to the MCS information subsets whose modulation modes are QPSK is {0.3086, 0.4453, 0.6309, 0.8652}, or a code rate set corresponding to the MCS information subsets is {0.1543, 0.2227, 0.3154, 0.4326}.

The foregoing describes another possible quantity of the MCS information subsets whose modulation modes are QPSK in the 32 information subsets. Because QSPK has a good anti-noise capability but low efficiency of data transmission, QSPK is usually used on a channel with a low SNR. However, because an SNR in some scenarios is high, for example, a vehicle-mounted wireless channel, to adapt to the scenario with the high SNR, a quantity of the QPSK modulation modes can be reduced or an interval between code rates of the QPSK modulation mode can be increased. A performance difference between modulation modes working in a low signal to noise ratio is increased, so that a performance difference between modulation modes working in a high signal to noise ratio is reduced, to improve transmission efficiency and reliability of a communication system working in the scenario with the high signal to noise ratio.

In still another possible implementation, there are seven MCS information subsets whose modulation modes are 16QAM in the predefined MCS information set, and/or a spectral efficiency set corresponding to the MCS information subsets whose modulation modes are 16QAM is {0.9219, 1.1211, 1.3203, 1.5586, 1.8203, 2.0781, 2.3594}, or a code rate set corresponding to the MCS information subsets is {0.2305, 0.2803, 0.3301, 0.3896, 0.4551, 0.5195, 0.5898}.

The foregoing describes one possible quantity of the MCS information subsets whose modulation modes are 16QAM in the 32 information subsets, and a device that supports 16QAM can select a modulation scheme with better performance by using the seven information subsets whose modulation modes are 16QAM. Further, in the MCS information subsets whose modulation modes are 16QAM, an interval between two adjacent code rates is small and even. Therefore, a higher-order modulation scheme can be selected as much as possible when the modulation scheme is determined, to improve the rate and reliability of data transmission.

In still another possible implementation, there are 10 MCS information subsets whose modulation modes are 64QAM in the predefined MCS information set, and/or a spectral efficiency set corresponding to the MCS information subsets whose modulation modes are 64QAM is {2.3613, 2.6660, 2.9766, 3.2813, 3.6445, 3.9785, 4.3066, 4.6523, 4.9512, 5.2500}, or a code rate set corresponding to the MCS information subsets is {0.3936, 0.4443, 0.4961, 0.5469, 0.6074, 0.6631, 0.7178, 0.7754, 0.8252, 0.8750}.

The foregoing describes one possible quantity of the MCS information subsets whose modulation modes are 64QAM in the 32 information subsets, and a device that supports 64QAM can select a modulation scheme with better performance by using the 10 information subsets whose modulation modes are 64QAM. Further, in the MCS information subsets whose modulation modes are 64QAM, an interval between two adjacent code rates is small and even. Therefore, the higher-order modulation scheme can be selected as much as possible when the modulation scheme is determined, to improve the rate and reliability of data transmission.

In still another possible implementation, there are six MCS information subsets whose modulation modes are 256QAM in the predefined MCS information set, and/or a spectral efficiency set corresponding to the MCS information subsets whose modulation modes are 256QAM is {5.2813, 5.6328, 6.0000, 6.3125, 6.6797, 7.0000}, or a code rate set corresponding to the MCS information subsets is {0.6602, 0.7041, 0.7500, 0.7891, 0.8350, 0.8750}.

The foregoing describes one possible quantity of the MCS information subsets whose modulation modes are 256QAM in the 32 information subsets, and a device that supports 256QAM can select a modulation scheme with better performance by using the six information subsets whose modulation modes are 256QAM. Further, in the MCS information subsets whose modulation modes are 256QAM, an interval between two adjacent code rates is small and even. Therefore, the higher-order modulation scheme can be selected as much as possible when the modulation scheme is determined, to improve the rate and reliability of data transmission.

In still another possible implementation, there are five MCS information subsets whose modulation modes are 1024QAM in the predefined MCS information set, and/or a spectral efficiency set corresponding to the MCS information subsets whose modulation modes are 1024QAM is {7.0996, 7.5000, 7.9297, 8.3594, 8.7500}, or a code rate set corresponding to the MCS information subsets is {0.7100, 0.7500, 0.7930, 0.8359, 0.8750}.

The foregoing describes one possible quantity of the MCS information subsets whose modulation modes are 1024QAM in the 32 information subsets, and a device that supports 1024QAM can select a modulation scheme with better performance by using the five information subsets whose modulation modes are 1024QAM. Further, in the MCS information subsets whose modulation modes are 1024QAM, an interval between two adjacent code rates is small and even. Therefore, the higher-order modulation scheme can be selected as much as possible when the modulation scheme is determined, to improve the rate and reliability of data transmission.

In still another possible implementation, for information subsets whose modulation modes are 16QAM, 64QAM, or 1024QAM in the MCS information set, an interval between a second reference code rate difference and a difference between code rates corresponding to any two adjacent indexes whose corresponding modulation modes are the same is less than or equal to a second code rate threshold. Further, the second reference code rate difference is less than the first reference code rate difference, and the second code rate threshold is less than the first code rate threshold.

The foregoing describes a code rate distribution rule between information subsets whose modulation modes are the same in the information subsets whose modulation modes are 16QAM, 64QAM, or 1024QAM. Compared with QPSK, 16QAM, 64QAM, or 1024QAM has a higher information transmission rate but a poorer anti-noise capability, and therefore, works on a channel with a high signal to noise ratio. However, in a communication scenario, for example, vehicle-mounted communication, a signal to noise ratio of a channel is high. Therefore, in this scenario, an interval between code rates of the information subsets of 16QAM, 64QAM, or 1024QAM may be reduced, so that the performance difference between the modulation modes working in the high signal to noise ratio is small, to improve transmission efficiency and reliability of the communication system working in the scenario with the high signal to noise ratio.

It should be noted that the second reference code rate difference and the second code rate threshold are used to describe the code rate distribution rule, and may not be fixed values. For example, the second reference code rate difference may be 0.055, and the second code rate threshold is 0.02. In this way, a difference between two adjacent code rates falls within a range of an interval [0.035, 0.075], and the performance difference between the modulation modes is small.

In still another possible implementation, there are four MCS information subsets whose modulation modes are QPSK in the predefined MCS information set, and/or a spectral efficiency set corresponding to the MCS information subsets whose modulation modes are QPSK is {0.2617, 0.3828, 0.5469, 0.7578}, or a code rate set corresponding to the MCS information subsets is {0.1309, 0.1914, 0.2734, 0.3789}.

The foregoing describes still another possible quantity of the MCS information subsets whose modulation modes are QPSK in the 32 information subsets. A performance difference between modulation modes working in a low signal to noise ratio is increased, so that a performance difference between modulation modes working in a high signal to noise ratio is reduced, to improve transmission efficiency and reliability of a communication system working in a scenario with a high signal to noise ratio.

In still another possible implementation, there are four MCS information subsets whose modulation modes are 16QAM in the predefined MCS information set, and/or a spectral efficiency set corresponding to the MCS information subsets whose modulation modes are 16QAM is {0.8008, 1.1211, 1.5000, 1.9219}, or a code rate set corresponding to the MCS information subsets is {0.2002, 0.2803, 0.3750, 0.4805}.

The foregoing describes still another possible quantity of the MCS information subsets whose modulation modes are 16QAM in the 32 information subsets. A performance difference between modulation schemes whose modulation modes are 16QAM is increased, so that the performance difference between the modulation modes working in the high signal to noise ratio is reduced, to improve transmission efficiency and reliability of the communication system working in the scenario with the high signal to noise ratio.

In still another possible implementation, there are 12 MCS information subsets whose modulation modes are 64QAM in the predefined MCS information set, and/or a spectral efficiency set corresponding to the MCS information subsets whose modulation modes are 64QAM is {2.0508, 2.3613, 2.6367, 2.9414, 3.2168, 3.5098, 3.8203, 4.1016, 4.4121, 4.6992, 4.9863, 5.2500}, or a code rate set corresponding to the MCS information subsets is {0.3418, 0.3936, 0.4395, 0.4902, 0.5361, 0.5850, 0.6367, 0.6836, 0.7354, 0.7832, 0.8311, 0.8750}.

The foregoing describes still another possible quantity of the MCS information subsets whose modulation modes are 16QAM in the 32 information subsets, and the 12 information subsets whose modulation modes are 16QAM enable the performance difference between the modulation schemes to be reduced, so that a device that supports 16QAM can appropriately select a better modulation scheme within the signal to noise ratio range.

In still another possible implementation, there are six MCS information subsets whose modulation modes are 256QAM in the predefined MCS information set, and/or a spectral efficiency set corresponding to the MCS information subsets whose modulation modes are 256QAM is {5.2813, 5.6328, 6.0000, 6.3125, 6.6797, 7.0000}, or a code rate set corresponding to the MCS information subsets is {0.6602, 0.704, 0.7500, 0.7891, 0.8350, 0.8750}.

The foregoing describes one possible quantity of the MCS information subsets whose modulation modes are 256QAM in the 32 information subsets, and the six information subsets whose modulation modes are 256QAM enable the performance difference between the modulation schemes to be small, so that a device that supports 256QAM can appropriately select a better modulation scheme within the signal to noise ratio range. Further, in the MCS information subsets whose modulation modes are 256QAM, an interval between two adjacent code rates is small and even. In this way, the higher-order modulation scheme can be selected as much as possible within the signal to noise ratio range, to improve the rate and reliability of data transmission.

In still another possible implementation, there are six MCS information subsets whose modulation modes are 1024QAM in the predefined MCS information set, and/or a spectral efficiency set corresponding to the MCS information subsets whose modulation modes are 1024QAM is {7.0313, 7.3730, 7.6953, 8.0957, 8.4570, 8.7500}, or a code rate set corresponding to the MCS information subsets is {0.7031, 0.7373, 0.7695, 0.8096, 0.8457, 0.8750}.

The foregoing describes one possible quantity of the MCS information subsets whose modulation modes are 1024QAM in the 32 information subsets, and the six information subsets whose modulation modes are 1024QAM enable the performance difference between the modulation schemes to be small, so that a device that supports 1024QAM can appropriately select a better modulation scheme within the signal to noise ratio range. Further, in the MCS information subsets whose modulation modes are 1024QAM, an interval between two adjacent code rates is small and even. In this way, the higher-order modulation scheme can be selected as much as possible within the signal to noise ratio range, to improve the rate and reliability of data transmission.

Refer to Design 4 in the method embodiment, in a possible implementation, there are the 10 MCS information subsets whose modulation modes are QPSK in the predefined MCS information set, and the spectral efficiency set corresponding to the MCS information subsets whose modulation modes are QPSK is {0.2891, 0.3691, 0.4668, 0.5801, 0.7207, 0.8828, 1.0586, 1.2441, 1.4258, 1.6016}, or the code rate set corresponding to the MCS information subsets is {0.1445, 0.1846, 0.2334, 0.2900, 0.3604, 0.4414, 0.5293, 0.6221, 0.7129, 0.8008}.

There are the seven MCS information subsets whose modulation modes are 16QAM in the predefined MCS information set, and the spectral efficiency set corresponding to the MCS information subsets whose modulation modes are 16QAM is {1.8008, 2.0781, 2.4023, 2.7344, 3.0430, 3.3320, 3.5430}, or the code rate set corresponding to the MCS information subsets is {0.4502, 0.5195, 0.6006, 0.6836, 0.7607, 0.8330, 0.8857}.

There are the six MCS information subsets whose modulation modes are 64QAM in the predefined MCS information set, and the spectral efficiency set corresponding to the MCS information subsets whose modulation modes are 64QAM is {3.8379, 4.2129, 4.5879, 4.9102, 5.2500, 5.5020}, or the code rate set corresponding to the MCS information subsets is {0.6396, 0.7021, 0.7646, 0.8184, 0.8750, 0.9170}.

There are the five MCS information subsets whose modulation modes are 256QAM in the predefined MCS information set, and the spectral efficiency set corresponding to the MCS information subsets whose modulation modes are 256QAM is {5.7188, 6.1797, 6.6016, 7.0000, 7.3203}, or the code rate set corresponding to the MCS information subsets is {0.7148, 0.7725, 0.8252, 0.8750, 0.9150}.

There are the four MCS information subsets whose modulation modes are 1024QAM in the predefined MCS information set, and the spectral efficiency set corresponding to the MCS information subsets whose modulation modes are 1024QAM is {7.5000, 7.9297, 8.3594, 9.2285}, or the code rate set corresponding to the MCS information subsets is {0.7500, 0.7930, 0.8359, 0.9229}.

In still another possible implementation, when a modulation mode and spectral efficiency or a code rate that correspond to any MCS index in the 32 MCS information subsets are used to modulate a wireless communication signal, a signal to noise ratio required for reaching the target block error rate falls within an interval [−5 dB, 30 dB] or [−5 dB, 32 dB].

It should be noted that, for an implementation of each unit, refer to the corresponding descriptions of the embodiment shown in FIG. 3. The information transmission apparatus 150 may be the second node in the embodiment shown in FIG. 3.

Figure 16:
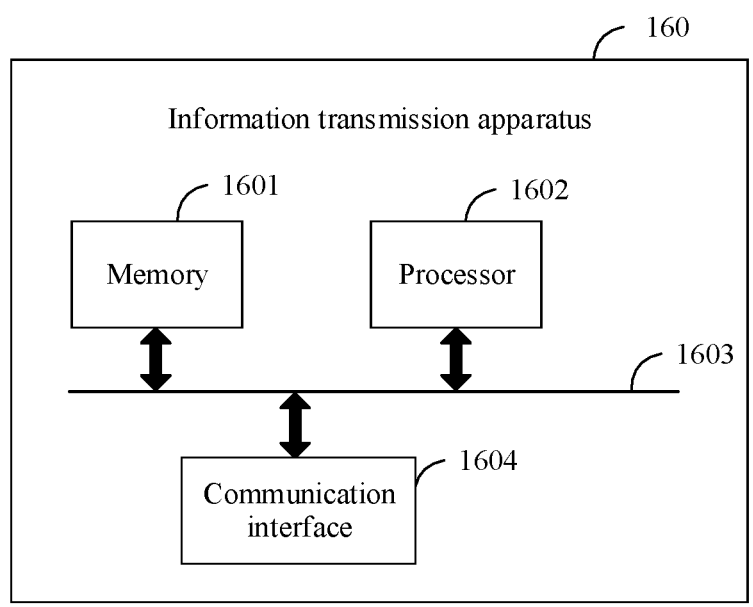
FIG. 16 is a schematic diagram of possible performance of yet still another modulation scheme according to an embodiment of this application.

FIG. 16 is a schematic diagram of a structure of an information transmission apparatus 160 according to an embodiment of this application. The information transmission apparatus 160 may be a node, or may be a component in a node, for example, a chip or an integrated circuit. The apparatus 160 may include at least one processor 1602 and a communication interface 1604. Further, optionally, the information transmission apparatus may further include at least one memory 1601. Further, optionally, a bus 1603 may be further included. The memory 1601, the processor 1602, and the communication interface 1604 are connected through the bus 1603.

The memory 1601 is configured to provide storage space, and the storage space may store data such as an operating system and a computer program. The memory 1601 may be one or a combination of a random access memory (RAM), a read-only memory (ROM), an erasable programmable read-only memory (EPROM), a compact disc read-only memory (CD-ROM), or the like.

The processor 1602 is a module that performs an arithmetic operation and/or a logic operation, and may be specifically one or a combination of processing modules such as a central processing unit (CPU), a graphics processing unit (GPU), a microprocessor unit (MPU), an application-specific integrated circuit (ASIC), a field-programmable gate array (FPGA), a complex programmable logic device (CPLD), a coprocessor (assisting the central processing unit in completing corresponding processing and application), and a microcontroller unit (MCU).

The communication interface 1604 may be configured to provide an information input or output for the at least one processor, and/or the communication interface may be configured to receive data sent from the outside and/or send data to the outside, and may be an interface of a wired link including, for example, an Ethernet cable or the like, or may be a wireless link (Wi-Fi, Bluetooth, universal wireless transmission, a vehicle-mounted short-range communication technology, or the like) interface. Optionally, the communication interface 1604 may further include a transmitter (for example, a radio frequency transmitter or an antenna), a receiver, or the like coupled to the interface.

The processor 1602 in the apparatus 160 is configured to read a computer program stored in the memory 1601, to perform the foregoing information transmission method, for example, the information transmission method described in the embodiment shown in FIG. 3.

For example, the information transmission apparatus 160 may be the first node in the embodiment shown in FIG. 3. The processor 1602 in the apparatus 160 is configured to read the computer program stored in the memory 1601, to perform the following operations:

receiving a first modulation and coding scheme MCS index from a second node through the communication interface 1604, where the first MCS index corresponds to a first modulation mode; and receiving, by using the communication unit, data from the second node or send, by using the communication unit, data to the second node based on the first MCS index.

A first MCS information subset in which the first MCS index is located belongs to a predefined MCS information set, and the predefined MCS information set includes 32 MCS information subsets;

The first MCS information subset includes first spectral efficiency and/or a first code rate corresponding to the first MCS index, and the first modulation mode or a modulation order corresponding to the first modulation mode. The first code rate is a ratio of spectral efficiency corresponding to the first MCS index to the modulation order corresponding to the first modulation mode.

It can be learned that the apparatus 160 can receive an MCS index, and send or receive the data based on the first modulation mode corresponding to the first MCS index. In this way, a modulation scheme (which specifically includes a modulation mode, spectral efficiency, a code rate, or the like) can be dynamically adjusted based on different MCS indexes. For example, when a channel condition is poor, a modulation mode and spectral efficiency that correspond to a smaller MCS index in the 32 MCS information subsets can be selected to send or receive the data. When the channel condition is good, a modulation mode corresponding to a larger MCS index in the 32 MCS information subsets can be selected to send or receive the data. This improves flexibility of selecting the modulation mode, maximizes a transmission capability of a wireless channel, and improves efficiency and reliability of data transmission.

In a possible implementation, the processor is further configured to report an SINR indicator to the second node through the communication interface 1604, and the first MCS index corresponds to the SINR indicator.

It can be learned that, because a wireless communication channel changes randomly, the foregoing apparatus can report the SINR indicator, and the SINR indicator may correspond to channel quality, so that the second node can dynamically adjust a modulation and coding mode based on the channel quality, to change a transmission rate.

For a specific implementation, refer to the detailed descriptions in the embodiment shown in FIG. 3. Details are not described herein again.

For another example, the information transmission apparatus 160 may be the second node in the embodiment shown in FIG. 3. The processor 1602 in the apparatus 160 is configured to read the computer program stored in the memory 1601, to perform the following operations:

sending a first modulation and coding scheme MCS index to a first node through the communication interface 1604, where the first MCS index corresponds to a first modulation mode; and receiving, by using the communication unit, data from the first node or send, by using the communication unit, data to the first node based on the first modulation mode.

A first MCS information subset in which the first MCS index is located belongs to a predefined MCS information set, and the predefined MCS information set includes 32 MCS information subsets.

The first MCS information subset includes first spectral efficiency and/or a first code rate corresponding to the first MCS index, and the first modulation mode or a modulation order corresponding to the first modulation mode. The first code rate is a ratio of spectral efficiency corresponding to the first MCS index to the modulation order corresponding to the first modulation mode.

It can be learned that the information transmission apparatus 160 can determine an MCS index, send the MCS index to the first node, and send or receive the data based on the first modulation mode corresponding to the first MCS index. In this way, a modulation scheme (which specifically includes a modulation mode, spectral efficiency, a code rate, or the like) can be dynamically adjusted based on different MCS indexes. For example, when a channel condition is poor, a modulation mode and spectral efficiency that correspond to a smaller MCS index in the 32 MCS information subsets can be selected to send or receive the data. When the channel condition is good, a modulation mode corresponding to a larger MCS index in the 32 MCS information subsets can be selected to send or receive the data. This improves flexibility of selecting the modulation mode, maximizes a transmission capability of a wireless channel, and improves efficiency and reliability of data transmission.

In a possible implementation, the processor is further configured to:

receive, through the communication interface 1604, a signal to interference plus noise ratio SINR indicator reported by the first node; and determine the first MCS index based on the SINR indicator.

It can be learned that, because a wireless communication channel changes randomly, the first node can report the SINR indicator, and the SINR indicator may correspond to channel quality, so that the second node can dynamically adjust a modulation and coding mode based on the channel quality, to change a transmission rate.

For a specific implementation, refer to the detailed descriptions in the embodiment shown in FIG. 3. Details are not described herein again.

An embodiment of this application further provides a computer-readable storage medium. The computer-readable storage medium stores a computer program. When the computer program is run on one or more processors, the method in the embodiment shown in FIG. 3 is implemented.

An embodiment of this application further provides a chip system. The chip system includes at least one processor and a communication interface. The communication interface is configured to send and/or receive data. The at least one processor is configured to invoke a computer program stored in at least one memory, to implement the method in the embodiment shown in FIG. 3.

Further, the at least one processor may include at least one of a CPU, an MPU, an MCU, or a coprocessor.

An embodiment of this application further provides a terminal. The terminal may be an intelligent cockpit product, a vehicle, or the like. The terminal includes a first node and/or a second node. The first node (for example, one or more of modules such as a camera, a screen, a microphone, a speaker, a radar, an electronic key, a keyless entry and start system controller, and user equipment (UE)) is the first node in the embodiment shown in FIG. 3. The second node (for example, a base station, a cockpit domain controller (CDC)) is the second node in the embodiment shown in FIG. 3.

Further, optionally, the terminal may be an uncrewed aerial vehicle, a robot, a device in a smart home scenario, a device in a smart manufacturing scenario, or the like.

An embodiment of this application further provides a computer program product. When the computer program product runs on one or more processors, the communication method described in the embodiment shown in FIG. 3 may be implemented.

All or some of the foregoing embodiments may be implemented by software, hardware, firmware, or any combination thereof.

When software is used to implement embodiments, all or some of embodiments may be implemented in a form of a computer instruction product.

When the computer instructions are loaded and executed on a computer, the procedures or functions according to embodiments of this application are all or partially implemented. The computer may be a general-purpose computer, a special-purpose computer, a computer network, or another programmable apparatus. The computer instructions may be stored in a computer-readable storage medium, or may be transmitted by using a computer-readable storage medium. The computer-readable storage medium may be any usable medium accessible by the computer, or a data storage device, such as a server or a data center that integrates one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Sequence adjustment, combination, or deletion may be performed on the steps in the method embodiments of this application based on an actual requirement.

Combination, division, and deletion may be performed on the modules in the apparatus embodiments of this application based on an actual requirement.

What is claimed is:
1. An information transmission method, comprising:
receiving a first modulation and coding scheme (MCS) index from a second node, wherein the first MCS index corresponds to a first modulation mode; and
receiving data from the second node or sending data to the second node based on the first modulation mode,
wherein a first MCS information subset in which the first MCS index is located belongs to a predefined MCS information set and the predefined MCS information set comprises 32 MCS information subsets; and
the first MCS information subset comprises first spectral efficiency and/or a first code rate corresponding to the first MCS index, the first modulation mode or a modulation order corresponding to the first modulation mode,
wherein the first code rate is a ratio of the first spectral efficiency corresponding to the first MCS index to the modulation order corresponding to the first modulation mode,
wherein one of:
there are nine MCS information subsets whose modulation modes are quadrature phase shift keying (QPSK) in the predefined MCS information set, and a spectral efficiency set corresponding to the MCS information subsets whose modulation modes are QPSK is {0.2891, 0.3691, 0.4668, 0.5801, 0.7207, 0.8828, 1.0586, 1.2441, 1.4258}, or a code rate set corresponding to the MCS information subsets is {0.1445, 0.1846, 0.2334, 0.2900, 0.3604, 0.4414, 0.5293, 0.6221, 0.7129}; or
there are 10 MCS information subsets whose modulation modes are QPSK in the predefined MCS information set, and a spectral efficiency set corresponding to the MCS information subsets whose modulation modes are QPSK is {0.2891, 0.3691, 0.4668, 0.5801, 0.7207, 0.8828, 1.0586, 1.2441, 1.4258, 1.6016}, or a code rate set corresponding to the MCS information subsets is {0.1445, 0.1846, 0.2334, 0.2900, 0.3604, 0.4414, 0.5293, 0.6221, 0.7129, 0.8008}; or
there are four MCS information subsets whose modulation modes are 16 quadrature amplitude modulation (QAM) in the predefined MCS information set, and a spectral efficiency set corresponding to the MCS information subsets whose modulation modes are 16QAM is {1.5273, 1.8008, 2.0781, 2.4023}, or a code rate set corresponding to the MCS information subsets is {0.3818, 0.4502, 0.5195, 0.6006}; or
there are seven MCS information subsets whose modulation modes are 16QAM in the predefined MCS information set, and a spectral efficiency set corresponding to the MCS information subsets whose modulation modes are 16QAM is {1.8008, 2.0781, 2.4023, 2.7344, 3.0430, 3.3320, 3.5430}, or a code rate set corresponding to the MCS information subsets is {0.4502, 0.5195, 0.6006, 0.6836, 0.7607, 0.8330, 0.8857}; or
there are nine MCS information subsets whose modulation modes are 64QAM in the predefined MCS information set, and a spectral efficiency set corresponding to the MCS information subsets whose modulation modes are 64QAM is {2.4199, 2.7480, 3.1055, 3.4746, 3.8379, 4.2129, 4.5879, 4.9102, 5.2500}, or a code rate set corresponding to the MCS information subsets is {0.4033, 0.4580, 0.5176, 0.5791, 0.6396, 0.7021, 0.7646, 0.8184, 0.8750}; or
there are six MCS information subsets whose modulation modes are 64QAM in the predefined MCS information set, and a spectral efficiency set corresponding to the MCS information subsets whose modulation modes are

64QAM is {3.8379, 4.2129, 4.5879, 4.9102, 5.2500, 5.5020}, or a code rate set corresponding to the MCS information subsets is {0.6396, 0.7021, 0.7646, 0.8184, 0.8750, 0.9170}; or there are five MCS information subsets whose modulation modes are 256QAM in the predefined MCS information set, and a spectral efficiency set corresponding to the MCS information subsets whose modulation modes are 256QAM is {5.2813, 5.7188, 6.1797, 6.6016, 7.0000} or {5.7188, 6.1797, 6.6016, 7.0000, 7.3203}, or a code rate set corresponding to the MCS information subsets is {0.6602, 0.7148, 0.7725, 0.8252, 0.8750} or {0.7148, 0.7725, 0.8252, 0.8750, 0.9150}; or there are five MCS information subsets whose modulation modes are 1024QAM in the predefined MCS information set, and a spectral efficiency set corresponding to the MCS information subsets whose modulation modes are 1024QAM is {7.0996, 7.5000, 7.9297, 8.3594, 8.7500}, or a code rate set corresponding to the MCS information subsets is {0.7100, 0.7500, 0.7930, 0.8359, 0.8750}; or there are four MCS information subsets whose modulation modes are 1024QAM in the predefined MCS information set, and a spectral efficiency set corresponding to the MCS information subsets whose modulation modes are 1024QAM is {7.5000, 7.9297, 8.3594, 9.2285}, or a code rate set corresponding to the MCS information subsets is {0.7500, 0.7930, 0.8359, 0.9229}.

2. The method according to claim 1, further comprising: reporting a signal to interference plus noise ratio (SINR) indicator to the second node.

3. The method according to claim 1, wherein the predefined MCS information set comprises at least one of quadrature phase shift keying (QPSK), 16 quadrature amplitude modulation (QAM), 64QAM, 256QAM, or 1024QAM.

4. The method according to claim 1, wherein in the information subsets whose modulation modes are 1024QAM, 256QAM, and 64QAM in the predefined MCS information set, there is an information subset whose code rate is greater than or equal to 0.875 in information subsets corresponding to one or more modulation modes.

5. The method according to claim 1, wherein for the plurality of MCS information subsets, an interval between a first reference code rate difference and a difference between code rates corresponding to any two adjacent indexes whose corresponding modulation modes are the same is less than or equal to a first code rate threshold.

6. An information transmission method, comprising:
sending a first modulation and coding scheme (MCS) index to a first node,
wherein the first MCS index corresponds to a first modulation mode; and
receiving data from the first node or sending data to the first node based on the first modulation mode,
wherein a first MCS information subset in which the first MCS index is located belongs to a predefined MCS information set, and the predefined MCS information set comprises 32 MCS information subsets; and
the first MCS information subset comprises first spectral efficiency and/or a first code rate corresponding to the first MCS index, the first modulation mode or a modulation order corresponding to the first modulation mode, and wherein the first code rate is a ratio of spectral efficiency corresponding to the first MCS index to the modulation order corresponding to the first modulation mode,
wherein one of:
there are nine MCS information subsets whose modulation modes are quadrature phase shift keying (QPSK) in the predefined MCS information set, and a spectral efficiency set corresponding to the MCS information subsets whose modulation modes are QPSK is {0.2891, 0.3691, 0.4668, 0.5801, 0.7207, 0.8828, 1.0586, 1.2441, 1.4258}, or a code rate set corresponding to the MCS information subsets is {0.1445, 0.1846, 0.2334, 0.2900, 0.3604, 0.4414, 0.5293, 0.6221, 0.7129}; or there are 10 MCS information subsets whose modulation modes are QPSK in the predefined MCS information set, and a spectral efficiency set corresponding to the MCS information subsets whose modulation modes are QPSK is {0.2891, 0.3691, 0.4668, 0.5801, 0.7207, 0.8828, 1.0586, 1.2441, 1.4258, 1.6016}, or a code rate set corresponding to the MCS information subsets is {0.1445, 0.1846, 0.2334, 0.2900, 0.3604, 0.4414, 0.5293, 0.6221, 0.7129, 0.8008}; or there are four MCS information subsets whose modulation modes are 16 quadrature amplitude modulation (QAM) in the predefined MCS information set, and a spectral efficiency set corresponding to the MCS information subsets whose modulation modes are 16QAM is {1.5273, 1.8008, 2.0781, 2.4023}, or a code rate set corresponding to the MCS information subsets is {0.3818, 0.4502, 0.5195, 0.6006}; or there are seven MCS information subsets whose modulation modes are 16QAM in the predefined MCS information set, and a spectral efficiency set corresponding to the MCS information subsets whose modulation modes are 16QAM is {1.8008, 2.0781, 2.4023, 2.7344, 3.0430, 3.3320, 3.5430}, or a code rate set corresponding to the MCS information subsets is {0.4502, 0.5195, 0.6006, 0.6836, 0.7607, 0.8330, 0.8857}; or there are nine MCS information subsets whose modulation modes are 64QAM in the predefined MCS information set, and a spectral efficiency set corresponding to the MCS information subsets whose modulation modes are 64QAM is {2.4199, 2.7480, 3.1055, 3.4746, 3.8379, 4.2129, 4.5879, 4.9102, 5.2500}, or a code rate set corresponding to the MCS information subsets is {0.4033, 0.4580, 0.5176, 0.5791, 0.6396, 0.7021, 0.7646, 0.8184, 0.8750}; or there are six MCS information subsets whose modulation modes are 64QAM in the predefined MCS information set, and a spectral efficiency set corresponding to the MCS information subsets whose modulation modes are 64QAM is {3.8379, 4.2129, 4.5879, 4.9102, 5.2500, 5.5020}, or a code rate set corresponding to the MCS information subsets is {0.6396, 0.7021, 0.7646, 0.8184, 0.8750, 0.9170}; or there are five MCS information subsets whose modulation modes are 256QAM in the predefined MCS information set, and a spectral efficiency set corresponding to the MCS information subsets whose modulation modes are 256OAM is {5.2813, 5.7188, 6.1797, 6.6016, 7.0000} or {5.7188, 6.1797, 6.6016, 7.0000, 7.3203}, or a code rate set corresponding to the MCS information subsets is {0.6602, 0.7148, 0.7725, 0.8252, 0.8750} or {0.7148, 0.7725, 0.8252, 0.8750, 0.9150}; or there are five MCS information subsets whose modulation modes are 1024QAM in the predefined MCS information set, and a spectral efficiency set corresponding to the MCS information subsets whose modulation modes are 1024QAM is {7.0996, 7.5000, 7.9297, 8.3594, 8.7500}, or a code rate set corresponding to the MCS information subsets is {0.7100, 0.7500, 0.7930, 0.8359, 0.8750}; or there are four MCS information subsets whose modulation modes are 1024QAM in the predefined MCS information set, and a spectral efficiency set corresponding to the MCS information subsets whose modulation modes are 1024QAM is {7.5000, 7.9297, 8.3594, 9.2285}, or a code rate set corresponding to the MCS information subsets is {0.7500, 0.7930, 0.8359, 0.9229}.

7. The method according to claim 6, further comprising:
receiving a signal to interference plus noise ratio (SINR) indicator reported by the first node; and
determining the first MCS index based on the SINR indicator.

8. An information transmission apparatus, comprising: one or more processors; and a non-transitory storage medium in communication with the one or more processors, wherein the non-transitory storage medium stores program instructions that, in response to being executed by the one or more processors, cause the apparatus to:
send a first modulation and coding scheme (MCS) index to a first node,
wherein the first MCS index corresponds to a first modulation mode; and
receive data from the first node or send data to the first node based on the first modulation mode,
wherein a first MCS information subset in which the first MCS index is located belongs to a predefined MCS information set, and the predefined MCS information set comprises 32 MCS information subsets; and
the first MCS information subset comprises first spectral efficiency and/or a first code rate corresponding to the first MCS index, the first modulation mode or a modulation order corresponding to the first modulation mode, and wherein the first code rate is a ratio of spectral efficiency corresponding to the first MCS index to the modulation order corresponding to the first modulation mode,
wherein one of:
there are nine MCS information subsets whose modulation modes are quadrature phase shift keying (QPSK) in the predefined MCS information set, and a spectral efficiency set corresponding to the MCS information subsets whose modulation modes are QPSK is {0.2891, 0.3691, 0.4668, 0.5801, 0.7207, 0.8828, 1.0586, 1.2441, 1.4258}, or a code rate set corresponding to the MCS information subsets is {0.1445, 0.1846, 0.2334, 0.2900, 0.3604, 0.4414, 0.5293, 0.6221, 0.7129}; or there are 10 MCS information subsets whose modulation modes are QPSK in the predefined MCS information set, and a spectral efficiency set corresponding to the MCS information subsets whose modulation modes are QPSK is {0.2891, 0.3691, 0.4668, 0.5801, 0.7207, 0.8828, 1.0586, 1.2441, 1.4258, 1.6016}, or a code rate set corresponding to the MCS information subsets is {0.1445, 0.1846, 0.2334, 0.2900, 0.3604, 0.4414, 0.5293, 0.6221, 0.7129, 0.8008}; or there are four MCS information subsets whose modulation modes are 16 quadrature amplitude modulation (QAM) in the predefined MCS information set, and a spectral efficiency set corresponding to the MCS information subsets whose modulation modes are 16QAM is {1.5273, 1.8008, 2.0781, 2.4023}, or a code rate set corresponding to the MCS information subsets is {0.3818, 0.4502, 0.5195, 0.6006}; or there are seven MCS information subsets whose modulation modes are 16QAM in the predefined MCS information set, and a spectral efficiency set corresponding to the MCS information subsets whose modulation modes are 16QAM is {1.8008, 2.0781, 2.4023, 2.7344, 3.0430, 3.3320, 3.5430}, or a code rate set corresponding to the MCS information subsets is {0.4502, 0.5195, 0.6006, 0.6836, 0.7607, 0.8330, 0.8857}; or there are nine MCS information subsets whose modulation modes are 64QAM in the predefined MCS information set, and a spectral efficiency set corresponding to the MCS information subsets whose modulation modes are 64QAM is {2.4199, 2.7480, 3.1055, 3.4746, 3.8379, 4.2129, 4.5879, 4.9102, 5.2500}, or a code rate set corresponding to the MCS information subsets is {0.4033, 0.4580, 0.5176, 0.5791, 0.6396, 0.7021, 0.7646, 0.8184, 0.8750}; or there are six MCS information subsets whose modulation modes are 64QAM in the predefined MCS information set, and a spectral efficiency set corresponding to the MCS information subsets whose modulation modes are 64QAM is {3.8379, 4.2129, 4.5879, 4.9102, 5.2500, 5.5020}, or a code rate set corresponding to the MCS information subsets is {0.6396, 0.7021, 0.7646, 0.8184, 0.8750, 0.9170}; or there are five MCS information subsets whose modulation modes are 256QAM in the predefined MCS information set, and a spectral efficiency set corresponding to the MCS information subsets whose modulation modes are 256QAM is {5.2813, 5.7188, 6.1797, 6.6016, 7.0000} or {5.7188, 6.1797, 6.6016, 7.0000, 7.3203}, or a code rate set corresponding to the MCS information subsets is {0.6602, 0.7148, 0.7725, 0.8252, 0.8750} or {0.7148, 0.7725, 0.8252, 0.8750, 0.9150}; or there are five MCS information subsets whose modulation modes are 1024QAM in the predefined MCS information set, and a spectral efficiency set corresponding to the MCS information subsets whose modulation modes are 1024QAM is {7.0996, 7.5000, 7.9297, 8.3594, 8.7500}, or a code rate set corresponding to the MCS information subsets is {0.7100, 0.7500, 0.7930, 0.8359, 0.8750}; or there are four MCS information subsets whose modulation modes are 1024QAM in the predefined MCS information set, and a spectral efficiency set corresponding to the MCS information subsets whose modulation modes are 1024QAM is {7.5000, 7.9297, 8.3594, 9.2285}, or a code rate set corresponding to the MCS information subsets is {0.7500, 0.7930, 0.8359, 0.9229}.

9. The apparatus according to claim 8, wherein the non-transitory storage medium stores program instructions that, in response to being executed by the one or more processors, further cause the apparatus to:
- receive a signal to interference plus noise ratio (SINR) indicator reported by the first node; and
- determine the first MCS index based on the SINR indicator.

10. The apparatus according to claim 8, wherein the predefined MCS information set comprises at least one of quadrature phase shift keying (QPSK), 16 quadrature amplitude modulation (QAM), 64QAM, 256QAM, or 1024QAM.

* * * * *